(12) United States Patent
Chuiko et al.

(10) Patent No.: US 12,128,440 B2
(45) Date of Patent: Oct. 29, 2024

(54) DEVICE FOR ROBOTIC INTERNAL INSULATION OF A PIPELINE WELDED JOINT

(71) Applicant: Aleksandr Georgievich Chuiko, Moscow (RU)

(72) Inventors: Aleksandr Georgievich Chuiko, Moscow (RU); Anastasia Aleksandrovna Chuyko, Moscow (RU)

(73) Assignee: Aleksandr Georgievich Chuiko, Moscow (RU)

( * ) Notice: Subject to any disclaimer, the term of this patent is extended or adjusted under 35 U.S.C. 154(b) by 481 days.

(21) Appl. No.: 17/610,567

(22) PCT Filed: Jul. 27, 2020

(86) PCT No.: PCT/RU2020/000384
§ 371 (c)(1),
(2) Date: Nov. 11, 2021

(87) PCT Pub. No.: WO2020/256589
PCT Pub. Date: Dec. 24, 2020

(65) Prior Publication Data
US 2022/0226859 A1   Jul. 21, 2022

(30) Foreign Application Priority Data

Jun. 20, 2019   (RU) ................................ 2019119327

(51) Int. Cl.
*B05C 7/08* (2006.01)
*F16L 13/02* (2006.01)
(Continued)

(52) U.S. Cl.
CPC ............ *B05C 7/08* (2013.01); *F16L 13/0263* (2013.01); *B25J 11/0075* (2013.01); *H05B 3/40* (2013.01); *H05B 2203/013* (2013.01)

(58) Field of Classification Search
USPC ........................................ 118/306, 317, 408
See application file for complete search history.

(56) References Cited

U.S. PATENT DOCUMENTS 3,583,678 A    6/1971   Harder
4,780,072 A    10/1988  Burnette
(Continued)

FOREIGN PATENT DOCUMENTS

EP       533999 A1 *   3/1993   ........ F16L 55/16455
RU       2667856 C1    9/2018
(Continued)

OTHER PUBLICATIONS

English Translation EP-533999A1 (Year: 1993).*
International Search Report in PCT/RU2020/000384, mailed Jan. 28, 2021.

*Primary Examiner* — Yewebdar T Tadesse
(74) *Attorney, Agent, or Firm* — Collard & Roe, P.C.

(57) ABSTRACT

A pipeline construction usable for internally insulating a welded joint between pipes with an internal protective coating. A device for internally insulating a welded pipeline joint includes a sealing assembly including a cylindrical housing and a coaxially-fastened cylindrical working member that radially expands upon generation of excess pressure in a cavity thereof. Inside the housing are a sealing compound feed assembly, a dosing device formed by a piston assembly for sealing compound components, and a pneumatic control assembly. In the dosing device, working cavities for each component are connected to the feed assembly. The elastic working member has a conduit connected to the feed assembly for feeding sealing compound into an annular gap in a welded joint region, and a conduit for pumping air out of the gap. The pneumatic control (Continued)

assembly controls dosing device and feed assembly functioning and generates excess air pressure in the working member cavity.

14 Claims, 65 Drawing Sheets

(51) Int. Cl.
*B25J 11/00* (2006.01)
*H05B 3/40* (2006.01)

(56) References Cited

U.S. PATENT DOCUMENTS

| | | |
|---|---|---|
| 4,861,248 A | 8/1989 | Ben |
| 2020/0240555 A1 | 7/2020 | Chuiko et al. |

FOREIGN PATENT DOCUMENTS

| | | |
|---|---|---|
| RU | 2677913 C1 | 1/2019 |
| WO | 2008/077369 A2 | 7/2008 |

* cited by examiner

DEVICE FOR ROBOTIC INTERNAL INSULATION OF A PIPELINE WELDED JOINT

CROSS REFERENCE TO RELATED APPLICATIONS

This application is the National Stage of PCT/RU2020/000384 filed on Jul. 27, 2020, which claims priority under 35 U.S.C. § 119 of Russian Application No. 2019119327 filed on Jun. 20, 2019, the disclosure of which is incorporated by reference. The international application under PCT article 21 (2) was not published in English.

FIELD OF THE INVENTION

The invention relates to pipeline construction and can be used for internal insulation of the pipeline welded joint with inside protective coating.

BACKGROUND OF THE INVENTION

There is a device for implementing Chuiko's method for internal monolithic insulation of the welded pipeline connection (RU 2667856, published on 24 Sep. 18) that involves the coaxial installation of a steel protective bushing inside the joined pipes; after the pipe joint is welded, the end annular gaps between the protective bushing and the joined pipes are sealed so that an annular cavity is made between the bushing outer surface, welded joint inner surface and the adjacent surfaces of the joined pipes, then air is pumped out from the annular cavity and it is filled with the compound.

The device for sealing end annular space is equipped with a power unit comprising a cylindrical elastic actuator and a shell of elastic anti-adhesion material coaxially installed on the actuator's surface. The actuator is pressurized inside, the actuator is radially expanded, and the shell is pressed against the protective busing and the surfaces of the joined pipes on both sides of the protective bushing. When the compound polymerization process is completed, the pressure inside the actuator is decreased, the shell is disconnected from the protective bushing and the inner surfaces of the connected pipes, then the sealing device is dismantled from the pipeline. The device for sealing end annular space is not equipped with a special device for filling the annular space with compound.

The device for underground pipeline repair (U.S. Pat. No. 4,861,248 A, 29 Aug. 1989) that consists of a cylindrical elastic shell with rigid cylindrical plugs inserted at its ends, which form a closed airtight circuit together with the shell, is the closest to the proposed technical solution. The plugs inside the device cavity are connected to each other by a rope that limits their movement relative to each other. There is a through hole in one of the plugs with a hose connection for supplying compressed air into the device inner cavity. In the central part of the elastic shell, a sleeve or bushing is hard mounted on its surface, these parts cannot be separated from each other. This way, the shell middle section is made stiffer.

In addition, at the first option of the device, two parallel tubes are inserted into the device inner cavity through the end plug. The two components of the two-component compound can be fed through these tubes by separate channels. In the central part of the device inner cavity, these two tubes are interconnected. A third short, curved tube connecting these two tubes to the nozzle is connected to the point of the two tubes connection. The short, curved tube serves as a static mixer. In turn, the nozzle mounted in the middle of the elastic shell, through its central opening, extends the connected tube channel to the device outer cylindrical surface.

The first option device operates as follows. The device is inserted into the pipe cavity. The device center is placed in the center of the area to be isolated. Compressed air is pumped into the device inner cavity. The peripheral parts of the elastic shell inflate and press against the pipeline inner surface. Annular space is created between the outer surface of the elastic shell central part and the inner surface of the pipeline insulated part. The two components of the two-component compound are fed into the device inner cavity through two tubes. The compound components enter a short, curved tube in the immediate vicinity of the device center, and there they are combined into one flow. The author claims this short tube with a curve operates as a static mixer. The released mixture fills the annular space cavity and hardens. After the compound is polymerized, compressed air pressure is released in the device cavity, the elastic shell shrinks and comes out of contact with the pipeline walls and the polymerized compound surface. The device is removed from the pipeline cavity.

The first option of the device has the following shortcomings:
1) The annular space cavity created by the device has only one channel through which the compound is pumped into it. As the compound fills the annular gap cavity, the residual air is compressed and, as a result, the internal pressure in the cavity increases. When the air pressure inside the annular space cavity reaches the level of the injected compound pressure, the annular space stops filling. The annular space cavity is only partially filled. And due to the law of universal gravity, the compound fills only the lower part of the cavity. The upper part of the annular space cavity is left empty. The device in question is not suitable for isolating defective sections of pipelines.
2) There is no effective option for controlling over the mixing quality of the compound components in the device at all. The quality of the compound components mixing when they pass through the short, curved tube of the device is many times worse than the quality of the compound mixing when it passes through even one section of a static mixer practically of any level. For this reason, the annular space cavity is filled with a stratified mixture of compound components obviously unsuitable for annular space isolation.
3) The invention does not have its own built-in dispensing equipment. Therefore, it is necessary to use a third-party dosing unit to fill the annular space cavity with compound, and it is usually not possible to place it in very close proximity in the pipeline inner cavity. In order to feed the compound components from the dosing unit to the device, one should use quite long hoses. When almost any two-component compound dosing unit is turned on, the two compound valves open synchronously. Most two-component compounds use a volume proportional mixing ratio that is different from the 1:1 ratio. Therefore, with the dosing unit in operation, the cavities of the feed hoses and tubes are filled asynchronously. The compound component with the higher proportional mixing volume ratio fills the feed hose cavity and begins to flow into the short, curved tube and into the annular space cavity. As the annular cavity is pressurized because there is no second channel, the first component starts to fill the cavity of the hose supplying the second component of the compound at the same time. When the cavity of the second hose is fully filled, the compound components start mixing inside the hose feeding the component with the lower mixing ratio. This results in compound polymerization in the second hose making the device inoperable. The annular space cavity is either completely filled with one component of the compound, or with a compound with an unacceptable mixing ratio. For example, if the two-component compound B9M10+CG9900875MF is used for the inner insulation of a pipeline welded joint and the material is supplied from the dosing unit to the welded joint over a distance of 40 m through 9 mm hoses, more than 4 liters of CG9900875MF will be supplied until the mixture reaches the annular space cavity.

4) Since the device does not have temperature control, it cannot be used at temperatures other than those specified by the manufacturer for the compound.

5) There is no control over the thickness of the filling of the annular space cavity with compound.

6) There is no control over the quality of the compound that fills the annular space.

7) It is impossible to remove low-quality compound from the circuit feeding it into the annular space cavity.

8) It is impossible to wash the device feeding hoses and tubes once the process of filling the annular space with compound is finished.

At the second option of the device, two parallel tubes are inserted into the device inner cavity through the end plug. The two components of the two-component compound can be fed through these two tubes by separate channels. In the central part of the device inner cavity, these two tubes are radially extended into the cavity of a special hydraulic cylinder with a piston. The hydraulic cylinder piston is connected to the pneumatic cylinder rod. The open side of the hydraulic cylinder is installed on an elastic cylindrical casing. The hydraulic cylinder cavity is coupled to the device's outer surface. The hydraulic cylinder cavity serves as a static mixer.

The second option device operates as follows. The device is inserted into the pipe cavity. The device center is placed in the center of the area to be isolated. Compressed air is pumped into the device inner cavity. The peripheral parts of the elastic shell inflate and press against the pipeline inner surface. Annular space is created between the outer surface of the elastic shell central part and the inner surface of the pipeline insulated part. The two components of the two-component compound are fed into the device inner cavity through two tubes. In the device middle part, the compound components are fed into the hydraulic cylinder cavity, where they are combined into one flow. The author claims that flows are mixed in the hydraulic cylinder cavity. The released mixture fills the annular space cavity and hardens. After the compound is polymerized, compressed air pressure is released in the device cavity, the elastic shell shrinks and comes out of contact with the pipeline walls and the polymerized compound surface. The device is removed from the pipeline cavity.

The second option of the device has all the disadvantages of the first version with two more specific disadvantages:

1) There is no static mixer at all.

2) The hydraulic device for mechanical cleaning of the unit for supplying sealing material into the annular space cavity must be repaired after each isolation cycle as the compound inevitably polymerizes in the hydraulic cylinder cavity.

SUMMARY OF THE INVENTION

The invention solves the technical problem through the creation of a device for robotic internal insulation of a pipeline welded joint that provides a full cycle of high-quality monolithic insulation of a welded joint in a pipeline inner cavity at minimum cost.

The technical problem is solved by a device for internal isolation of a pipeline welded joint that comprises a sealing unit including a cylindrical casing and coaxially mounted cylindrical actuator designed to expand radially when excess pressure is created in its cavity, a compound feeding unit, compound dosing unit and pneumatic automation unit located in the casing, dosing unit operating cavities for each compound component are connected to the compound feeding unit, the elastic actuator has a channel for feeding the compound in an annular space in the area of the welded joint, the annular space being connected with the compound feeding unit and with a channel for gas evacuation from the annular space, and the pneumatic automation unit is designed to control operation of the dosing unit and the compound feeding unit and to control creating excess air pressure in the sealing unit actuator cavity.

Moreover, preferably, the actuator comprises the actuator comprises an elastic sleeve and an elastic shell made of an anti-adhesion material located on the sleeve, and the channel for feeding the compound into the annular space in the area of the welded joint and the channel for evacuating gas from the mentioned annular space are made in the elastic shell.

The preferred design includes the elastic sleeve has annular protrusions on the end sections on the inside, located in annular grooves on the outside of the sealing unit casing, and on each end section of the elastic sleeve on the outside there is a retaining bushing in contact with an end of the elastic shell.

It is advisable to have a film heater located on the outer surface of the sealing unit casing.

Moreover, the dosing unit comprises a cylindrical casing with a piston assembly installed in it, which includes two pistons mounted hermetically in the casing, the pistons are connected by a rod installed hermetically inside an annular cavity separator mounted on the inside surface of the casing, the rod has an axial channel connected to the pneumatic automation unit and radial channels connected to the axial channel with their outputs located near the first piston located at the compound feeding unit side.

The sealing unit casing forms the dosing unit casing in the preferable design.

In addition, the compound feeding unit comprises a casing in which a static mixer, a valve assembly with valves integrated into the casing of the compound feeding unit, and a washing fluid tank connected to channels for supplying compound components to the static mixer.

The preferred design has the compound feeding unit casing made of two cylindrically shaped parts of different diameters, the static mixer is coaxially located inside said casing, the valves of the valve assembly are located in the part of the casing of larger diameter, and the washing fluid tank is a hydraulic accumulator formed by outer surface of the part of the casing of smaller diameter and the cylindrical membrane fastened to said casing.

Besides, a piston operating cavity of the dosing unit is located between the end face of the compound feeding unit and the first piston of the piston assembly and is connected to an inlet cavity of the first valve of the valve assembly through a channel designed in the compound feeding unit casing; a rod operating cavity of the dosing unit is located between the second piston of the piston assembly and the annular separator and is connected to an inlet cavity of the second valve of the valve assembly through channels in the sealing unit casing and in the compound feeding unit casing; output cavities of the first and second valves of the valve assembly are connected to an inlet of the static mixer through channels in the casing of the compound feeding unit, an outlet of the static mixer is connected to a channel for compound feeding into the annular space, said channel is designed in the elastic shell of the sealing unit, and the washing fluid tank is connected through the third valve of the valve assembly to output cavities of the first and second valves of the valve assembly.

Moreover, the pneumatic automation unit comprises a casing with a pneumatic valve island, at least one working channel of the pneumatic valve island is connected to the piston operating cavity of the dosing unit located between the second piston and the end face of the pneumatic automation unit; other operating channels of the pneumatic valve island are connected through channels in the sealing unit casing respectively to the actuator cavity of the sealing unit, to the cavity of the washing fluid tank and to valve drives of the valve assembly, and a position sensor of the piston assembly connected with the pneumatic valve island is located at the end face of the pneumatic unit casing, which faces the piston assembly.

Moreover, an outlet of the static mixer of the compound feeding unit is connected to the compound feeding channel of the sealing unit actuator by means of an elastic tube with the first pinch valve installed on it; also said outlet of the static mixer is connected to an elastic tube for poor-quality compound removal with the second pinch valve installed, and a channel for evacuating air from the annular space of the sealing unit actuator is connected to an elastic pumping tube with the third pinch valve installed, and the pinch valves are located in the compound feeding unit casing, and other operating channels of the pneumatic valve island are connected through channels in the sealing unit casing to the pinch valve drives.

The preferred design has the channel for gas evacuation from the annular space is connected to a vacuum trap.

In this case, it is advisable that the elastic tube for poor-quality compound removal and the elastic pumping tube are connected to a vacuum trap.

In the preferred design, the vacuum trap includes a cylindrical casing divided by a partition wall with an opening for smaller and larger chambers; there is a tank in the larger chamber, which is suspended in the casing on load cells and which has an opening on the side facing the partition wall and on the opposite side the tank is connected to flexible discharge and evacuation tubes, while there is an air filter in the smaller chamber between the opening in the partition wall and an outlet nozzle.

This invention solves the following problems:
1) The operation for delivering and mounting the protective bushing to the pipeline welded joint inside its cavity is automated.
2) The operation for sealing the end annular space of the annular space cavity between the protective bushing and the inner walls of the pipeline is automated.
3) The operation for evacuating air from the annular space cavity of the pipeline welded joint is automated.
4) The operation for monitoring the annular space cavity tightness between the protective bushing and the pipeline inner walls is automated.
5) The delivery of the compound components to the insulated welded joint inside the pipeline cavity is automated.
6) The suggested device has a built-in thermal control system that ensures maintenance of the compound specified temperature at ambient temperatures ranging from +40 to minus-50 degrees Celsius.
7) The suggested device incorporates a high-precision automated system for dosing and injecting two-component compound into the annular space cavity between the protective bushing and the pipeline inner walls.
8) A highly efficient static two-component compound mixer is built into the suggested device, which makes it possible to control the mixing quality in a broad range.
9) The suggested device has a built-in tank (hydraulic accumulator) for delivery, storage and discharge of washing fluid and automatic maintenance of the internal pressure at a pre-set level.
10) The suggested device is equipped with a system providing automatic washing of the static mixer and compound supply channels in the annular space cavity between the protective bushing and the pipeline inner walls.
11) A distributed microprocessor control unit is built into the suggested device.
12) The suggested device incorporates a system for automatic control of filling the annular space cavity between the protective bushing and the pipeline inner walls with compound.
13) The suggested device incorporates an automated system for removing poor-quality compound before it is injected into the cavity of the annular space between the protective bushing and the pipeline inner walls.
14) The suggested device is equipped with an automated system for detecting compound with gas inclusions in the annular space cavity and its removal from there.
15) The suggested device integrates a system for continuous monitoring of the compound components reserves.
16) The proposed device incorporates a system for monitoring the flow of compound components and washing fluid at the static mixer inlet.
17) The suggested device is equipped with a system for monitoring the flow of compound and washing fluid at the static mixer outlet.
18) The use of the suggested device eliminates the human factor impact on the process duration and the quality of the internal insulation of the pipeline welded joint.
19) The usage of the suggested device eliminates the impact of weather and climatic conditions on the process duration and the quality of the pipeline welded joint inner insulation.
20) With the suggested device, it is possible to internally insulate welded joints of above-ground, underground and underwater pipelines.

EXAMPLES OF PREFERRED EMBODIMENTS OF THE INVENTION

Figure 1:
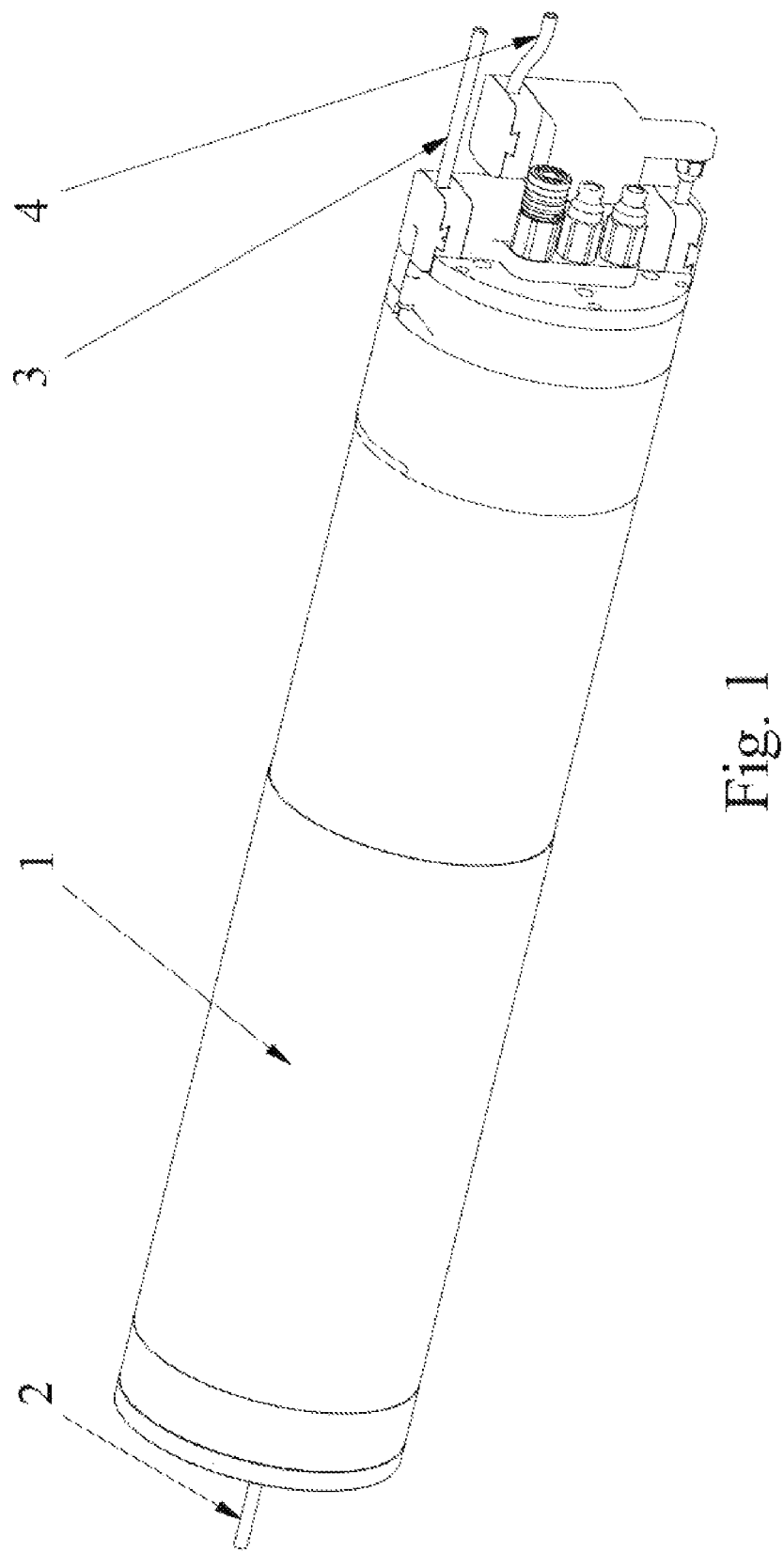
FIG. 1. General view of the suggested device.

FIG. 1 shows a general view of the suggested device 1 with external connections. To avoid overloading the drawings, wheels, an electrical power cable and control cables are not shown in all figures. The suggested device is designed for robotic internal insulation of a pipeline welded joint. The device 1 (FIG. 1) is equipped with a tube 2 for connection to a compressed air source, an elastic tube 3 for connection to an air pumping system and an elastic tube 4 for removing poor quality compound generated at the beginning of compound feeding into the annular space and products of washing the system after the filling process of the annular space with compound is over.

Figure 2:
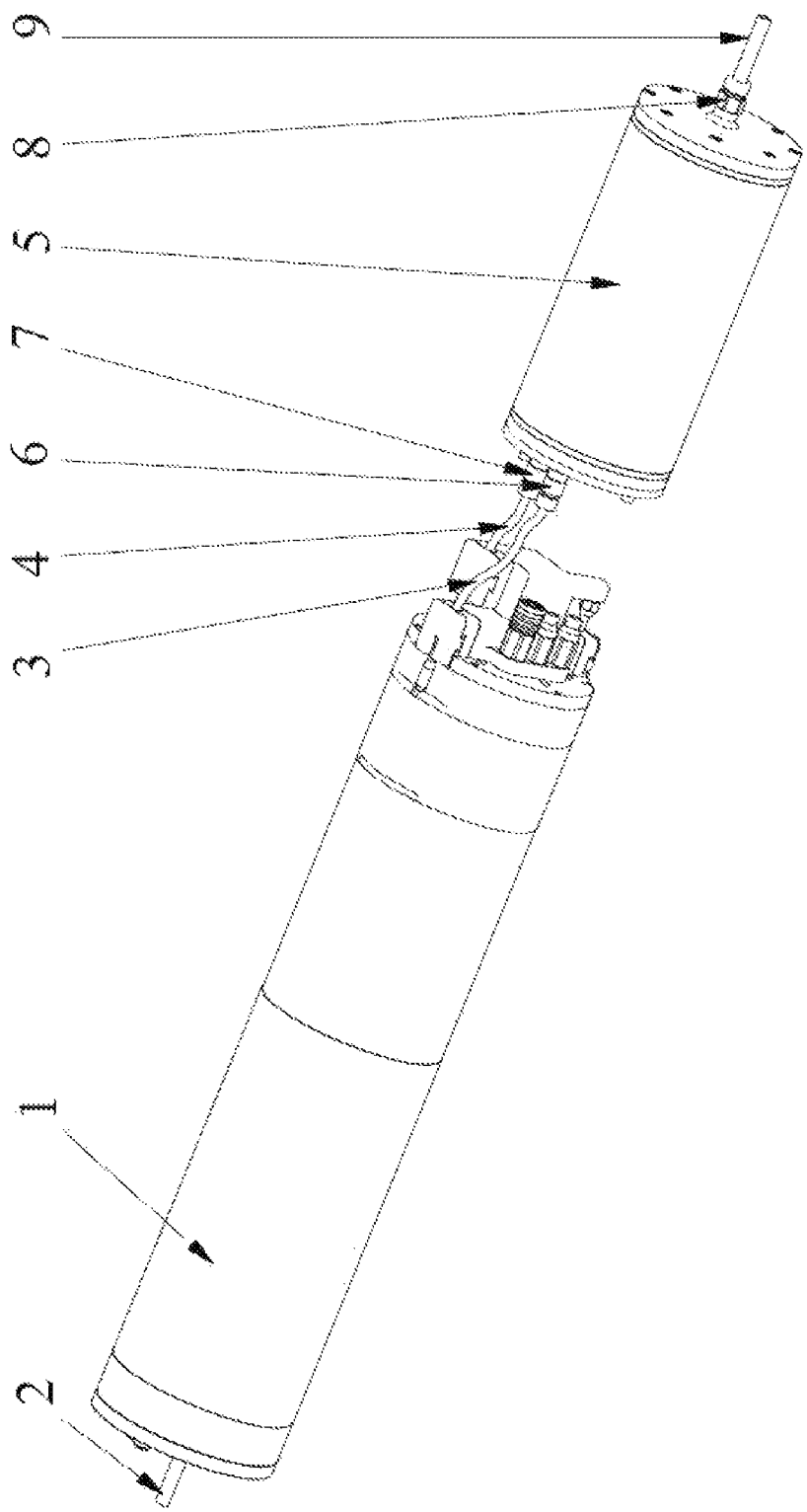
FIG. 2 General view of the suggested device with a vacuum trap.

FIG. 2 shows a general view of the suggested device 1 equipped with a vacuum trap 5. The vacuum trap 5 is connected to the device 1 through tubes 3 and 4 by means of fittings 6 and 7 located on one end of the vacuum trap 5. The vacuum trap 5 has fitting 8 mounted on the opposite end. The vacuum trap 5 is connected to a vacuum pump through a connector 8 and a tube 9. The main purpose of the vacuum trap 5 is to protect the vacuum pump from contaminants such as compound, washing fluid and their vapors. To solve this problem, the vacuum trap 5 catches poorly mixed compound generated at the beginning of its preparation; catches excess compound at the final stage of filling the annular space in the welded joint area; catches products of mixing system cleaning and compound feeding into the annular space in the welded joint area at the final stage of impregnation in the process of washing the static mixer and channels for feeding compound into the annular space cavity.

Figure 3:
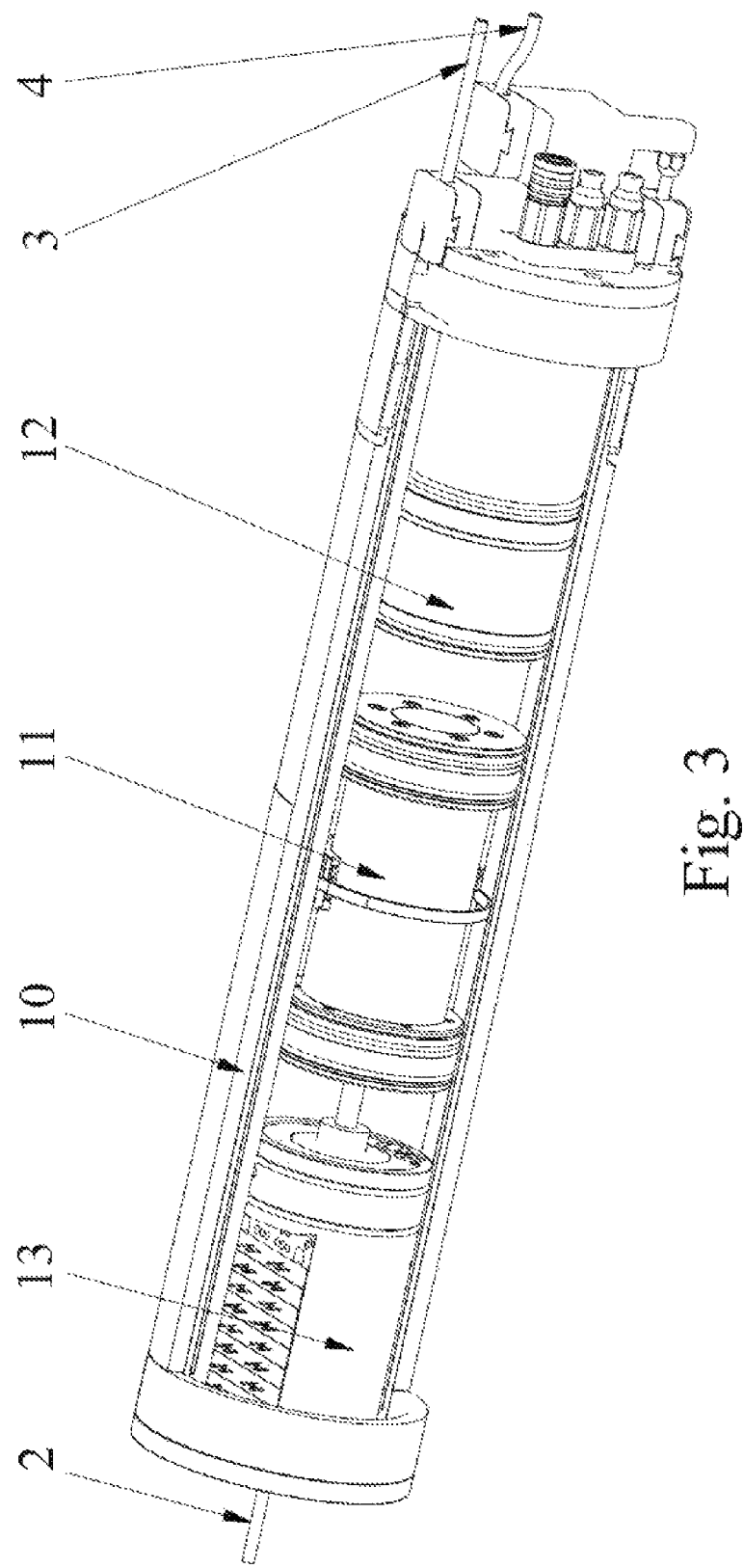
FIG. 3 Main units of the suggested device.

FIG. 3 shows an axonometric view of the device 1 with a partial cutout without the image of the pipeline welded joint. The device 1 is comprised of four main units: a sealing unit 10 that serves multiple functions including the formation of a tight annular space in the welded joint area; a piston assembly 11 of a compound component dosing unit; unit 12 of compound feeding into the annular space in the welded joint area and a pneumatic automation unit 13.

Figure 4:
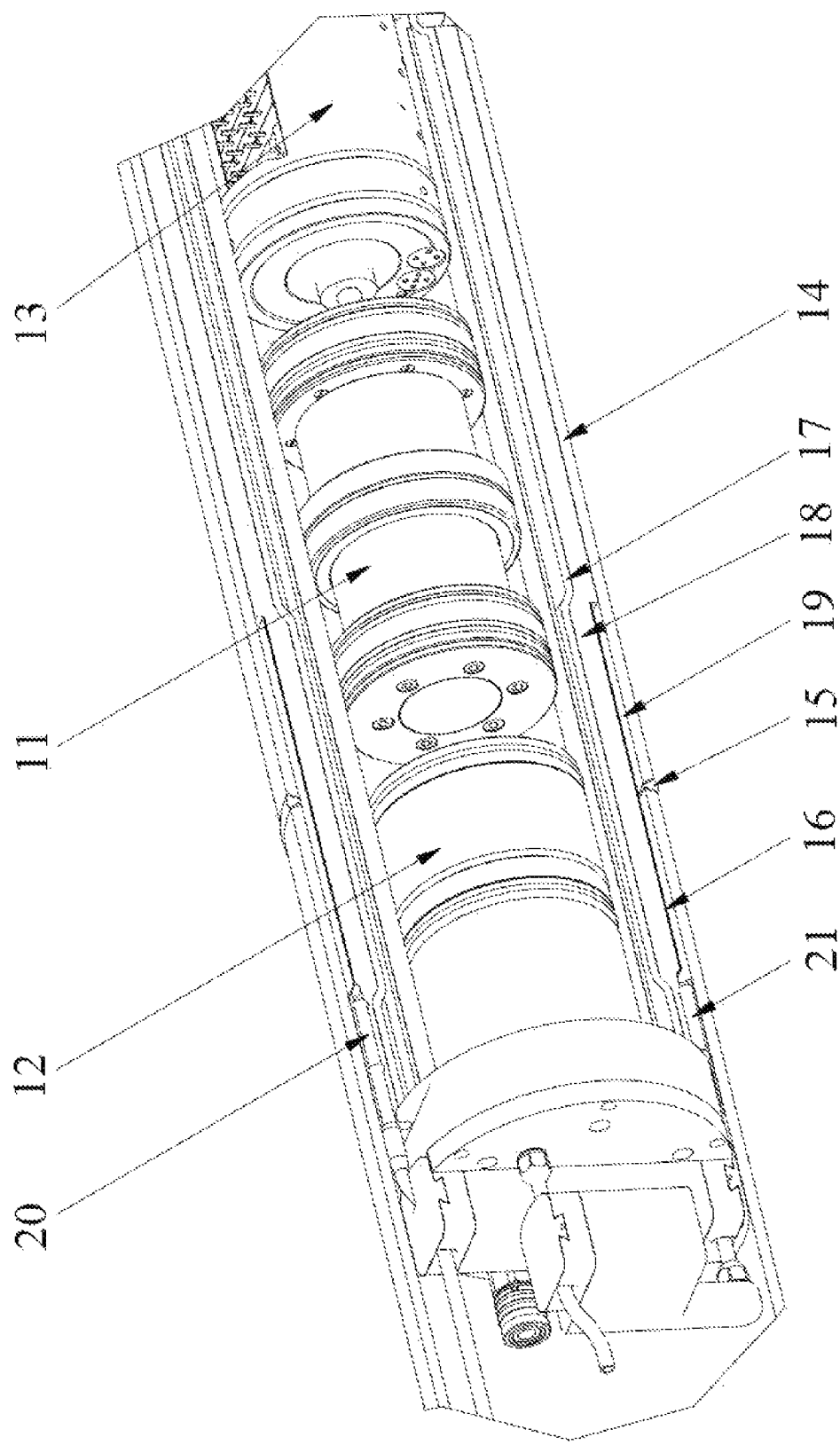
FIG. 4 Location of the suggested device and its main units in the pipeline cavity in course of the pipeline welded joint internal insulation.
Figure 5:
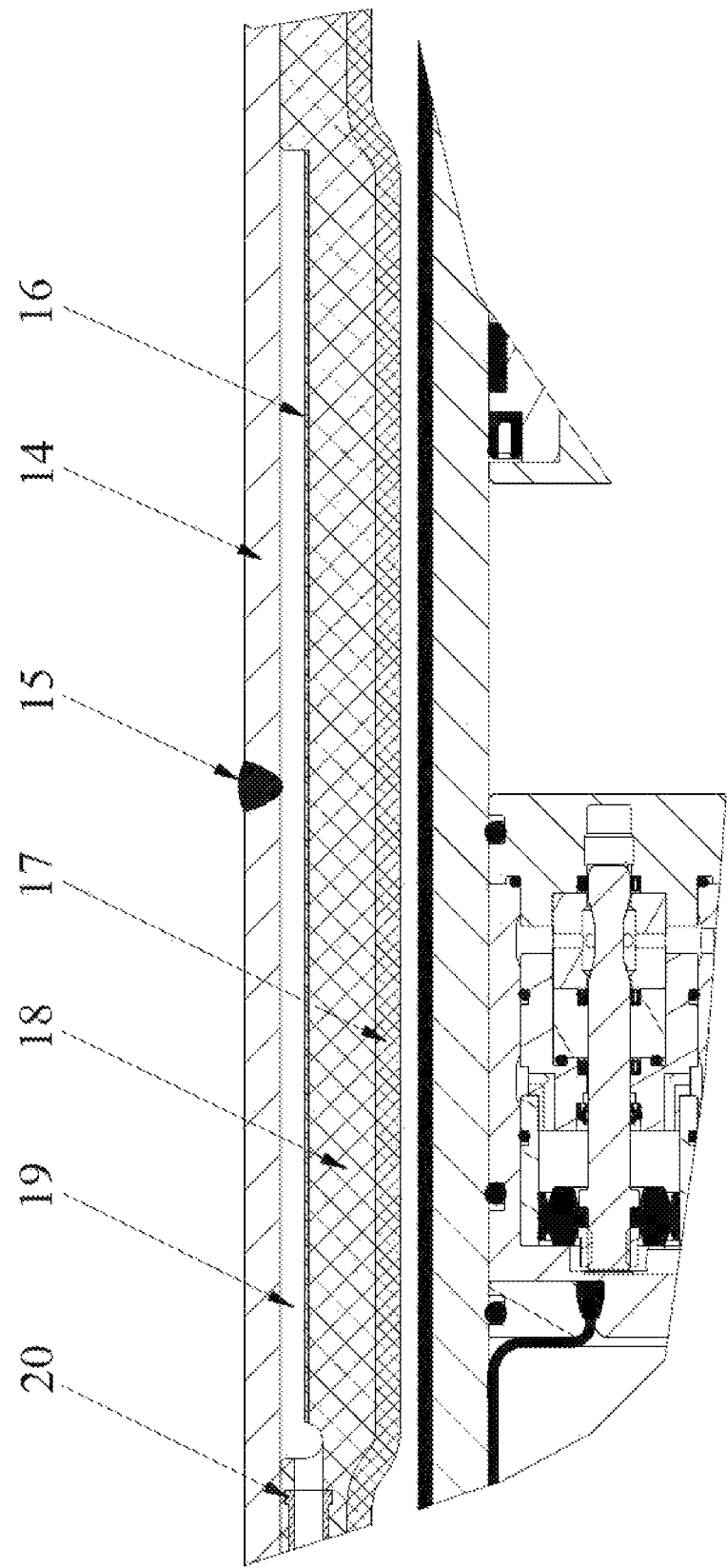
FIG. 5 Axial section of the annular space in the area of the pipeline welded joint formed by the suggested device.

FIG. 4 shows an axonometric view of the suggested device 1 with a partial section in operating condition with an image of the pipeline 14 and the welded joint 15. The protective bushing 16 is coaxially mounted in the pipeline 14 inner cavity around the welded joint 15. The sealing unit 10 incorporates a cylindrical elastic actuator, which comprises an elastic sleeve 17 and an elastic shell 18 tightly placed on it. The elastic sleeve 17 is pressed against the elastic shell 18 by compressed air pressure, in turn securing the spatial position of the protective bushing 16. The protective bushing 16 limits the local radial expansion of the elastic shell 18 and the elastic sleeve 17 of the actuator, as a result an annular space 19 is generated in the area of the welded joint 15. Outside the protective bushing 16 at both ends of the protective bushing 16, the elastic sleeve 17 firmly presses the elastic shell 18 against the inner walls of the pipeline 14 by means of compressed air pressure. This way the annular gaps between the inner surface of the pipe walls 14 and the protective bushing 16 are sealed on both ends of the bushing. The creation of the annular space 19 is explained further by the image shown in FIG. 5. Two airtight inlets 20 and 21 are integrated into the end section of the elastic shell 18 (FIGS. 4 and 5). The internal channels of airtight inlets 20 and 21 are directly connected to the cavity of the annular space 19 in the area of the welded joint 15. The airtight inlet 20 is designed to evacuate air from the annular space 19. The airtight inlet 21 is designed to feed the compound into the cavity of the annular space 19.

Figure 6:
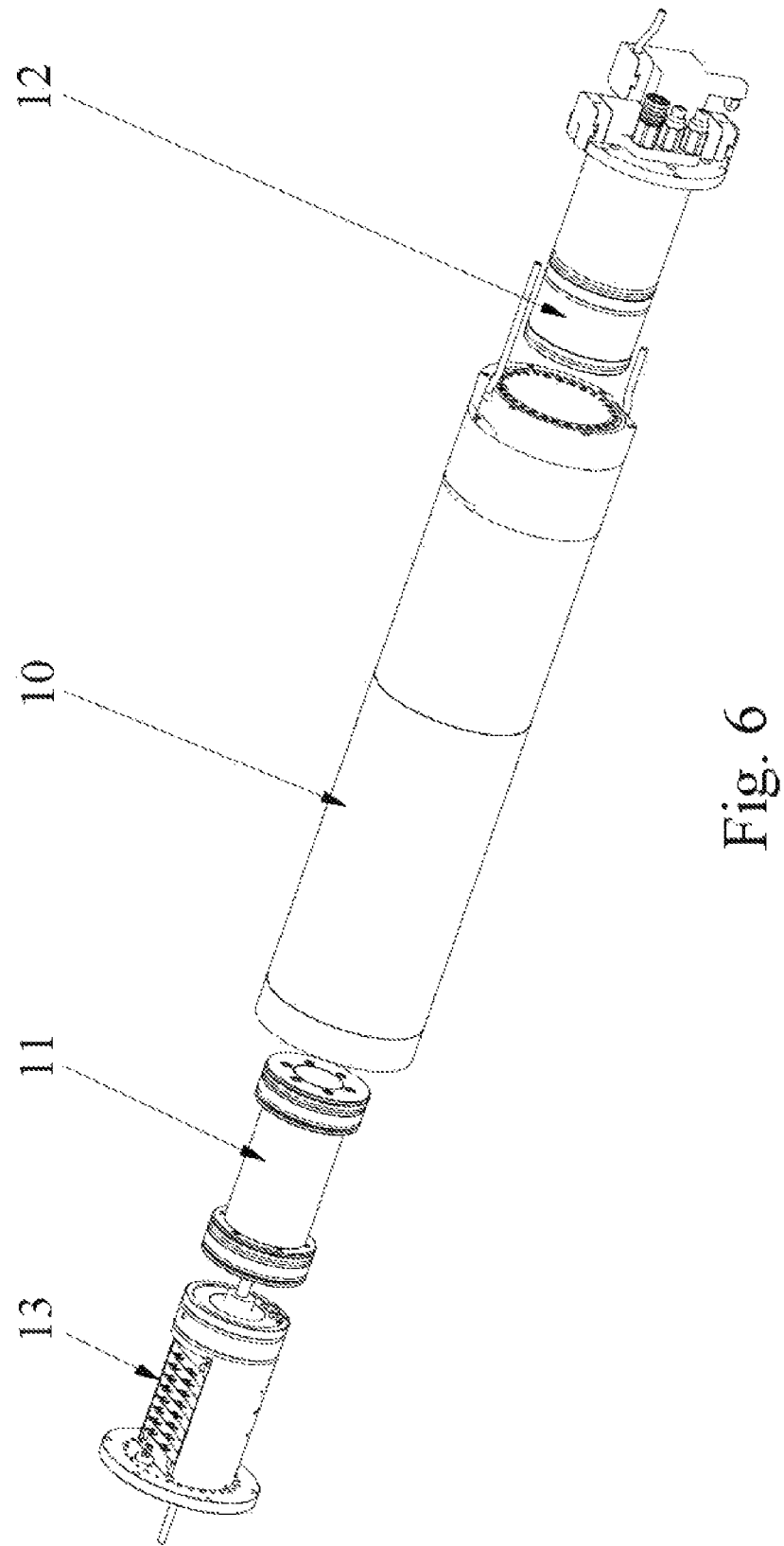
FIG. 6. Diagram of the suggested device assembly/disassembly.

FIG. 6 illustrates a diagram for assembly/disassembly of the device 1 from its integral assemblies. During assembly, at the first stage, the piston assembly 11 of the compound components dosing unit is mounted in the middle part of the inner cavity of the sealing unit 10. Then, the compound feeding unit 12 is inserted into the inner cavity of the sealing unit 10 from one of its ends and pushed up to the stop. The pneumatic automation unit 13 is inserted from the second end of the sealing unit 10 and pushed to the stop. There are integrated flanges on the unit 12 and unit 13, they are used to provide rigid bolted connection to the sealing unit 10.

Figure 7:
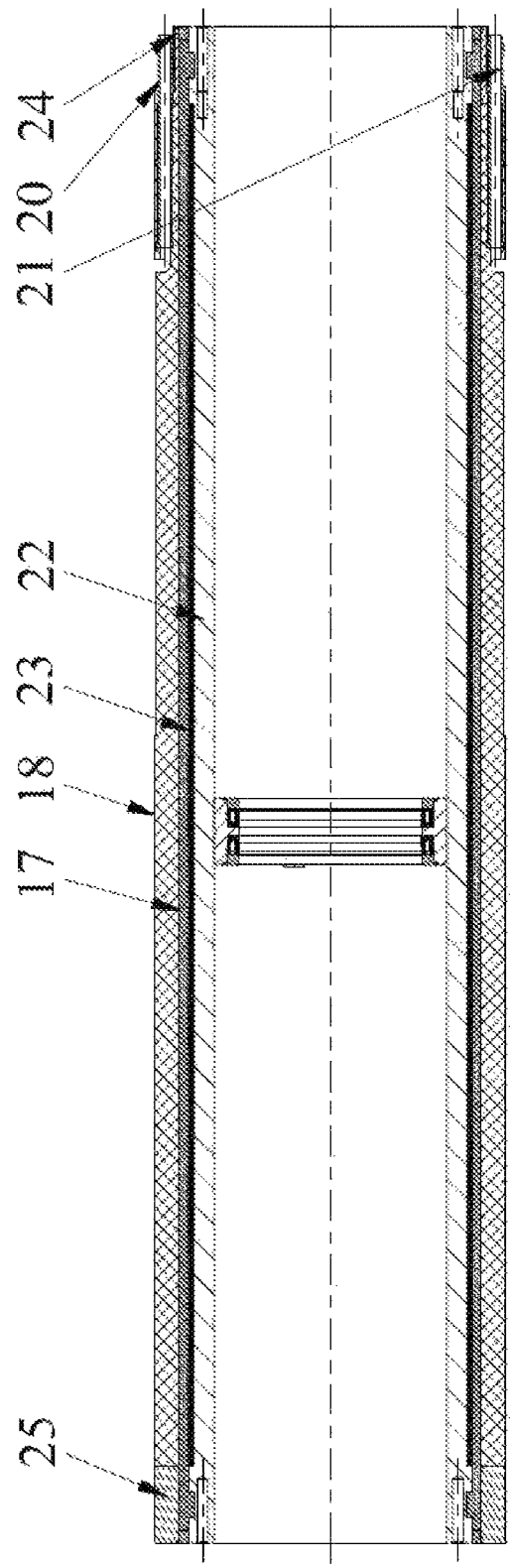
FIG. 7. The sealing unit axial section.
Figure 8:
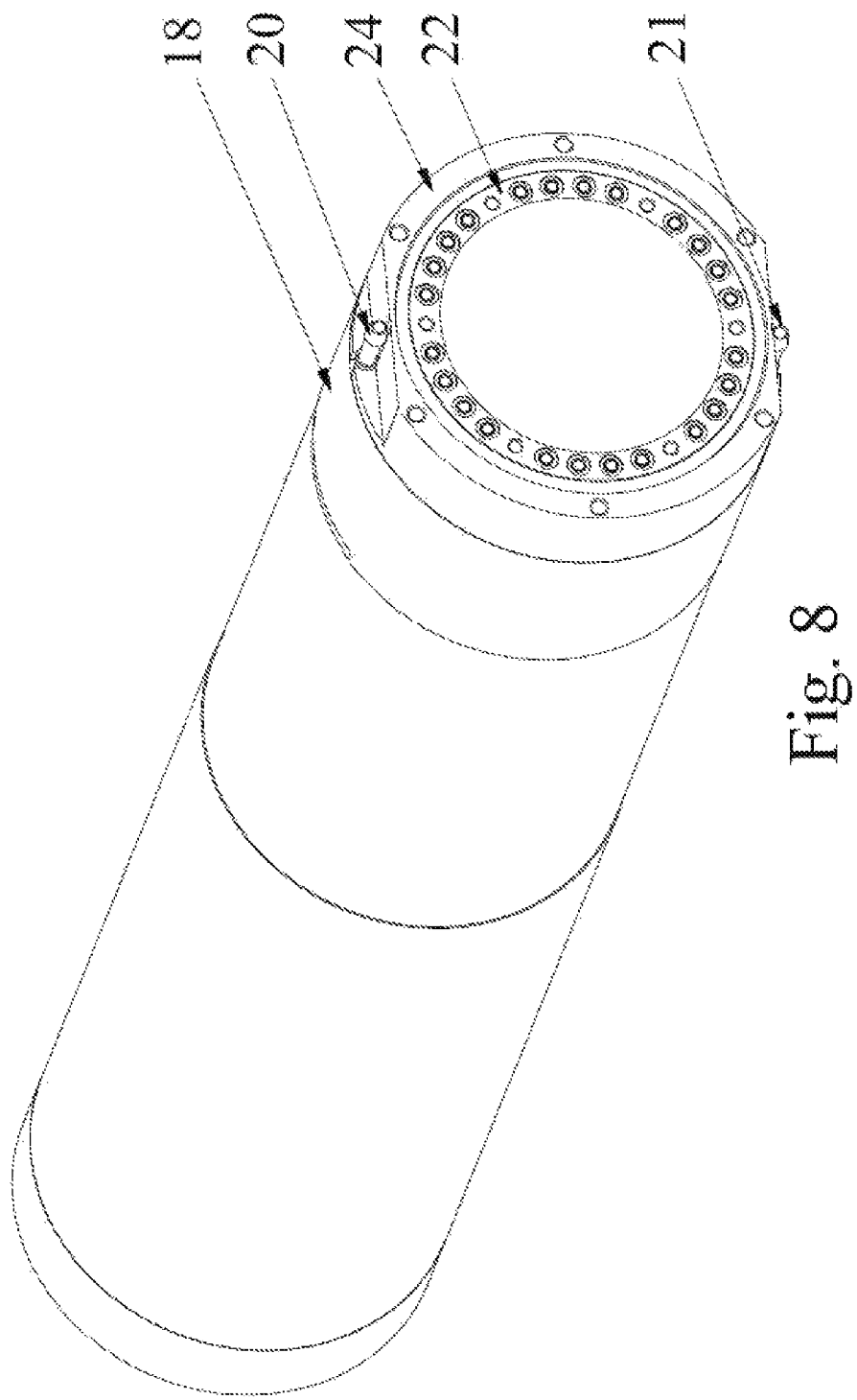
FIG. 8. General view of the sealing unit.

FIG. 7 shows an axial section of the sealing unit 10. The sealing unit 10 involves a cylindrical casing 22 with an actuator coaxially mounted on it, which includes the elastic sleeve 17 and the elastic shell 18 with the integrated airtight inlets 20 and 21. The design of the sealing unit 10 is clarified by its general view shown in FIG. 8. The casing 10 is the supporting and sealing element of the sealing unit 10. The casing 22 is simultaneously the main supporting element of the entire suggested device 1. There is a film heater 23 on the surface of the casing 22, regardless of its operating conditions, it provides a comprehensive temperature control of all units of the device 1 installed on its sealing unit 10. The elastic sleeve 17 is mounted on top of the film heater 23. The specially profiled end parts of the elastic sleeve 17 are tightly connected to the casing 22 and clamped by fixation bushings 24 and 25, it creates closed tight circuit between the outer surface of the casing 22 and the inner surface of the elastic sleeve 17. The elastic shell 18 firmly adjoins at either side of the ends of the fixation bushings 24 and 25 (FIG. 7), this way it is protected from displacement along the axis of the device 1.

Figure 9:
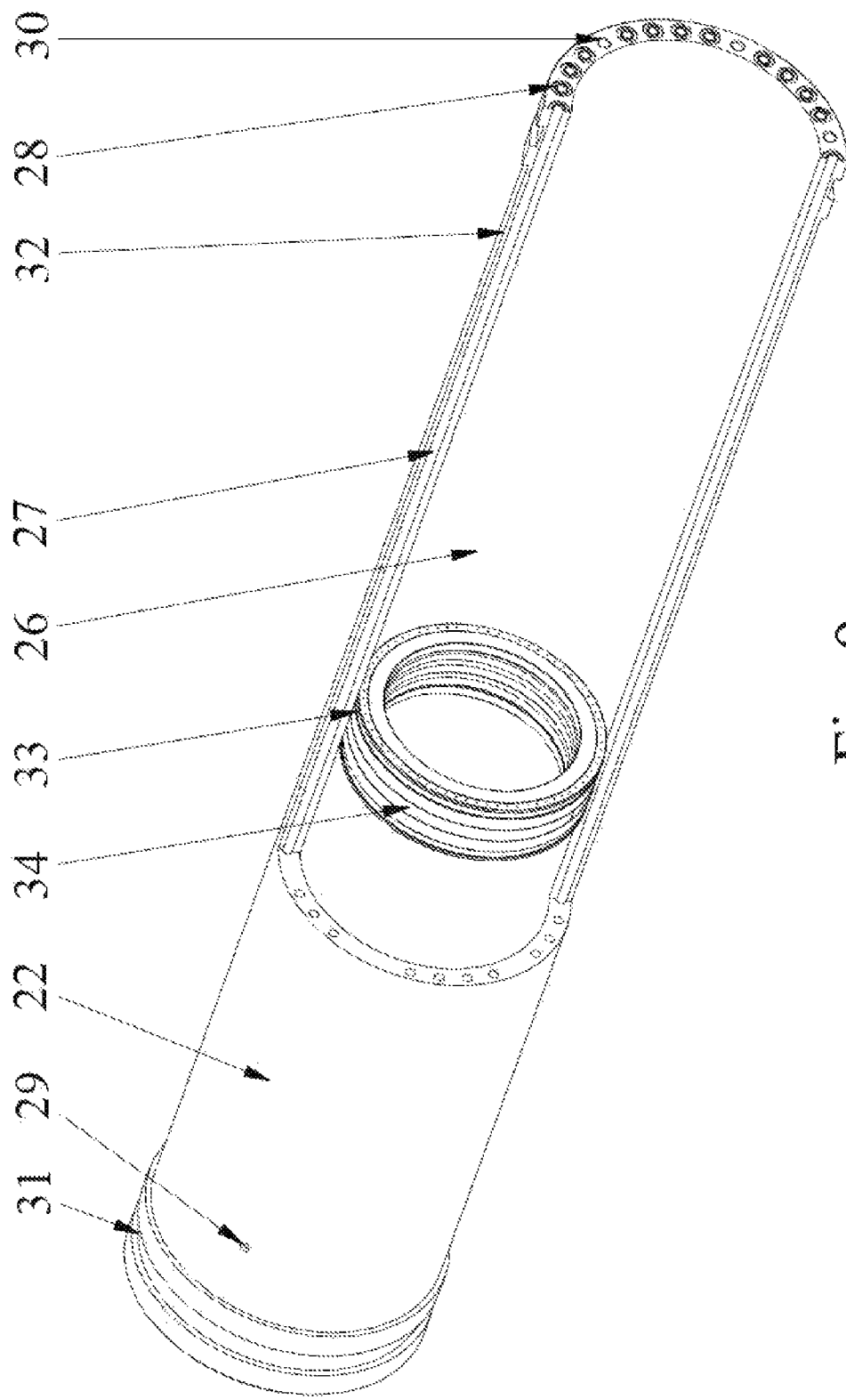
FIG. 9. The sealing unit casing design.

FIG. 9 shows the casing 22 of the sealing unit 10. The casing 22 has a honed cylindrical inner surface 26. There are longitudinal channels 22 in the wall of the casing 22. On both ends of the cylindrical casing 22, there are annular grooves 28 for annular seals of O-ring type around the outlets of all channels 27. The casing 22 has a blind hole 29 on the external surface of the casing 22. There are also threaded fastening openings 30 on both ends of the casing 22. There are annular grooves 31 on the outer surface of the casing 22 at both ends, these grooves 31 are designed for fixation and ensuring tightness of the connection between the elastic sleeve 17 and the casing 22. On the outer surface of the casing 22, there is a cylindrical groove 32, which occupies the most of its area. This groove 32 is designed for the installation of the film heater 23 (FIG. 7). An annular cavity separator 33 of the compound components dosing unit is mounted in the cavity of the casing 22 on its inner surface 26 by means of press fit method with cooling of the gripped part in liquid nitrogen. There is a groove 34 on the outer cylindrical surface of the cavity separator 33. After the cavity separator 33 is mounted, the groove 34 with the inner surface 26 of the casing 22 creates a closed annular space. At the stage of production of the casing 22, this closed annular space is filled with compound through the technological holes (not shown in the drawing), and then the compound is polymerized. This guarantees a tight connection between the cavity separator 33 and the casing 22.

Figure 10:
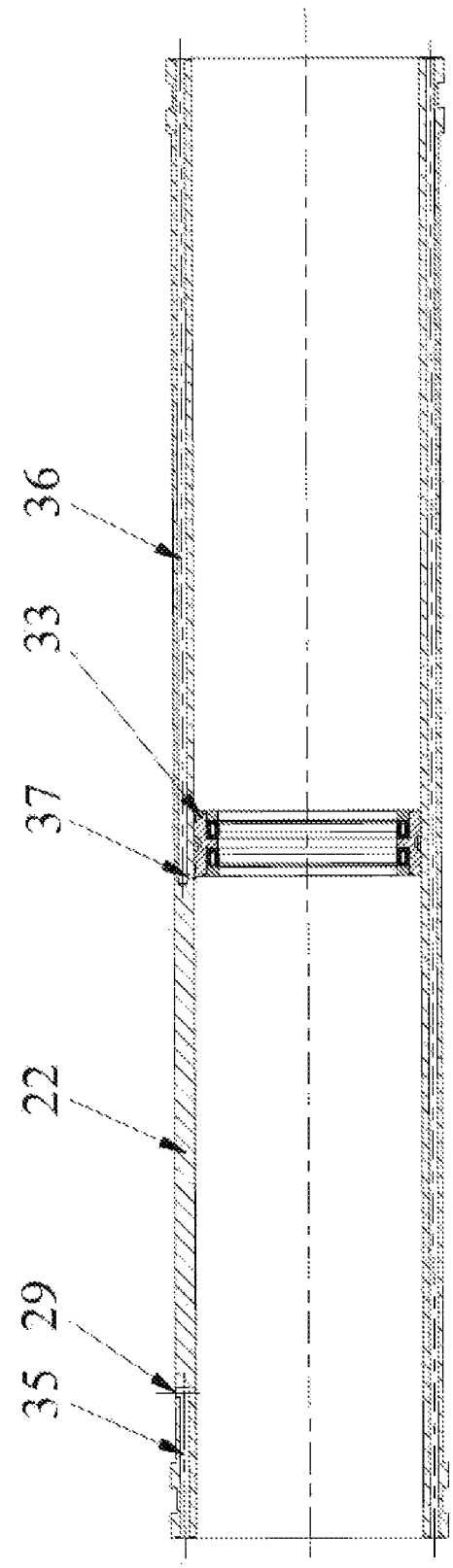
FIG. 10. Axial section of the sealing unit casing along the plane passing through the axis of a radial hole on its outer surface.

FIG. 10 illustrates a longitudinal section of the casing 22 along the plane passing through its axis and an axis of a radial opening 29 (FIG. 9). The radial opening 29 (FIG. 10) is connected on one side with a blind longitudinal channel 35 created in the casing 22, while it extends to the outer surface of the casing 22 on the other side. At the opposite end of the casing 22, there is a longitudinal channel 36 connected with a radial channel 37 that goes on the inner surface of the casing 22 directly at the end wall of the cavity separator 33 of the compound components dosing unit. Such layout enables using the walls of the casing 22 to the fullest extent possible in order to create through longitudinal channels 27 (FIG. 9) inside.

Figure 11:
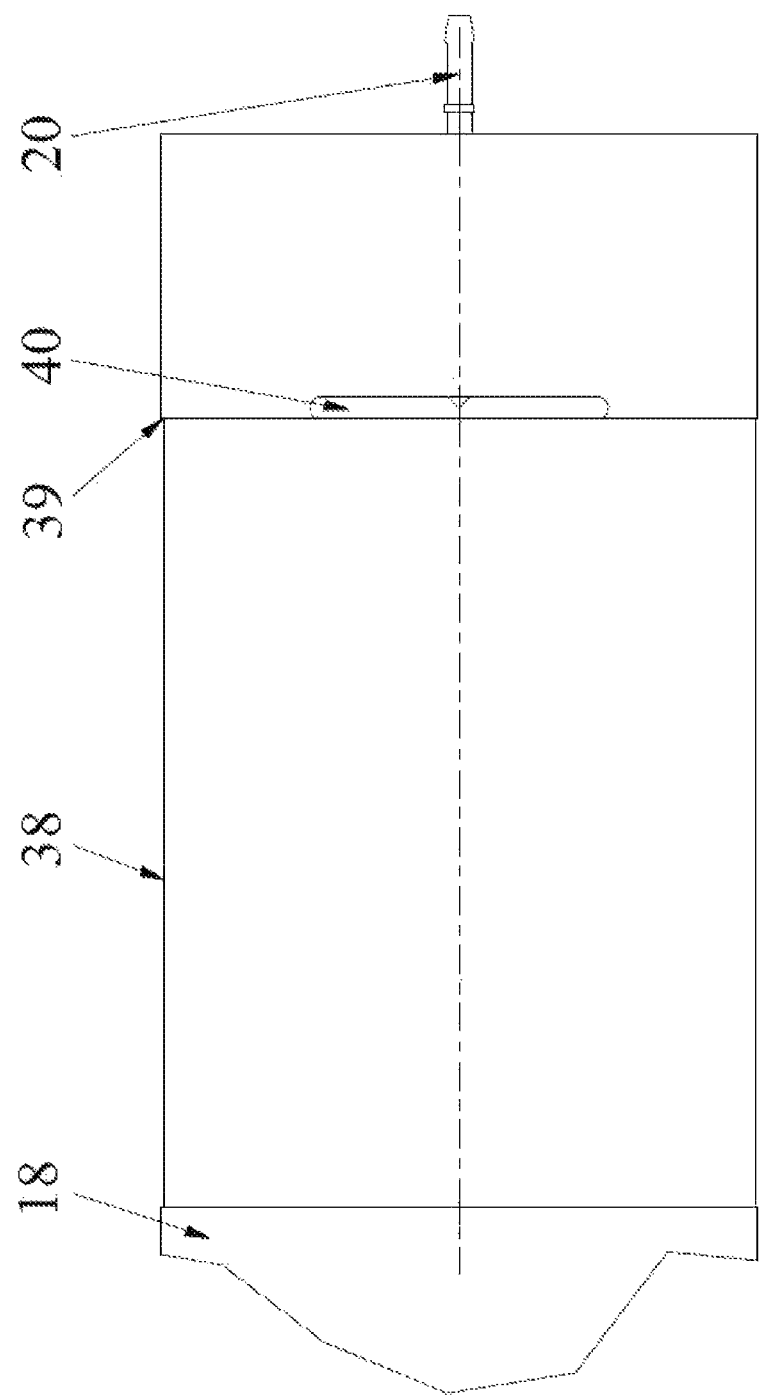
FIG. 11. Appearance of the elastic shell with bedding for the protective bushing.

FIG. 11 shows an image of the elastic shell 18 external surface fragment from the side of the airtight inlets 20, 21. There is a bedding 38 on the outer surface of the elastic shell 18, it is made in the shape of a cylindrical recess with the length equal to the length of the protective bushing 16 with side stoppers 39. The bedding 38 is designed for placement of the protective bushing 16 (FIG. 5) on it. The side stoppers 39 (FIG. 11) limit the protective bushing 16 (FIG. 5) from the axial displacement in the elastic shell 18. There is an arc-shaped transverse groove 40 (FIG. 11) next to the bedding 38 directly near an edge of the stopper 39.

Figure 12:
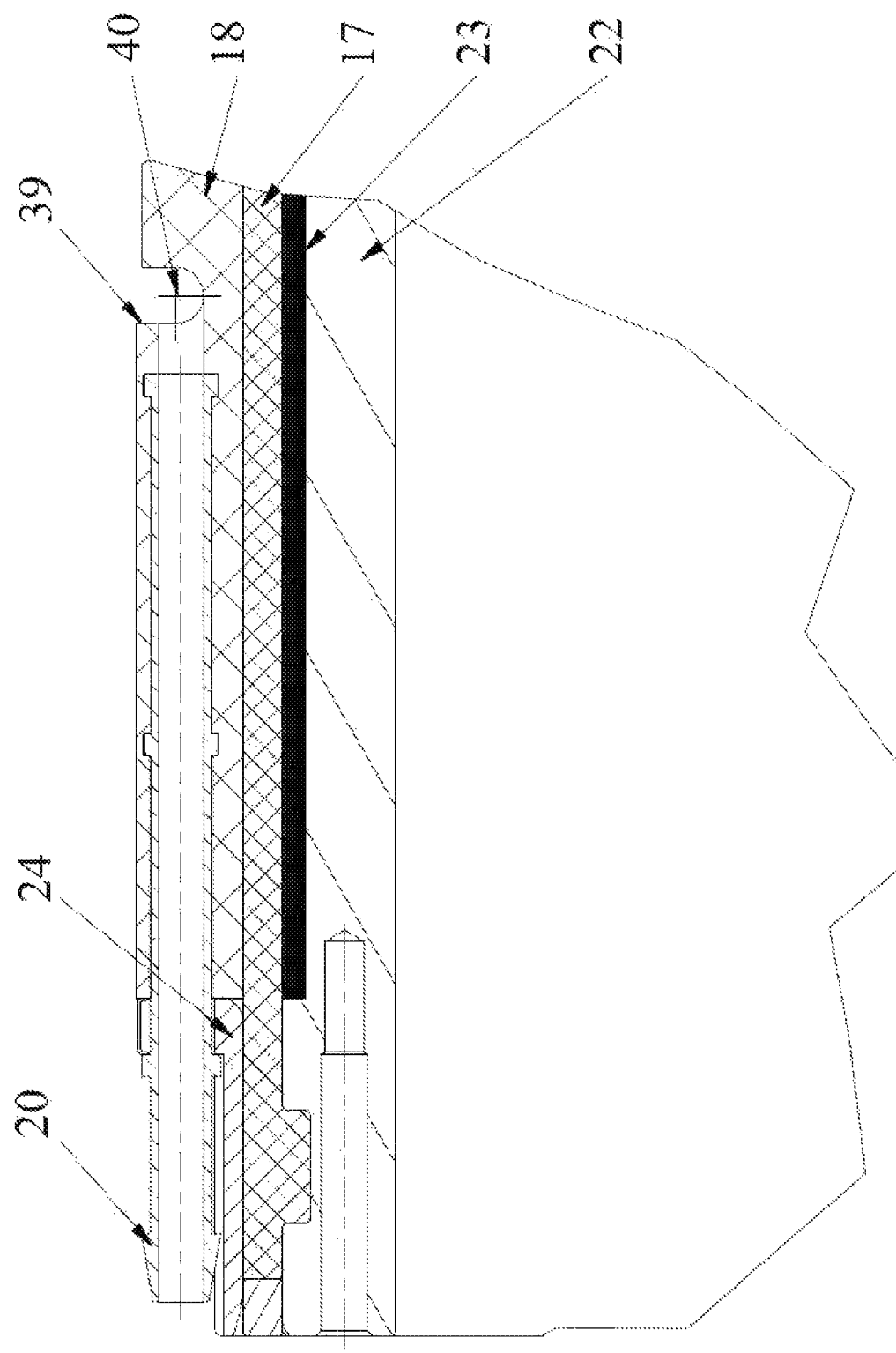
FIG. 12. Local section of the sealing unit along the plane passing through the axis of the channel for feeding compound into the welded annular space and the axis of the channel for gas evacuation from the mentioned space.

FIG. 12 shows a fragment of the longitudinal section of the sealing unit 10 on the sealed inlet 20 side. The transverse groove 40 is connected to the airtight input channel 20. The elastic shell 18 is designed similarly on the side of the airtight inlet 21. The design of the sealing unit 10 provides a reliable connection of the channels of airtight inlets 20 and 21 with the cavity of the annular space 19 (FIG. 5) in the welded joint area. FIG. 12 also explains the design solution for sealing the connection between the elastic sleeve 17 and the casing 22 of the seal assembly 10. The fixation bushing 24 tightly presses the elastic sleeve 17 to the casing 22 of the sealing unit 10. The fixation bushing 24 prevents the elastic shell 18 from shifting in the axial direction toward the location of the airtight inlets 20 and 21. The film heater 23 of the suggested device 1 provides continuous heating to a preset temperature of the elastic sleeve 17 and the elastic shell 18 with integrated airtight inlets 20 and 21.

Figure 13:
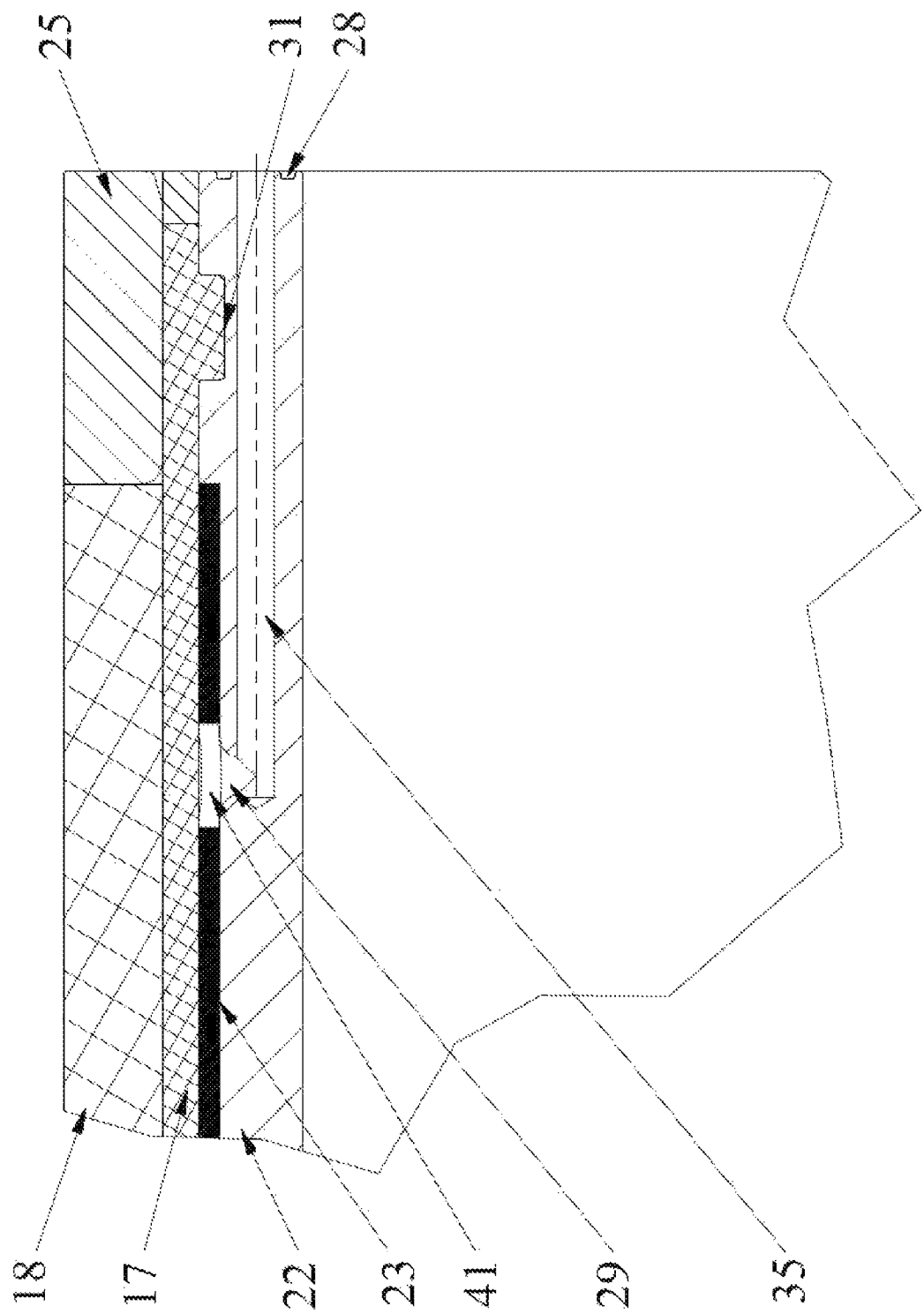
FIG. 13. Local section of the sealing unit casing along the plane passing through the axis of a radial hole on its outer surface.

FIG. 13 illustrates a fragment of a longitudinal section of the sealing unit 10 on the side opposite to the location of airtight inlets 20 and 21 on a plane that passes through the axes of a radial opening 29 and a channel 35 (FIG. 10). The fixation and sealing of the elastic sleeve 17 on the casing 22 of the sealing unit 10 is made in the same way as its opposite side. The profiled end of the elastic sleeve 17 is installed in the annular groove 31 of the casing 22. The fixation bushing 25 presses the elastic sleeve 17 to the casing 22 of the sealing unit 10. This provides a guaranteed tightness of the connection and fixation of the elastic sleeve 17. The fixation bushing 25 prevents axial displacement of the elastic shell 18 to the side opposite to the location of the airtight inlets 20 and 21. The film heater 23 mounted on the casing 22 contains a pass-through opening 41. The film heater 23 is adhered so that its opening 41 is coaxial to the radial opening 29 in the casing 22 and remains in place during operation. This way, the channel 35 on one side extends to the face of the casing 22 of the sealing unit 10. On the other side, the channel 35 is connected to the radial opening 29 in the casing 22 and through the opening 41 in the film heater 23 is connected to the closed airtight circuit made up by the elastic sleeve 17 and the outer surface of the casing 22.

The suggested device is equipped with a built-in dosing unit for compound components of the volumetric piston type. The suggested device in its preferred design is configured in such a way that all its main components also constitute an integral part of the integrated compound dosing unit. This made it possible to reduce the number of parts, detachable joints and static seals to achieve weight reduction and compactness of both the dosing unit itself and the suggested device as a whole, and significantly increase their reliability. The design of the dosing unit for compound components is illustrated by the image shown in FIG. 14. The casing 22 (FIG. 14) of the sealing unit 10 (FIG. 3) serves as both the body of the dosing unit of two-component compound and as a cylinder containing the piston assembly 11. The film heater 23 (FIG. 14) provides continuous temperature control of the compound components dosing unit that allows to operate the suggested device 1 practically under any weather conditions. The integrated cavity separator 33 in the casing 22 is equipped with PTFE rod seals manufactured by Freudenberg Sealing Technologies GmbH & Co. KG. The cavity separator 33 is placed in the center of the inner cavity of the compound components dosing unit and divides it into two equal parts. At the same time, a part of the dosing unit inner cavity located on one side of the cavity separator 33, is designed for dispensing of one component of the compound, and the second part of the dosing unit inner cavity located on the other side of the cavity separator 33, is designed for dispensing of another component of the compound. Both parts of the dosing unit inner cavity are airtight. The end face of the compound feeding unit 12 that faces the cavity separator 33 is at the same time the front cover of the compound components dosing unit. On the opposite side, the inner cavity of the compound components dosing unit is confined by the pneumatic automation unit 13. The end surface of the pneumatic automation unit 13 that faces the side of the cavity separator 33 is at the same time the rear cover of the compound components dosing unit that has a hard-mounted position sensor 42 of the piston assembly 11. The piston assembly 11 is equipped with a high-precision non-contact magnetostrictive linear position sensor Temposonics MH series manufactured by MTS Sensor Technologie GmbH & Co. KG.

The inner cavity of the compound components dosing unit is separated into two parts and connected to three channels. The first channel 43 (FIG. 14) connects the compound feeding unit 12 with the adjacent part of an inner cavity of the compound components dosing unit. The second channel 44 (FIG. 15) joins the second part of the inner cavity of the compound components dosing unit with the pneumatic automation unit 13. The third channel 37 (FIG. 10) in the casing 22 (FIG. 14), located directly at the end face of the cavity separator 33 on the side that faces the pneumatic automation unit 13, connects the second part of the inner cavity of the dosing unit with a channel 36 (FIG. 10) that extends to the end face 22 (FIG. 8) of the sealing unit 10.

The piston assembly 11 (FIG. 14) has two pistons and a rod. The design of the piston assembly is explained in the image presented in FIG. 16. The first piston 45 is firmly connected to the second piston 46 by the rod 47. This first piston 45 and rod 47 are designed as a monolithic unit, which significantly reduces the risk of leaks and mixing of the two components of the compound in the dosing unit inner cavity. This facilitates operation and greatly increases the compound components dosing unit reliability. To make it possible to mount the piston assembly 11 in the inner cavity of the dosing unit, the second piston 46 is designed as a removable bolted assembly. The rod 47 has a blind axial channel 48 connected to radial channels 49, the outputs of these channels are located on the surface of the rod 47 directly at the lateral surface of the first piston 45. On the end of the rod 47 (FIG. 16), there is a bolted assembly of the magnet 50 of the sensor 42 for the position of the piston assembly 11 (FIG. 14) produced by MTS Sensor Technologie GmbH & Co. KG. The pistons 45 and 46 are equipped with PTFE seals manufactured by Freudenberg Sealing Technologies GmbH & Co. KG.

Figure 14:
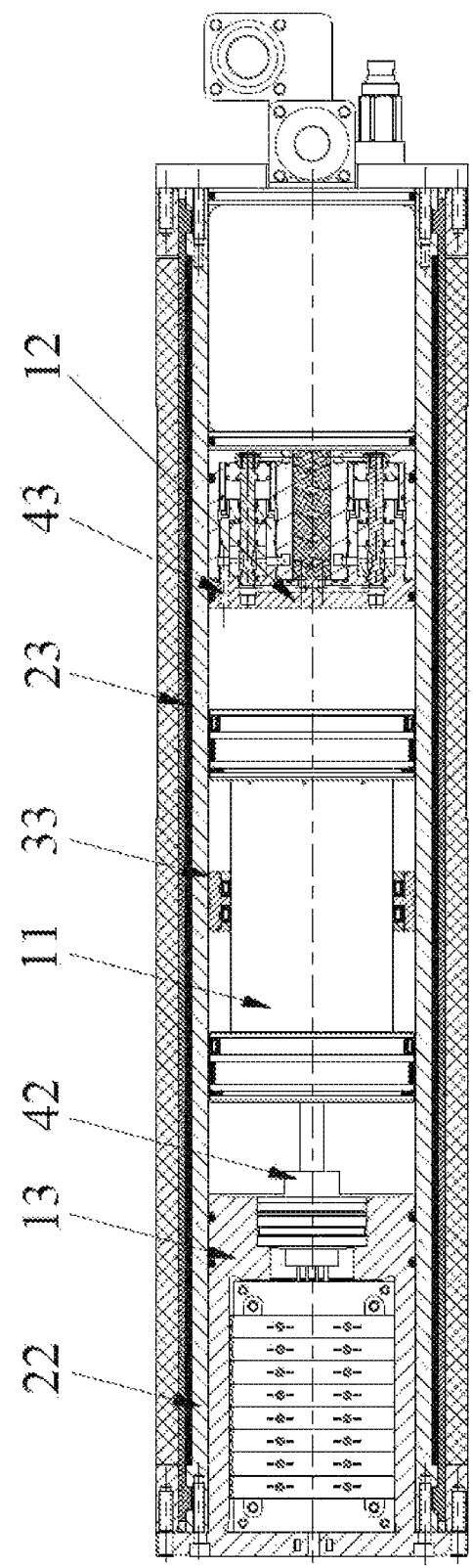
FIG. 14. Axial section of the suggested device assembly in a horizontal plane.
Figure 16:
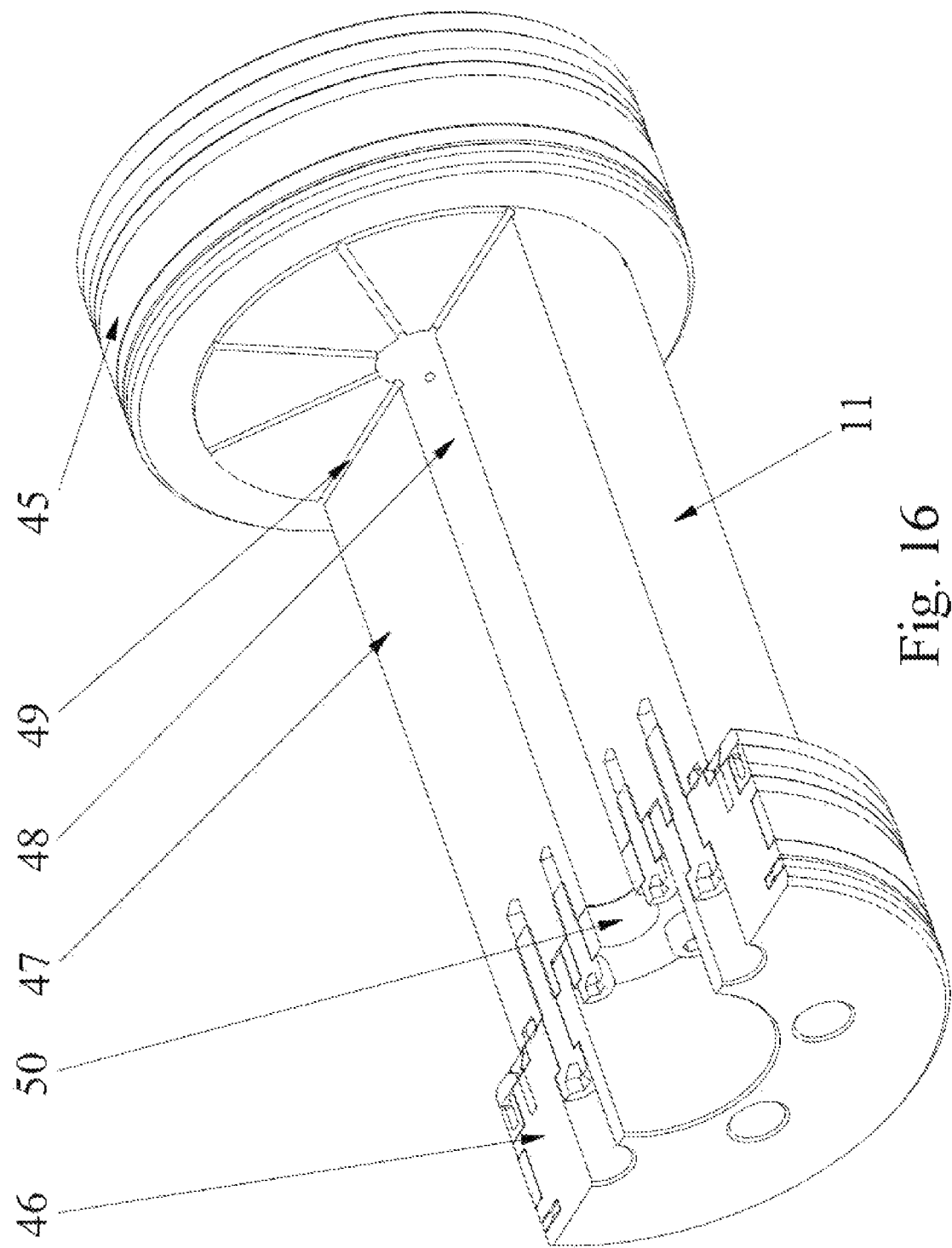
FIG. 16. Axonometric view of the piston assembly of the compound components dosing unit with a cutout.

The installation of the piston assembly 11 is conducted as follows. Before installing the piston assembly 11 (FIG. 14), the compound components unit 12 and pneumatic automation unit 13 should be removed from the casing 22 of the sealing unit 10. The piston 46 is removed from the piston assembly 11 (FIG. 16). Rod seals are mounted on the cavity separator 33 (FIG. 14). Piston seals are installed on pistons 45 and 46 (FIG. 16). The piston assembly 11 is inserted into the cavity of the casing 22 (FIG. 14) on the mounting side of the compound feeding unit 12 with the rod 47 inserted forward. Then, the second piston 46 is inserted into the inner cavity of the casing 22 from the side of the pneumatic automation unit 13 fitting; then its installation is completed. The position sensor 42 of the piston assembly 11 is installed on the pneumatic automation unit 13. When assembled, the pneumatic automation unit 13 is inserted into the cavity of the casing 22, pushed to the stop and secured by bolting. The compound feeding unit 12 is assembled.

Figure 17:
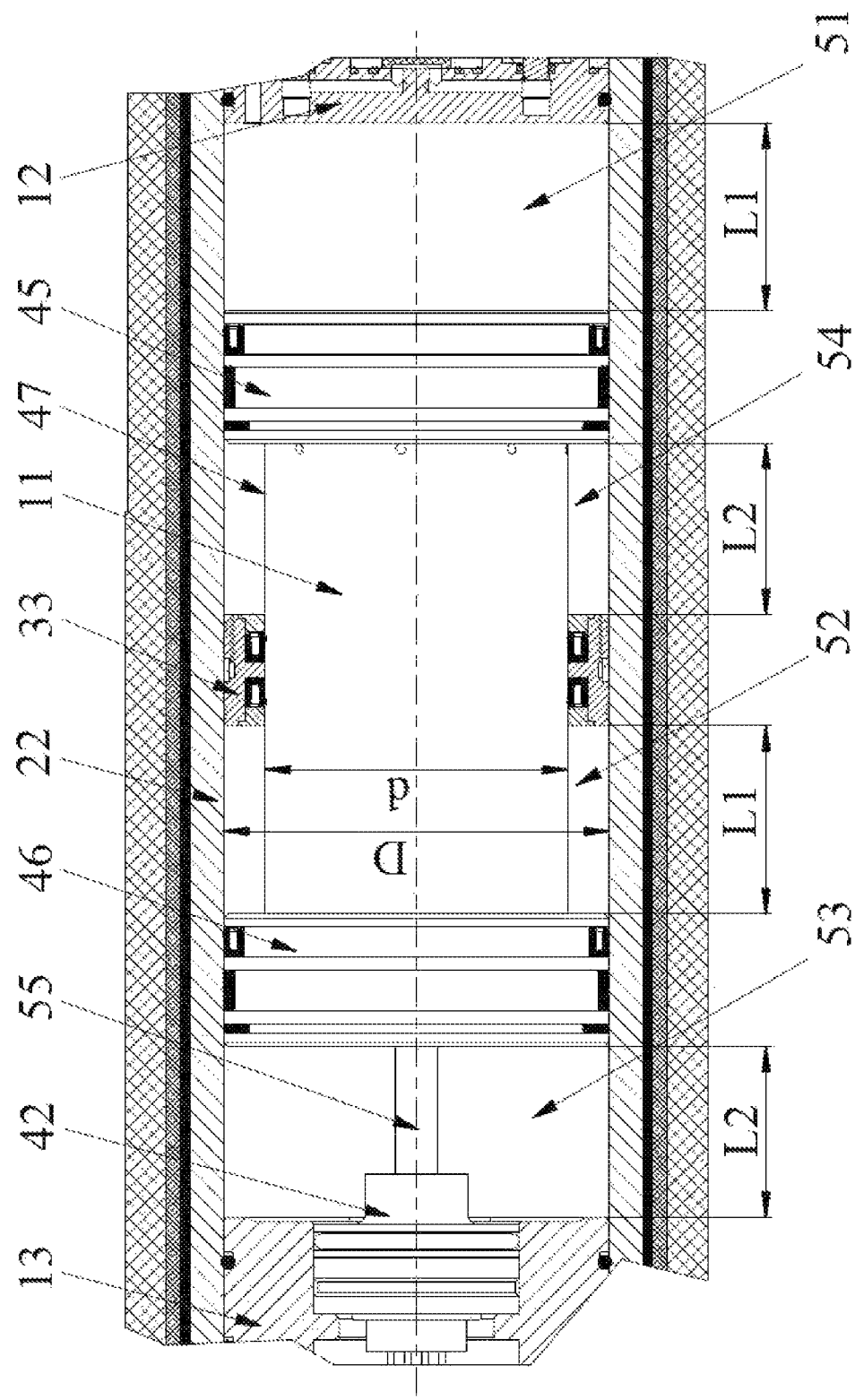
FIG. 17. Scheme of the compound components dosing unit in the piston assembly intermediate position during impregnation of the annular space in the welded joint area.
Figure 18:
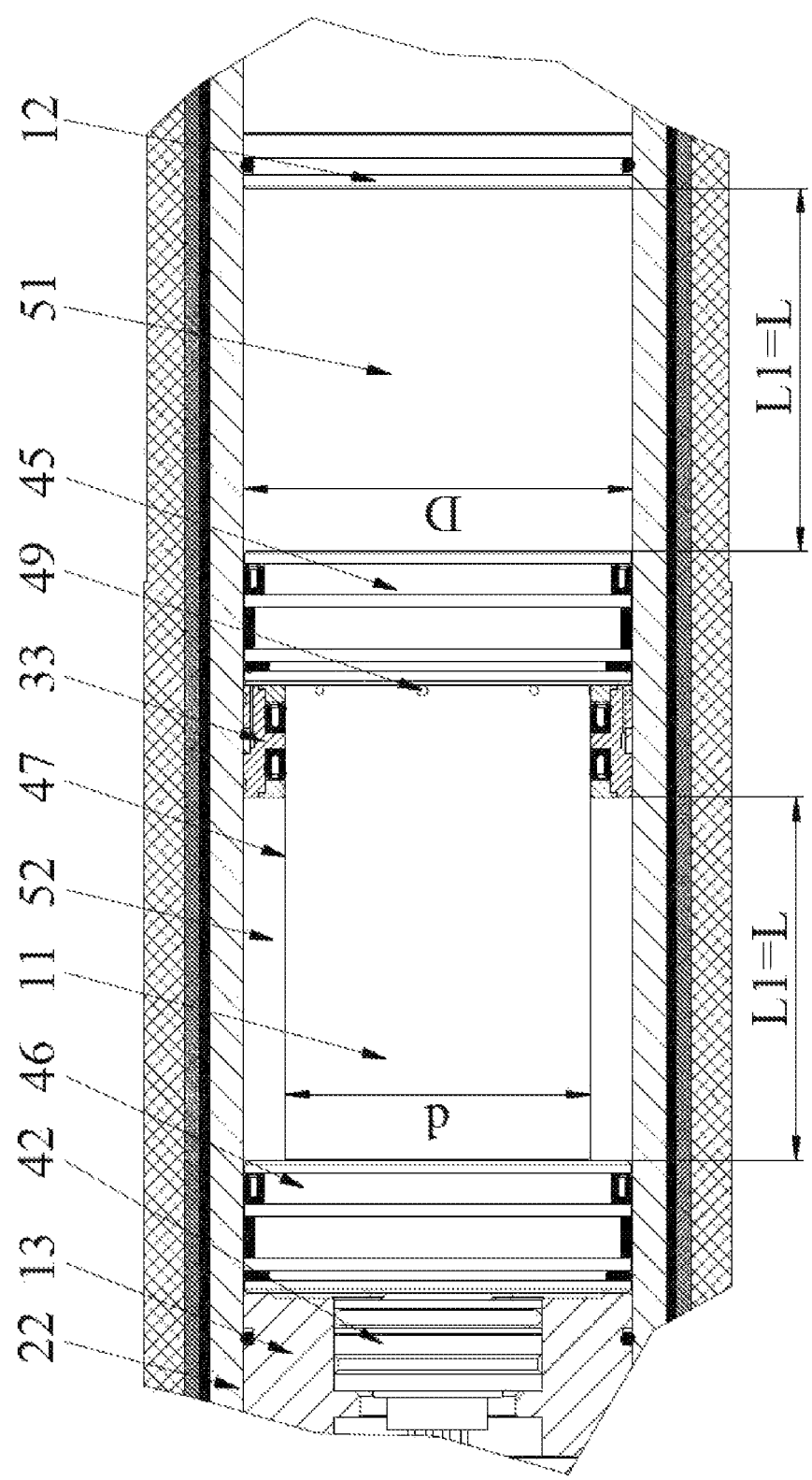
FIG. 18. Scheme of the compound components dosing unit in the initial position of the piston assembly ready for impregnation of the annular space in the welded joint area.
Figure 19:
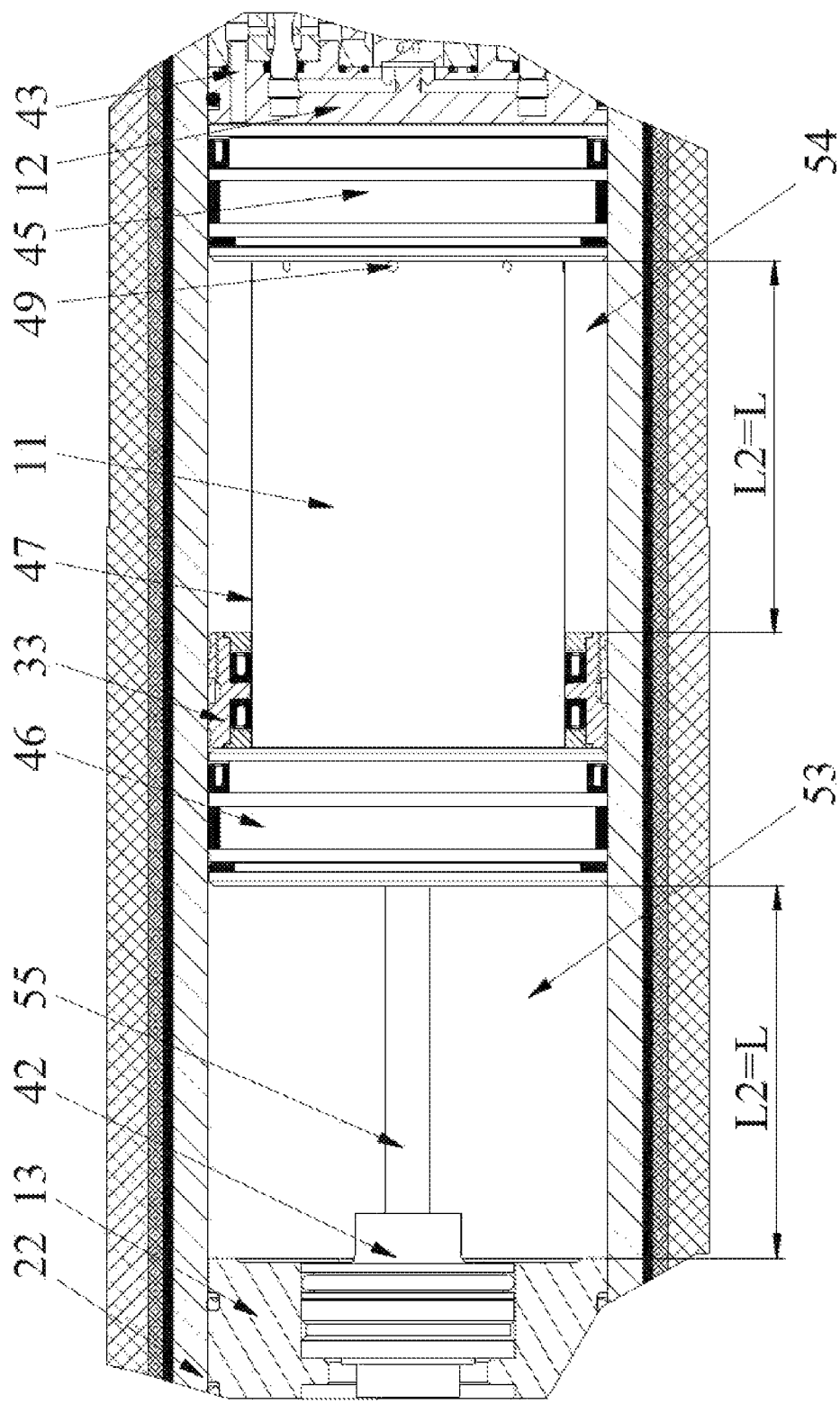
FIG. 19. Scheme of the compound components dosing unit after completion of the annular space impregnation in the welded joint area.

The principle of operation of the dosing unit of the components of the compound and the fundamentals to determine its geometric parameters are explained by three diagrams shown in FIG. 17, FIG. 18 and FIG. 19.

The main function of the dosing unit is to synchronously dispense the two components of the compound in proportions strictly in accordance with the proportions specified by the compound manufacturer. The second most important function of the dosing unit is to deliver the compound components to the point of the pipeline welded joint insulation in sufficient volume to ensure a full cycle of operation.

The dosing should correspond to the volume. FIG. 17 illustrates a diagram of the compound components dosing unit with the piston assembly 11 in an intermediate operating position. The intermediate position of the piston assembly 11 is described by two parameters: the stroke length reserve L1 and the travel distance L2 (FIG. 17). For both parts of the dosing unit inner cavity separated by the cavity separator 33 (FIG. 17), the values of the stroke length reserve L1 and the travel distance L2 correspond to each other. The dosing unit cavity enclosed between the compound feeding unit 12 (FIG. 17), the first piston 45 and the walls of the casing 22, is called the piston operating cavity 51. Said cavity 51 is designed to be filled with the first component of the compound with a higher proportional value by volume, as specified by the manufacturer of the two-component compound. The channel 43 (FIG. 14) extends into the piston operating cavity 51. The dosing unit cavity enclosed between the cavity separator 33, second piston 46, rod 47 and walls of the casing 22 is called the rod operating cavity 52. The second component of the compound, which has a smaller proportional value by volume, specified by the manufacturer of the two-component compound, is filled into the rod operating cavity 52 of the dosing unit. The channel 37 (FIG. 10) goes into the rod operating cavity 52.

Figure 15:
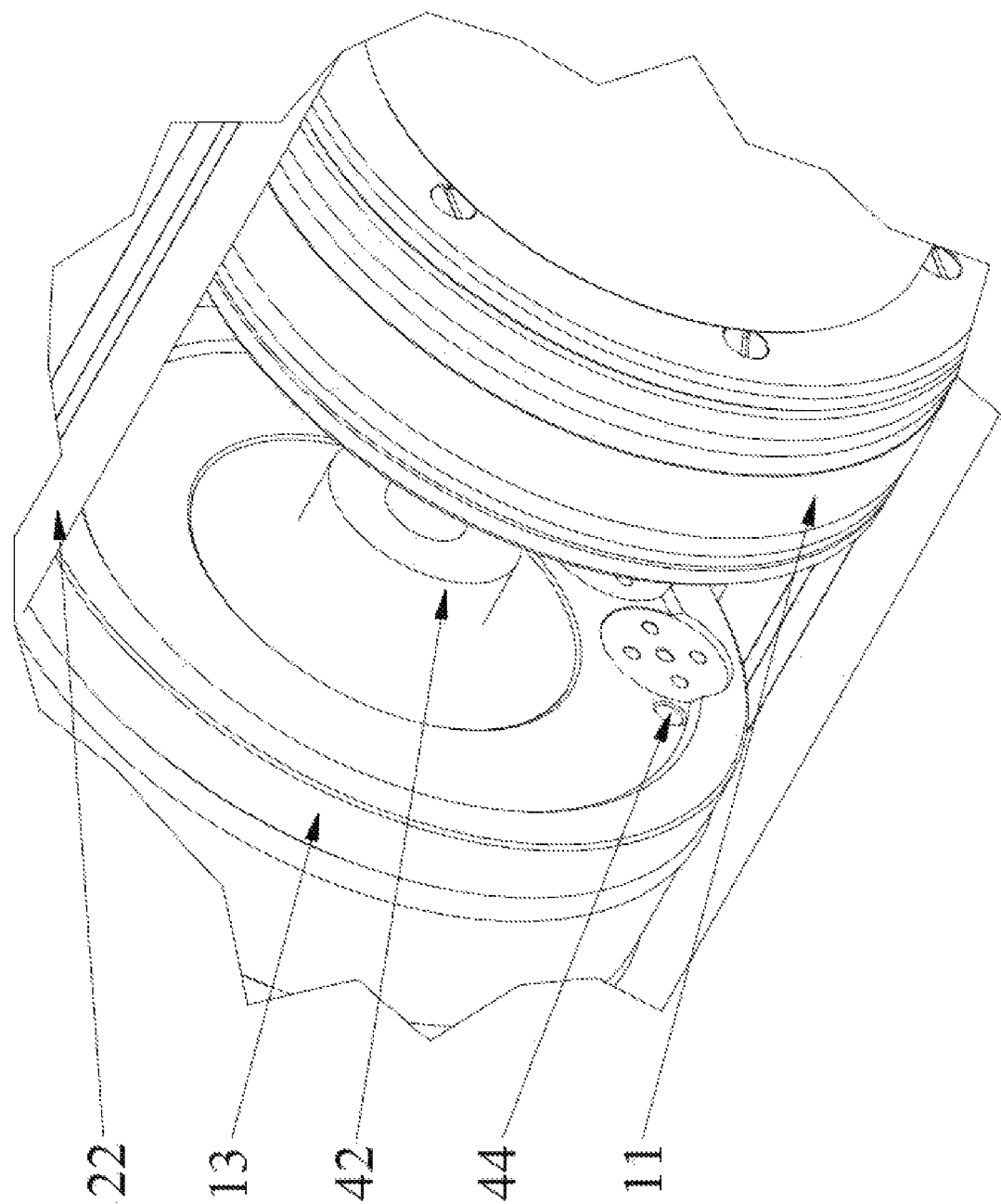
FIG. 15. Axonometric view of the drive piston cavity of the compound components dosing unit.

The dosing unit cavity enclosed between the pneumatic automation unit 13, the second piston 46 and the walls of the casing 22 is called the piston drive cavity 53 of the dosing unit. Compressed air is pumped into this cavity through the channel 44 (FIG. 15). The dosing unit cavity enclosed between the cavity divider 33, first piston 45, rod 47 and walls of the casing 22 is called the rod drive cavity 54 of the dosing unit. The piston drive cavity 53 and the rod drive cavity 54 are connected to each other by an axial channel 48 and radial channels 49 in the rod 47 (FIG. 16). When compressed air is pressurized into the piston drive cavity 53, the pressure in the rod drive cavity 53 increases synchronously. This rules out possible underpressure in the rod drive cavity 54 and significantly increases the total force of action of compressed air on the piston assembly 11 and, accordingly, the pressure in the operating cavities 51 and 52 of the dosing unit.

In the course of operation of the suggested device the position of the dosing unit piston assembly 11 is continuously monitored by a sensor 42 equipped with a sensing element located in the discharge tube 55 (FIG. 17). When the piston assembly 11 displaces, the magnet 50 (FIG. 16) of the sensor 42 (FIG. 17) travels coaxially along the axis of the injection tube 55, and the sensing element 42 inside it generates a corresponding signal. The signal is processed by the electronic unit of the sensor 42, so the location of the piston assembly 11 (FIG. 14) is determined. The diameter and depth of the axial channel 48 in the rod 47 (FIG. 16) are made in accordance with the requirements of the manufacturer of the piston assembly position sensor 42.

Compound components dosing unit has three basic geometric parameters: diameter D of pistons 45, 46, piston assembly 11 (FIG. 17, 18, 19); diameter d of the rod 47 of the piston assembly 11 (FIG. 17, 18, 19); length L of the full stroke of the piston assembly 11 (FIGS. 18, 19).

The diameter D of pistons 45, 46 is assumed to be equal to the diameter of the inner opening of the sealing unit 10 of the casing 22 (FIG. 7). The diameter d of the rod 47 of the piston assembly 11 is computed according to the ratio of the two compound components dispensing. The main parameter of the dosing unit is the numerical value of the volumetric proportional ratio of dosing of the compound components. A deviation of this parameter from the set value entails a decrease in the quality of the polymerizing compound until it becomes completely unusable. The proportional ratio of the operating area of the rod operating cavity 52 of the dosing unit to the working area of the piston operating cavity 51 of the dosing unit must be equal to the respective volume ratio of the lower volume fraction compound component to the higher volume fraction compound component, as specified by the compound producer. As the first piston 45 and the second piston 46 are tightly connected by one rod 47 (FIG. 17), the stroke of the piston assembly 11 does not affect the dosing unit proportional volume ratio.

The second critical parameter of the dosing unit is its total capacity or the total volume of the two compound components fit into the total piston operating cavity 51 (FIG. 18) and the total rod operating cavity 52 of the dosing unit when it is completely filled. In this position of the piston assembly 11, the length of the stroke reserve L1 is equal to the length L of the full working stroke of the piston assembly 11. The minimum length L of the full stroke (FIG. 19) of the piston assembly 11 is calculated so that at full discharge of the piston and rod operating cavities 51 and 52 of the dosing unit, at the end of the impregnation stage (at L2=L), a partial discharge of the compound from the annular space 19 through a sealed inlet 20 (FIG. 5) can be at least reached to evacuate air from the annular space 19 in the area of the welded joint 15. In order to calculate the minimum full stroke length of the piston assembly 11, the compound consumption required to fill the cavities and channels of the device at the beginning of the technological cycle of impregnation of the annular space 19 in the area of the welded joint 15 must also be taken into account. Moreover, it is necessary to consider the consumption of the compound that is forcibly removed at the initial stage of impregnation due to its low-quality components, due to the inertia of the static mixer output to a steady mode of the compound components mixing.

When the compound components dosing unit is produced with a length L of the full stroke of the piston assembly 11 less than the minimum allowable value, the quality isolation of the welded joint 15 of the pipeline 14 cannot be guaranteed. At the same time, the extremely excessive length L of the full stroke of the piston assembly 11 leads to an increase in weight and size properties of the dosing unit and the device in general.

To conduct an experiment, we chose a two-component polyurethane produced by Covestro, which consists of two components:
1) Isocyanate B9 M10 with a mixing volume fraction 38.5;
2) Polyol CG9 9008 75 MF with a mixing volume fraction 100.

The inner diameter of the sealing unit 10 casing 22 is taken as 90 mm. The diameter of pistons 45, 46 was taken equal to the inner diameter of the casing 22. The rod diameter 47 was computed according to the required rod-to-piston operating area ratio equal to 0.385 (or 38.5:100). The rod 47 diameter was taken as 70.58 mm. The rod seals were fabricated according to a custom order. Tolerable inaccuracy in dosing the compound components must not exceed 1%. The estimated dosing inaccuracy for the suggested device is less than 0.0012%. The actual dosing inaccuracy for the suggested device depends only on the manufacturing accuracy of the piston assembly 11 and was 0.066%, which is much less than the permissible value. The length L of the full operating stroke of the test sample is taken to be 85 mm. The full capacity of the dosing unit is 0,748 liters.

Figure 20:
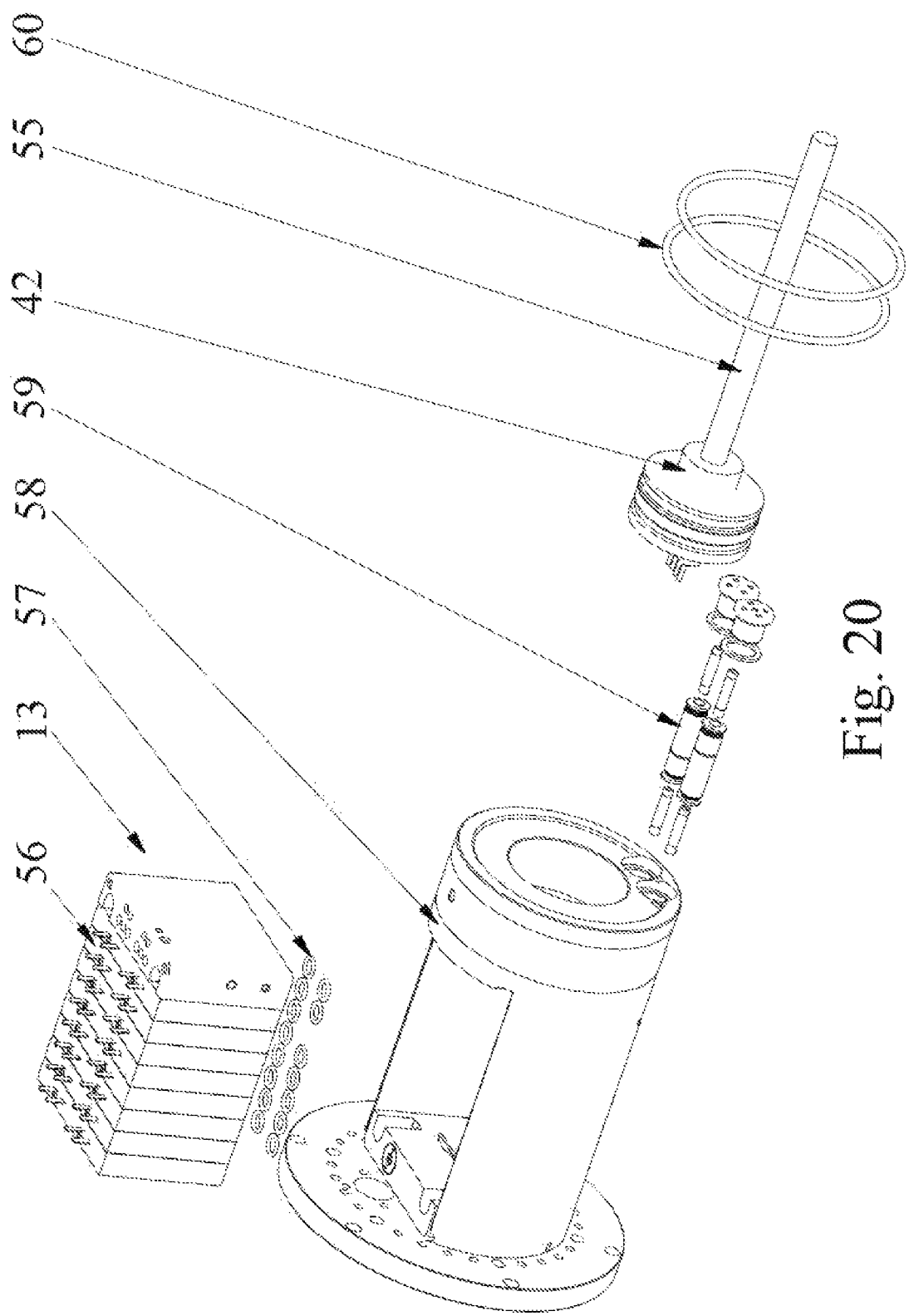
FIG. 20. Scheme of the pneumatic automation unit assembly/disassembly.
Figure 21:
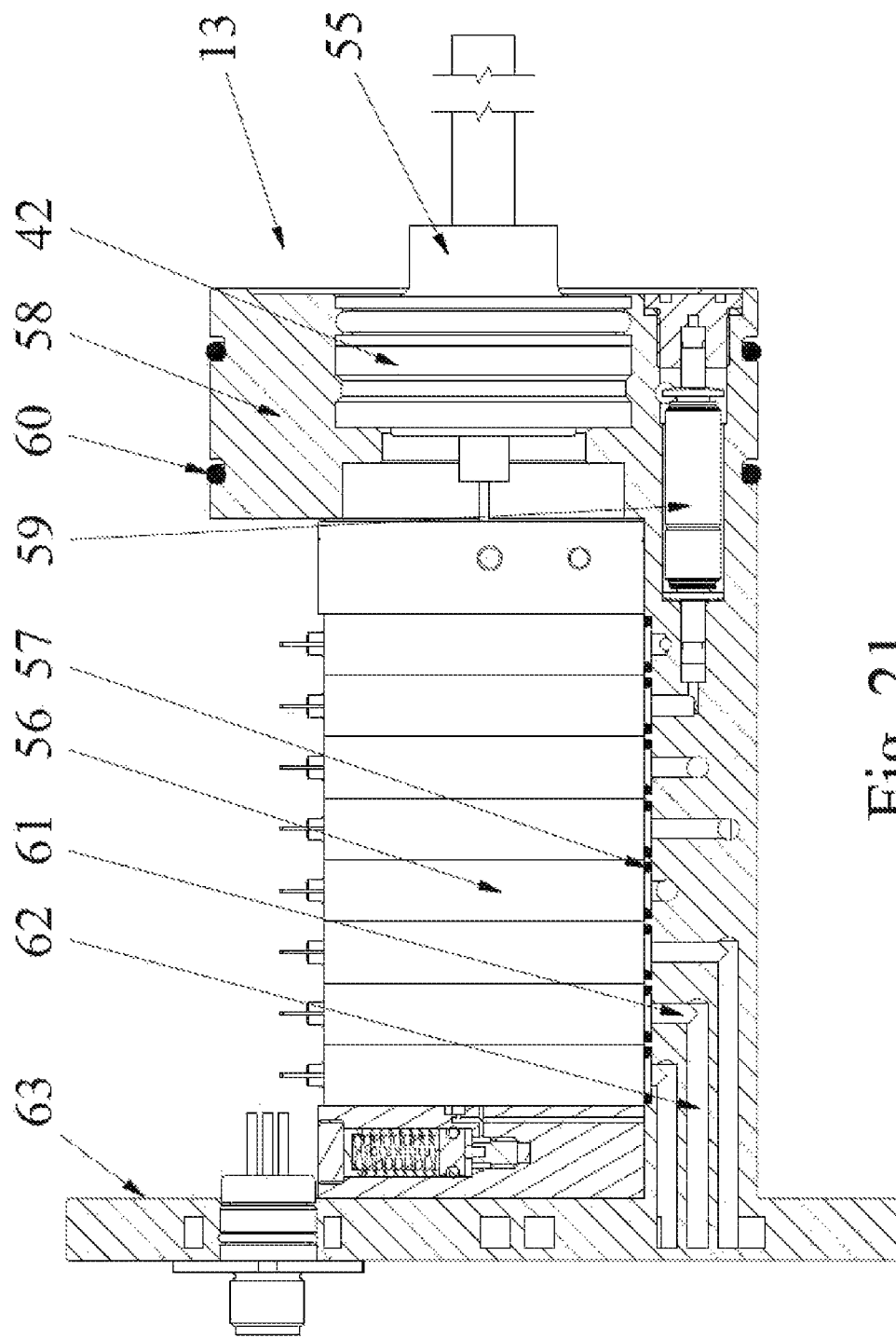
FIG. 21. Axial section of the pneumatic automation unit along the plane passing through the reverse valve axis 59.
Figure 22:
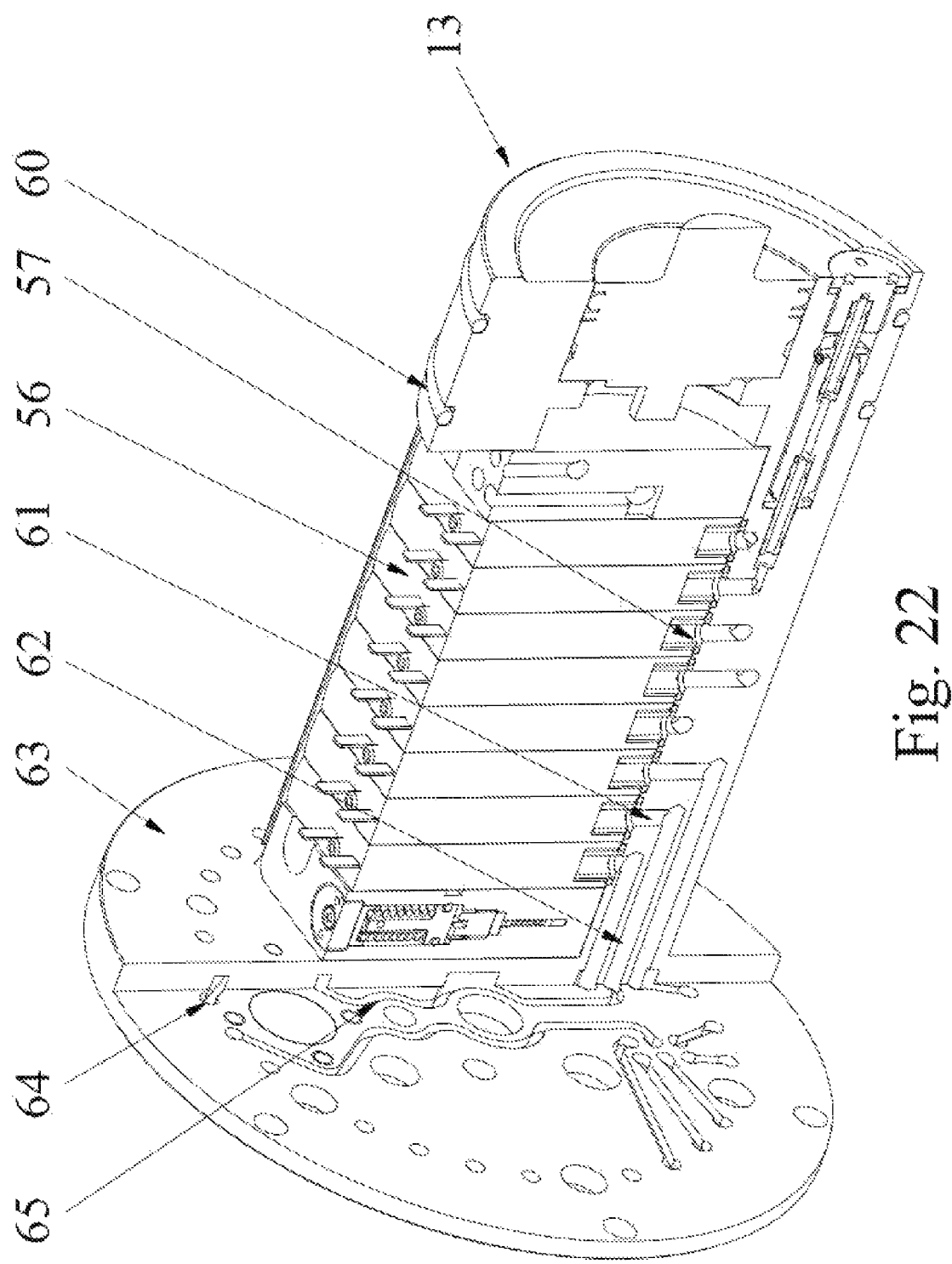
FIG. 22. Axonometric view of the pneumatic automation unit with a cutout.
Figure 23:
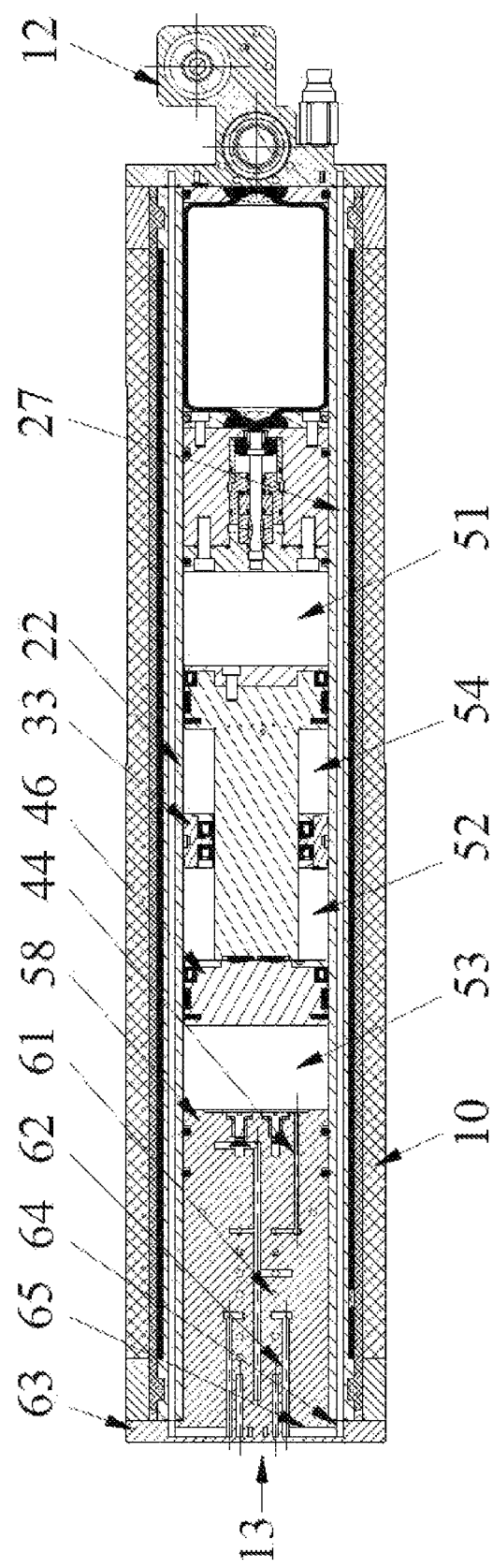
FIG. 23. Frontal section of the suggested device along the plane passing through the channel axis 62 in FIG. 22.

FIG. 20 shows the pneumatic automation unit 13 assembly/disassembly diagram. The pneumatic automation unit 13 comprises a pneumatic valve island 56, e.g. type 10CPV by Festo, O-Ring seals 57 for the operating channels of the pneumatic valve island 56, casing 58, two reverse pneumatic valves 59, e.g. H-QS-4 type by Festo, and seals 60 for the casing 58. The sensor 42 indicating the position of the piston assembly 11 with the pressure tube 55 is mounted on the end part of the casing 58. The design of the pneumatic automation unit 13 is explained by the images in FIG. 21 and FIG. 22. There are annular grooves that accommodate O-ring seals 57 on the surface of the casing 58 horizontal platform. Sealing of the operating channels of the pneumatic valve island 56 is provided by fastening the pneumatic valve island 56 with mounting bolts to the horizontal platform with the installed O-ring seals 57. Vertical channels 61 are drilled coaxially to the annular grooves in the casing 58; these channels are connected to horizontal channels 62 integrated in the casing 58, which pass through the bottom of the casing 58 to a flange 63. The flange 63 (FIG. 22) has blind openings 64 extending to its surface that faces toward the casing 58 (FIG. 20). The openings 64 are located on a circle with a diameter corresponding to the diameter of a circle of location of the channels 27 (FIG. 9) on the casing 22 of the sealing unit 10. The spacing between the openings 64 on the flange 63 of the pneumatic automation unit 13 corresponds to the spacing of openings 27 (FIG. 9) on the casing 22 of the sealing unit 10. Channels 65 (FIG. 22) made in the flange 63 connect the horizontal channels 62 with the blind openings 64. When the pneumatic automation unit 13 is mounted in the annular grooves 28 (FIG. 9), sealing rings are mounted in the end face of the casing 22 of the sealing unit 10. The pneumatic automation unit 13 is inserted into the cavity of the casing 22 of the sealing unit 10 and pushed to the stop. The openings 64 (FIG. 22) on the casing 58 of the pneumatic automation unit 13 are aligned with the channels 27 (FIG. 9) on the casing 22 of the sealing unit 10. Then the flange 63 (FIG. 22) is fastened to the casing 22 of the sealing unit 10 with bolts at the location of mounting openings 30 (FIG. 9) on the casing 58 of the pneumatic automation unit 13. FIG. 23 represents a section of the suggested device, along a plane passing through axes of the channels 62. So, operating channels of the pneumatic valve island 56 (FIG. 21) are first taken out on the flange 63 (FIG. 23) of the pneumatic automation unit 13, then they are connected to a flange of the compound feeding unit 12 through the channels 27 in the casing 22 of the sealing unit 10.

Figure 24:
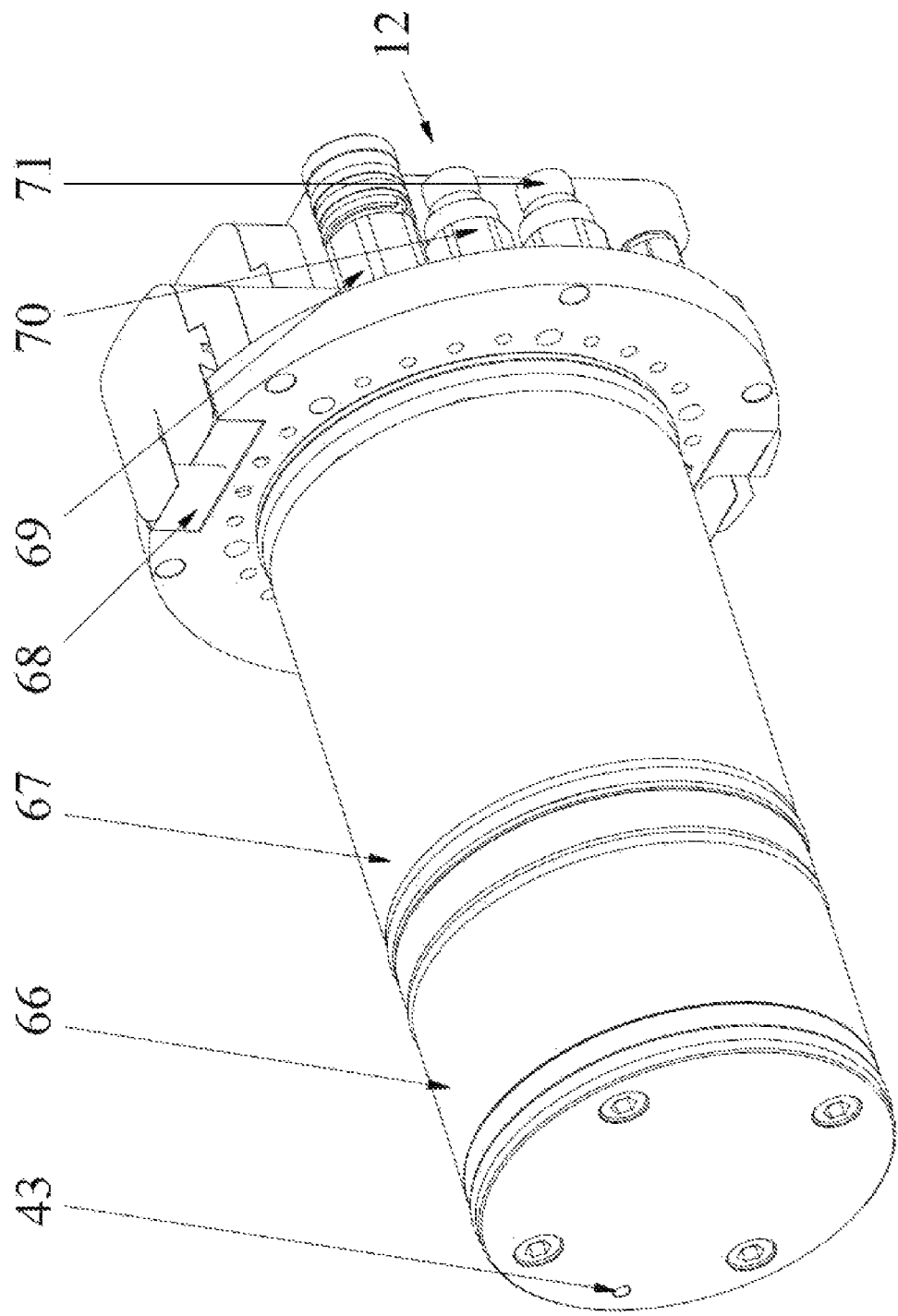
FIG. 24. Axonometric view of the compound feeding unit.
Figure 25:
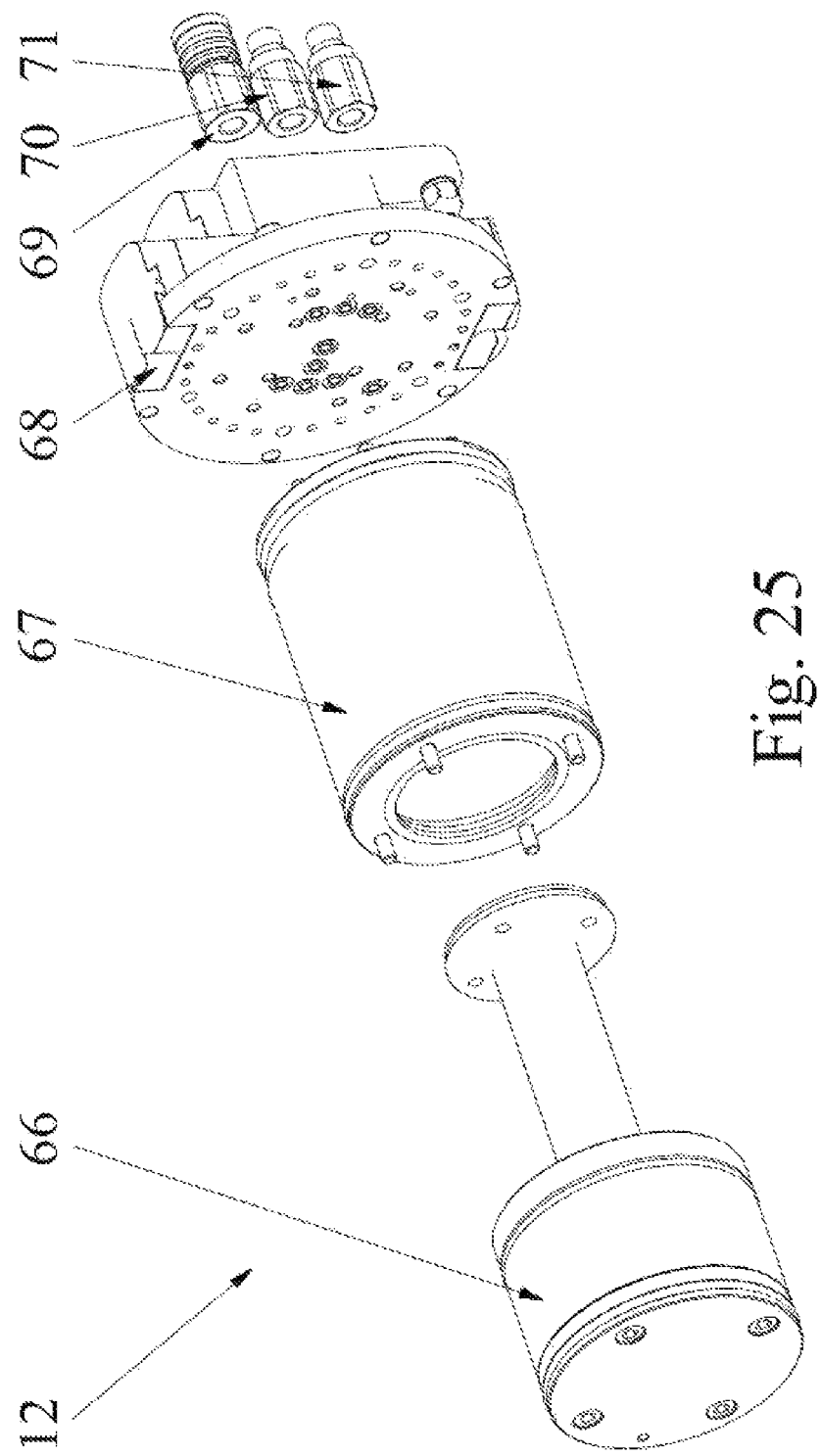
FIG. 25. Scheme of the compound feeding unit assembly/disassembly.

The compound feeding unit 12 (FIG. 6), as one of the main components of the suggested device, is represented in FIG. 24. The compound feeding unit 12 comprises a static mixer with a valve assembly 66 at the inlet (FIG. 24); washing fluid reservoir, preferably as a hydraulic accumulator 67; a flow control unit 68 at the static mixer outlet; and three quick-release couplings 69, 70 and 71. The diagram for the assembly/disassembly of the compound feeding unit 12 is shown in FIG. 25.

Figure 26:
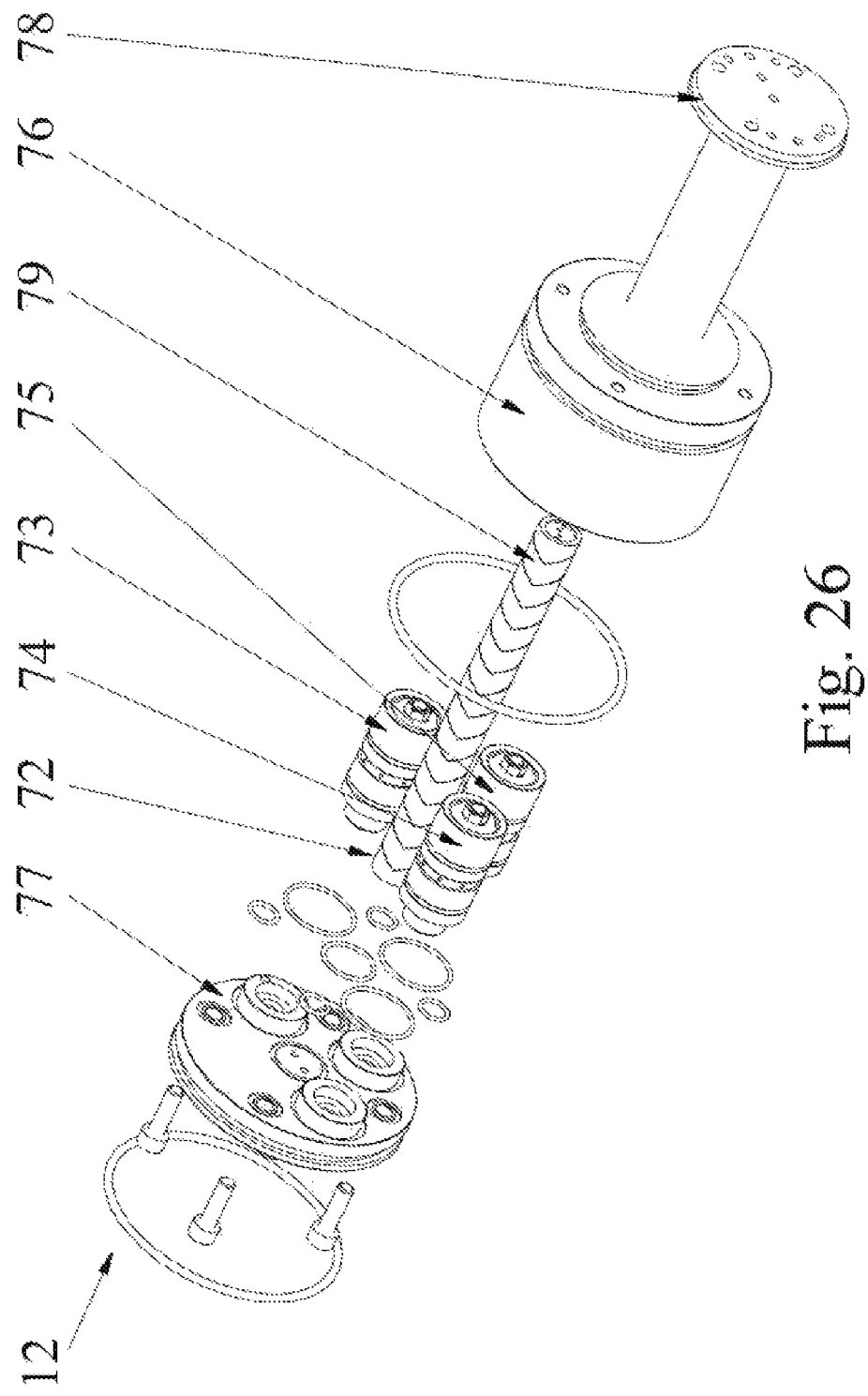
FIG. 26. Scheme for assembly/disassembly of static mixer with the valve assembly at the inlet.

The design and composition of the static mixer with a valve assembly 66 at the inlet is illustrated by the diagram for its assembly/disassembly (FIG. 26). The static mixer with inlet valve assembly 66 comprises: an integral static mixer 72 comprising a set of separate mixing elements made of anti-adhesion material (e.g., fluoroplastic), three spool valves 73, 74 and 75, a casing 76, a cover 77 and a flange 78 integrated with the casing 76. Separate mixing elements 79 are made according to the technical solution described in U.S. Pat. No. 3,583,678. The mixing elements 79 are assembled in the cavity of the casing 76 and pressed by the cover 77. The mixing elements 79 are firmly connected to each other and to the walls of the casing 76. When assembled, the built-in static mixer 72 has no dead spots. The static mixer 72 is easy to disassemble and rinse.

Figure 27:
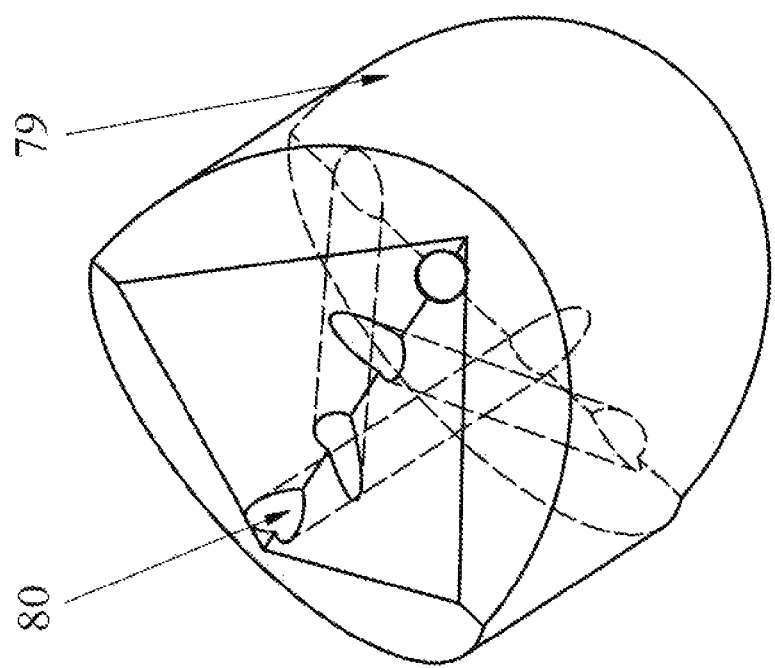
FIG. 27. Static mixer actuator.

An axonometric view of a mixing element 79 is presented in FIG. 27. Each mixing element 79 has four through openings 80. The suggested device is designed to enable highly efficient control over static mixing intensity of the compound components and to obtain the highest quality of the mixture. The control over the mixing intensity of the compound is provided by varying the number of individual mixing elements 79 in the set of the integrated static mixer 72. As the number of the mixing elements 79 increases, the number of streams to be mixed increases exponentially. As flows pass through each mixing element 79, each flow is divided into 4 streams. Two incoming jets of the compound passed through the first mixing element 79 are divided into eight streams; those passed through the second element 79 are divided into 32 streams; those passed through the third element 79 are divided into 128 streams; those passed through the fourth element are divided into 512 streams; those passed through 16 elements are divided into more than 8.5 billion finest streams. The high efficiency of the built-in static mixer 72 is guaranteed in a wide range of viscosities of the used compounds.

Figure 28:
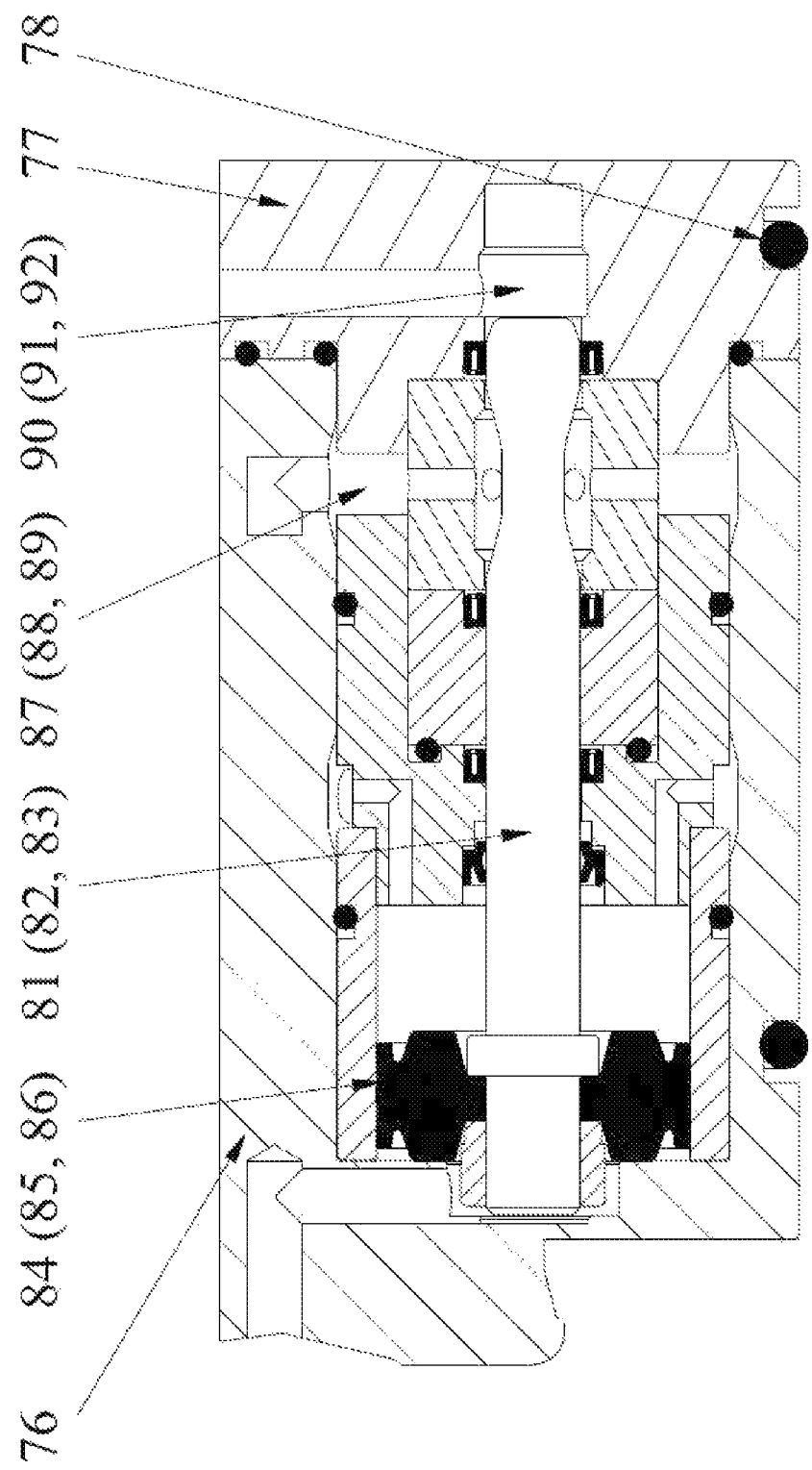
FIG. 28. Valve regulating the liquid component flow at the static mixer inlet, in closed position.
Figure 29:
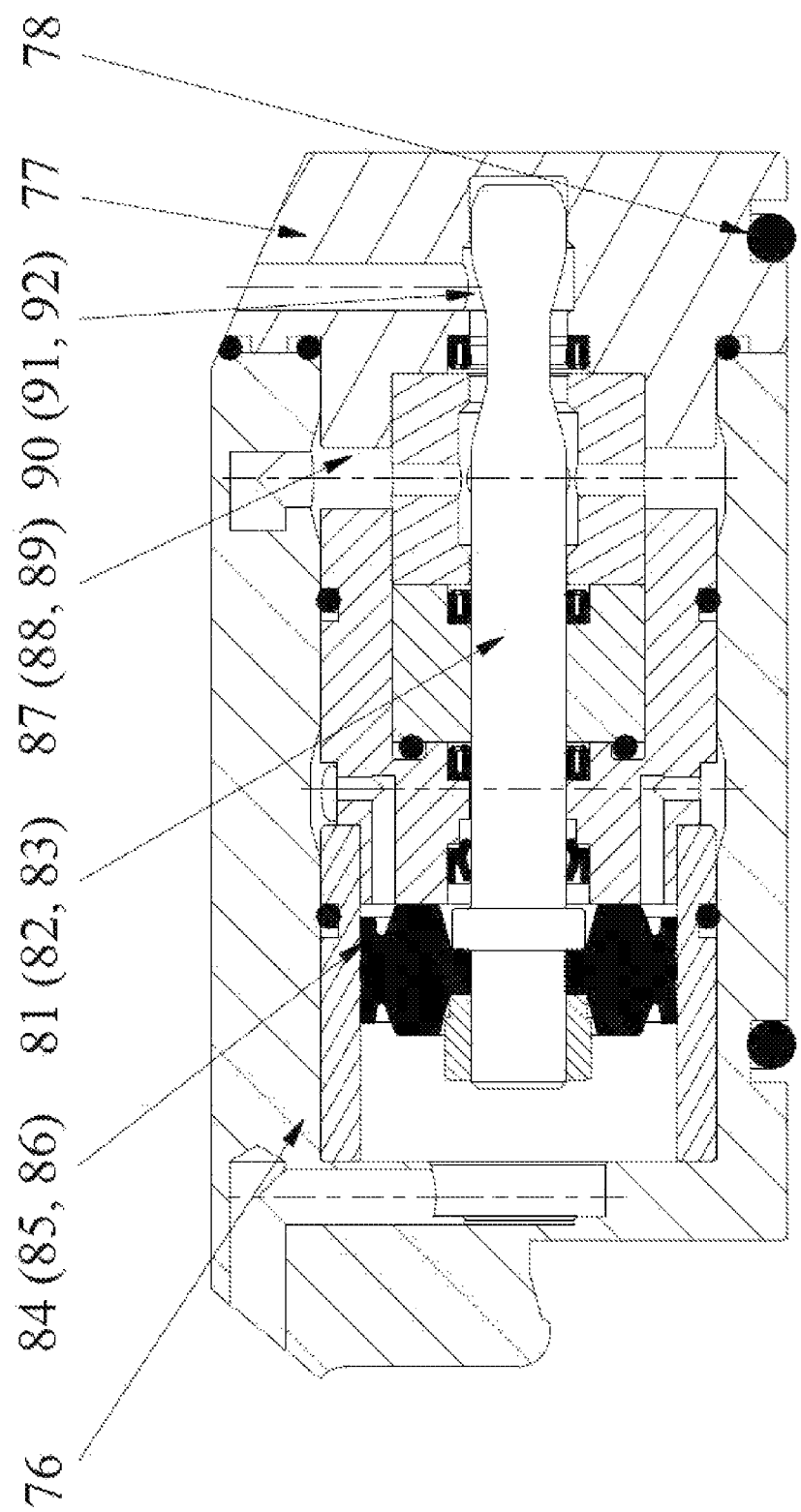
FIG. 29. Valve regulating the liquid component flow at the static mixer inlet, in open position.

FIG. 28 illustrates the design of the integral spool valves 73, 74 and 75 used in the suggested device with pneumatic drives in closed position. Each valve 73, 74 and 75 has a spool 81, 82, 83 firmly connected to a piston 84, 85, 86. The valves 73, 74 and 75 are equipped respectively with supercharge cavities 87, 88 and 89 and discharge cavities 90, 91 and 92. The pneumatic drive of each valve 73, 74 and 75 has a cavity above the piston and below the piston, respectively. The spool valves 73, 74 and 75, along with a set of mixing elements 79 of the static mixer 72 (FIG. 26) are combined in one common casing 76 and closed by one common cover 77. In FIG. 29 a cross-section of one of the spool valves 73, 74 and 75 is shown in the open position.

Figure 30:
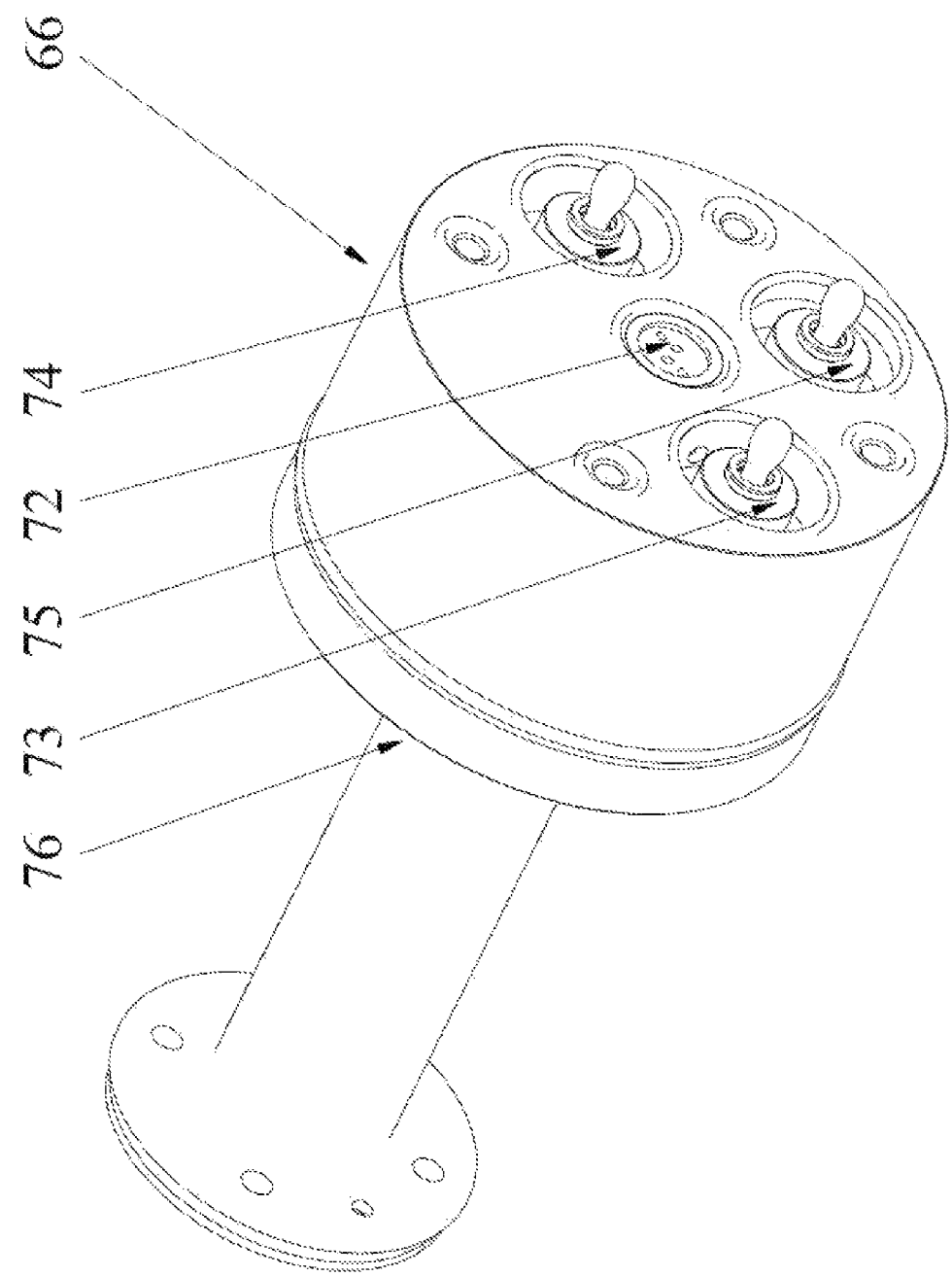
FIG. 30. Axonometric view of a static mixer with the valve assembly at the inlet with the lid removed.

The mutual positioning in the common casing of the integral valves 73, 74 and 75 and the set of individual mixing elements 79 of the integral static mixer 72 is clarified by the axonometric view of the static mixer 72 with the inlet valve assembly 66 with the cover taken off, shown in FIG. 30.

Figure 31:
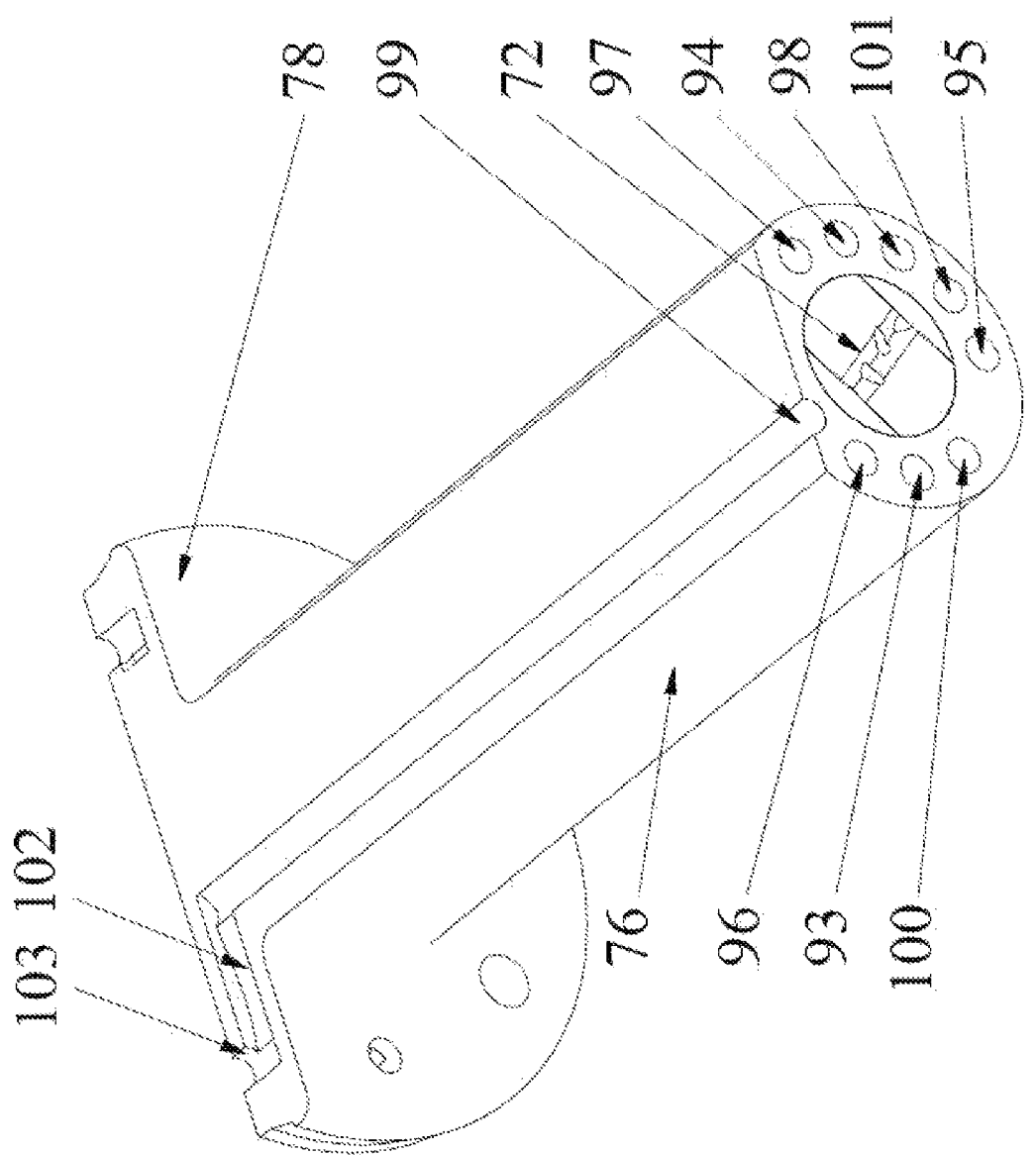
FIG. 31. Axonometric view of a static mixer with the valve assembly at the inlet with a cutout in two mutually perpendicular planes.

The design of the casing 76 of the static mixer 72 with the inlet valve assembly 66 is clarified by its axonometric view with a cutout shown in FIG. 31; along its periphery, nine longitudinal channels 93-101 are made in the casing 76. On the end face of the flange 78, the longitudinal channels 93-101 extend outward. Therefore, a channel 102 in the flange 78 of the casing 76 is connected at one end to the longitudinal channel 99 and at the other end to a channel 103 extending to the outer surface. There is a special cavity along the axis of the casing 76 that accommodate the individual mixing elements 79 of the integrated static mixer 72.

Figure 32:
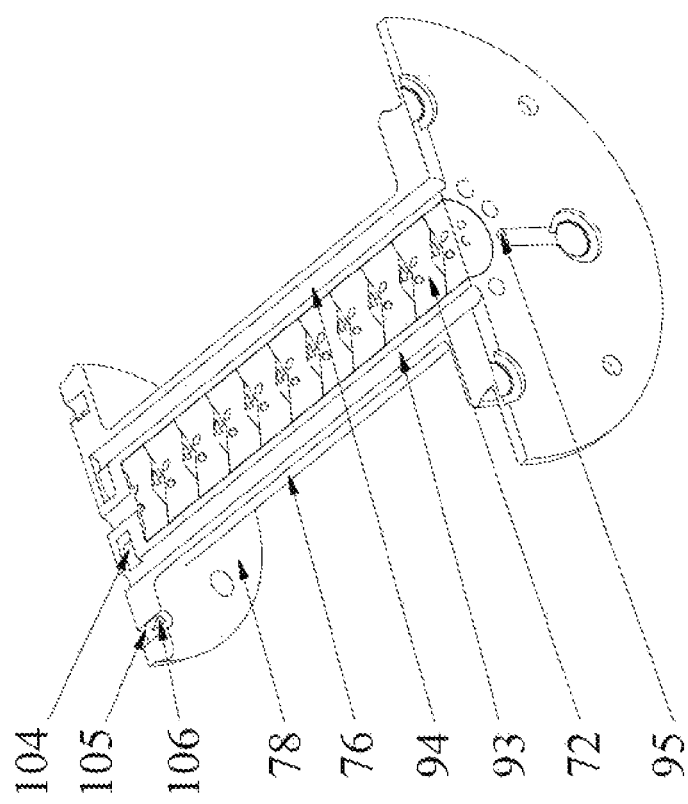
FIG. 32. Axonometric view of the static mixer with the valve assembly at the inlet with a cutout on a plane passing through the longitudinal axes of channels 93 and 94, and on a plane passing through axes of radial channels connected to cavities above pistons (FIG. 28 and FIG. 29) of pneumatic drives of the valves 73, 74 and 75.

FIG. 32 shows an axonometric view of the static mixer 72 with an inlet valve assembly 66 with a cutout on a plane passing through longitudinal axes of channels 93 and 94, and through a plane passing through axes of radial channels connected to the cavities above pistons (FIG. 28 and FIG. 29) of the pneumatic drive valves 73, 74, 75. The three longitudinal channels 93, 94 and 95 of the casing 76 are connected to the cavities of the pneumatic valve drives 73, 74 and 75 which are located above the pistons. In the flange 78 of the casing 76, the longitudinal channel 93 extends to the outer surface. The longitudinal channels 93 and 94 in the flange 78 of the casing 76 are interconnected with a hidden channel 104. The longitudinal channel 95 and a through opening 105 in the flange 78 of the casing 76 are connected by a hidden channel 106.

Figure 33:
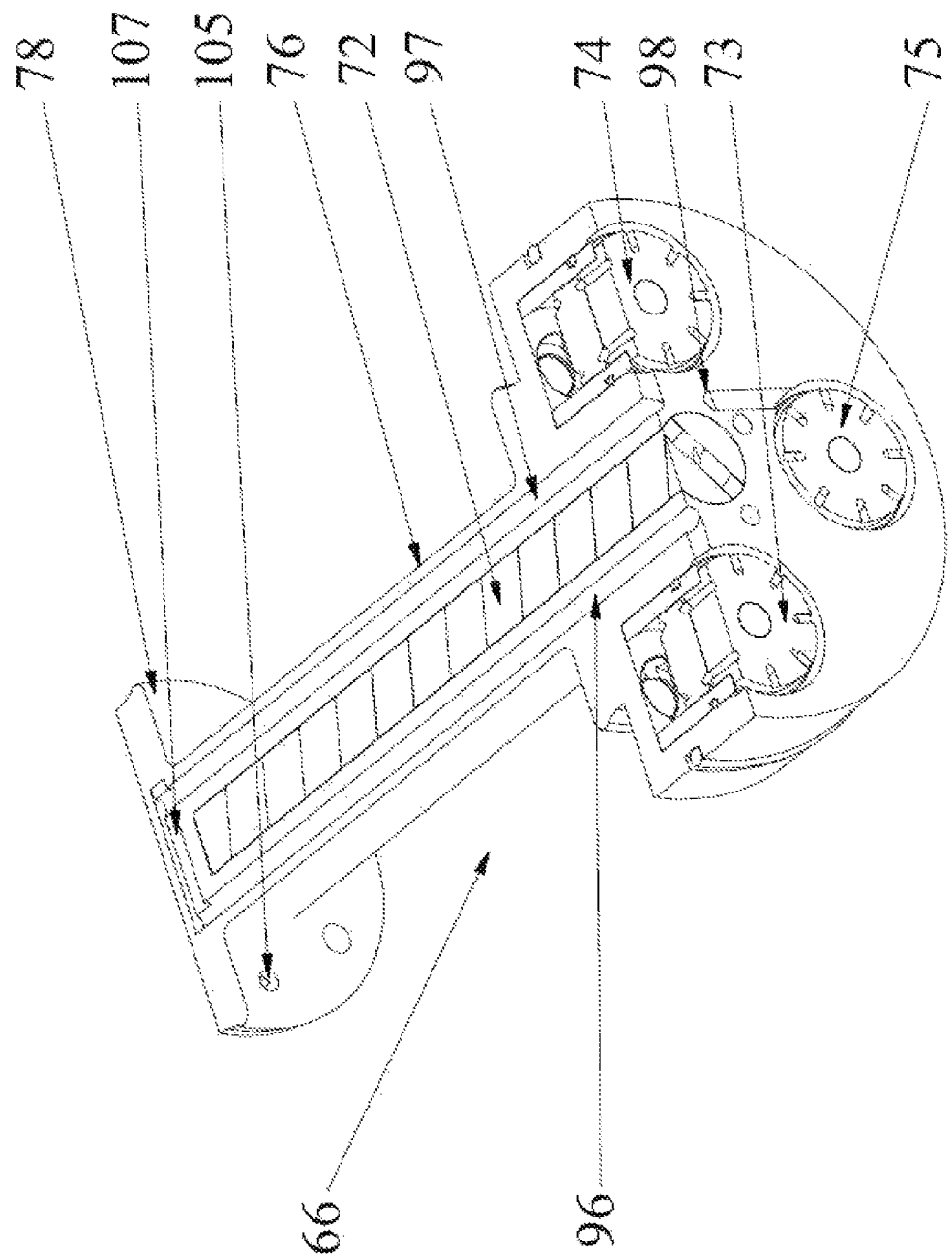
FIG. 33. Axonometric view of the static mixer with the valve assembly at the inlet with a cutout on a plane passing through the axes of channels 96 and 97, and on a plane passing through axes of radial channels connected to the cavities under pistons (FIG. 28 and FIG. 29) of pneumatic drives of the valves 73, 74 and 75.

FIG. 33 shows an axonometric view of the static mixer 72 with an inlet valve assembly 66 with a complex cutout on a plane passing through longitudinal axes of channels 96 and 97, and through a plane passing through axes of radial channels connected to the cavities below pistons (FIG. 28 and FIG. 29) and to pneumatic drives of the integrated valves 73, 74, and 75. The three longitudinal channels 96, 97 and 98 of the casing 76 are connected to the cavities of the pneumatic valve drives 73, 74 and 75 below the pistons. In the flange 78 of the casing 76, the longitudinal channels 96 and 97 are connected to each other with a channel 107.

Figure 34:
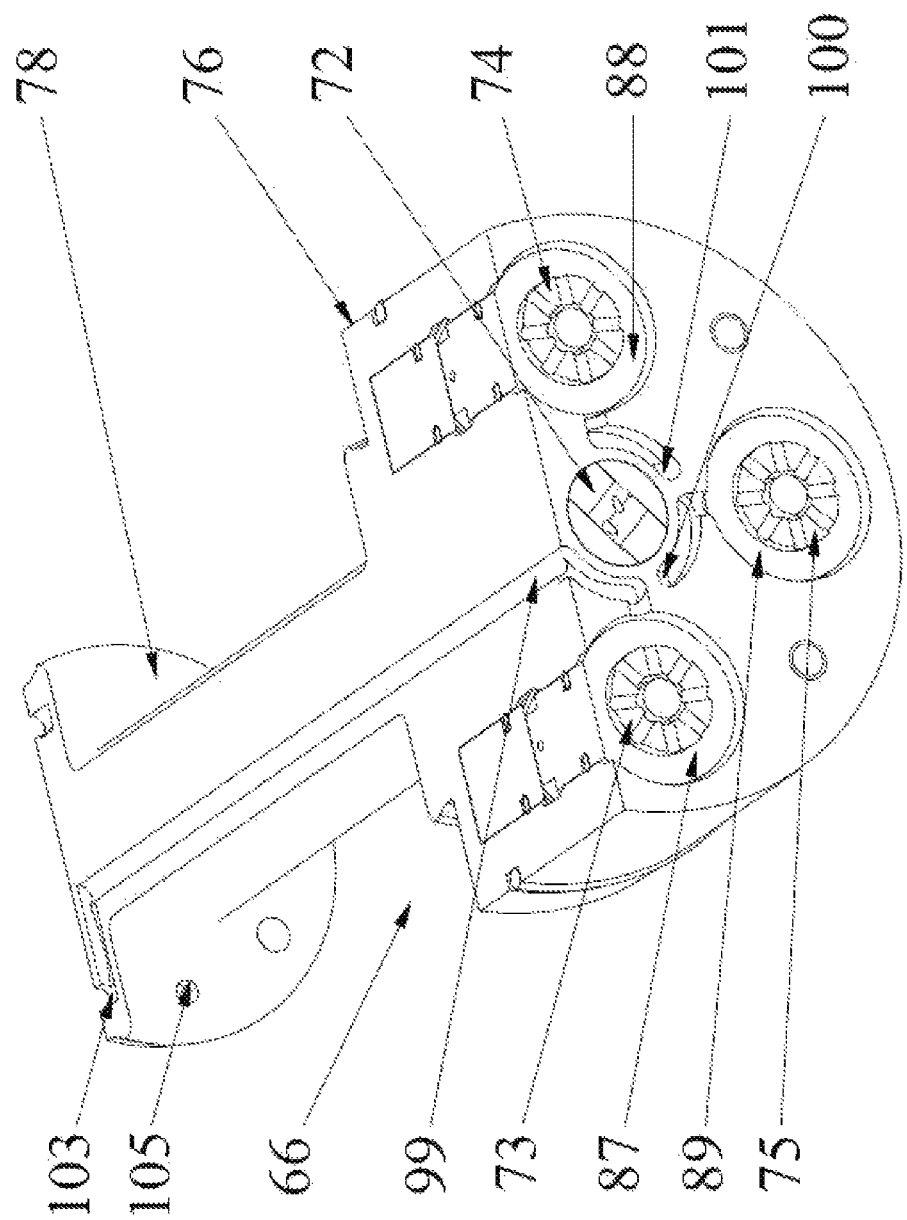
FIG. 34. Axonometric view of the static mixer with the valve assembly at the inlet with a cutout on a horizontal plane passing through axis of channel 99, and on a plane passing through arc-shaped axes of radial channels connected to pressure spaces 87, 88 and 89 (FIG. 28 and FIG. 29) of valves 73, 74 and 75.

FIG. 34 shows an axonometric view of the static mixer 72 with the inlet valve assembly 66 with a cutout on a horizontal plane passing through an axis of channel 99, and through a plane passing through axes of arc-shaped channels connected to the supercharge cavities 87, 88, 89 (FIG. 28, FIG. 29) of valves 73, 74 and 75. The longitudinal channel 99 is connected to the supercharge cavity 87 of the integrated valve 73. On the flange side 78 of the casing 76, the channel 99 is connected through an inner channel to the channel 103 extending to the surface. The longitudinal channel 101 is connected to the supercharge cavity 88 of the valve 74. The longitudinal channel 100 is connected to the supercharge cavity 89 of the valve 75.

Figure 35:
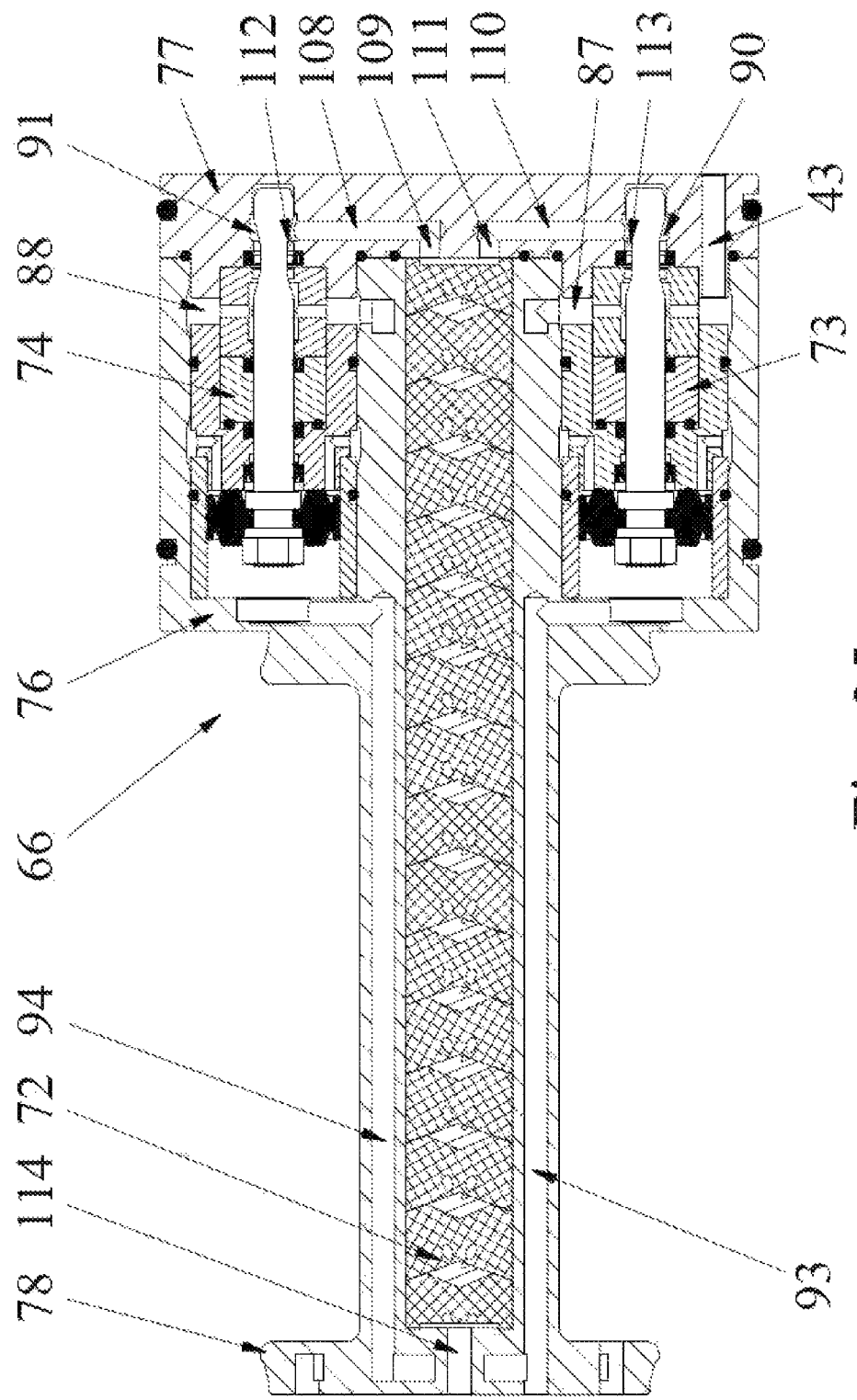
FIG. 35. Static mixer section with the valve assembly at the inlet by plane passing through axes of valves 73, 74.

FIG. 35 shows a section of the static mixer 72 with an inlet valve assembly 66 plane passing through the axes of the valves 73 and 74 (in the open position). The through channel 43 in the cover 77 of the casing 76 is connected to the supercharge cavity 87 of the valve 73. At the same time, the through channel 43 is connected through the supercharge cavity 87 of the valve 73 to the longitudinal channel 99 (FIG. 34) in the casing 76.

The discharge cavity 91 of the valve 74 is connected by a radial channel 108 to a channel 109 that enters the integrated static mixer 72 adjacent to the cover 77.

The discharge cavity 90 of the valve 73 is connected by a radial channel 110 to a channel 111 that enters the static mixer 72 adjacent to the cover 77. A channel 112 comes out into the upper part of the discharge cavity 91 of the valve 74. A channel 113 comes out into the upper part of the discharge cavity 90 of the valve 73. In the flange 78 of the casing 76, an outlet opening 114 is located.

Figure 36:
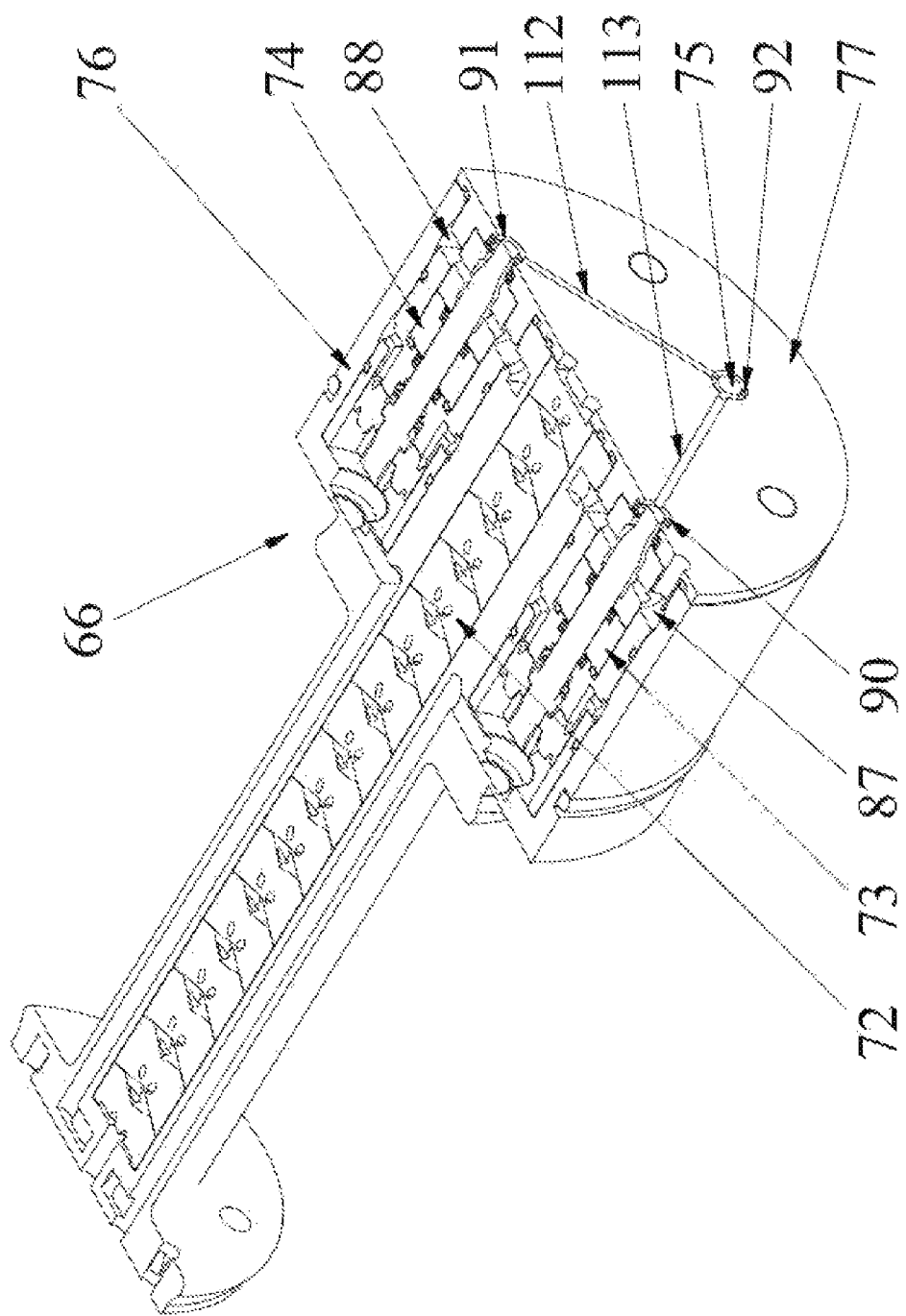
FIG. 36. Axonometric view of the static mixer with the valve assembly at the inlet with a cutout on a horizontal plane passing through axes of valves 73, 74 and on a plane passing through axes of channels 112 and 113 (FIG. 35).

FIG. 36 shows an axonometric view of the static mixer 72 with an inlet valve assembly 66 with a cutout on a horizontal plane passing through axes of the valves 73 and 74 and on a plane passing through axes of the channels 112 and 113 (FIG. 35). The discharge cavities 91, 92 of the valves 74 and 75 are interconnected by the channel 112 (FIG. 36). The discharge cavities 90, 92 of the valves 73 and 75 are interconnected by the channel 113.

Figure 37:
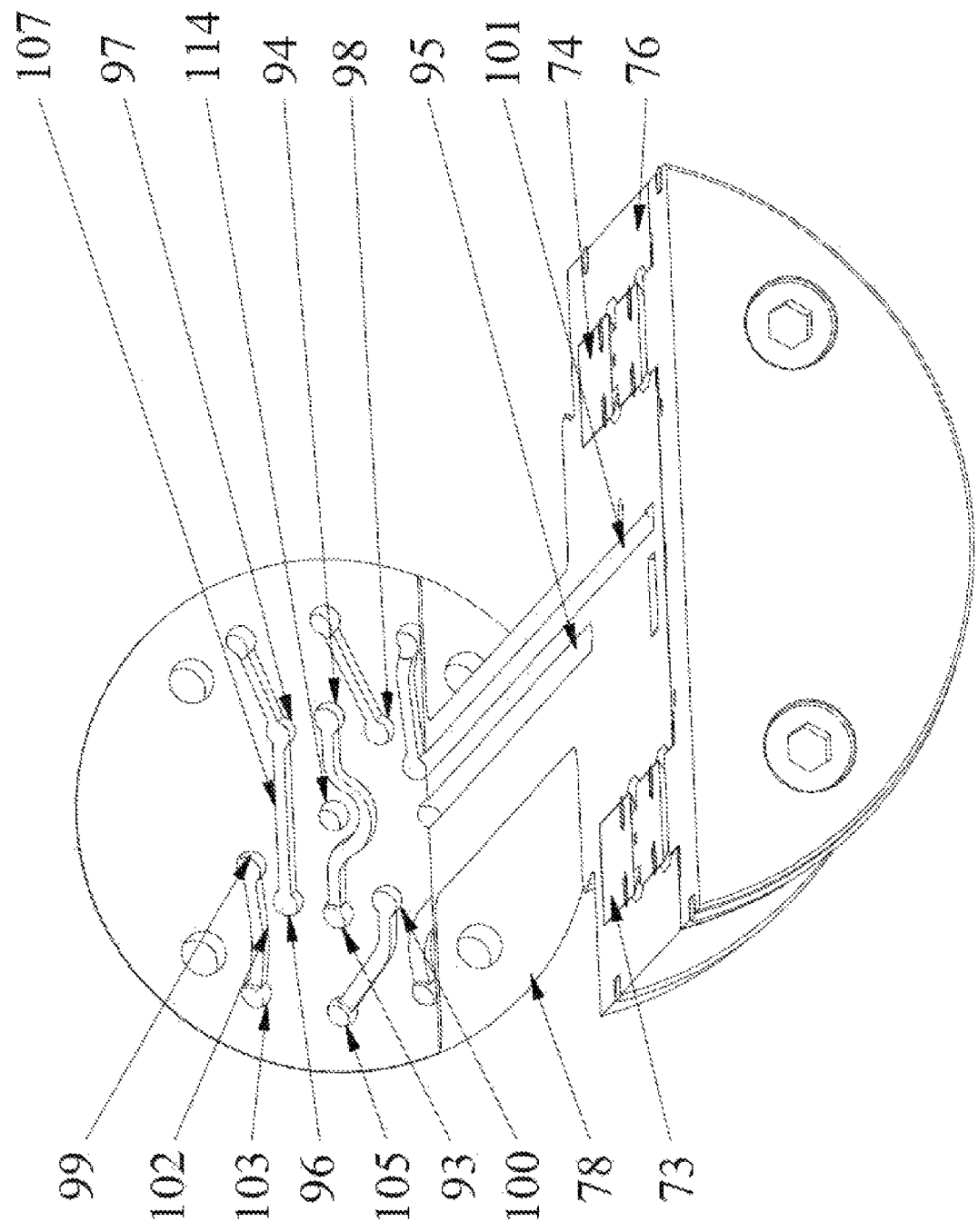
FIG. 37. Axonometric view of the static mixer with the valve assembly at the inlet with a cutout on a plane passing through axes of channels 95 and 101, and on the perpendicular plane passing through axes of channels 102 and 107.

Axonometric view of the static mixer 72 with the inlet valve assembly 66 with a cutout on the plane that passes through axes of the channels 95 and 101, and a plane perpendicular to said plane, passes through the channels 102 and 107 in the flange 78, presented in FIG. 37, clarifies the design of channels in the flange 78 of the casing 76. As it was noted above, the longitudinal channels 93 and 94 are interconnected and have one common outlet on the outer surface of the flange 78 of the casing 76. The longitudinal channels 96 and 97 are also interconnected and have one common outlet on the outer surface of the flange 78 of the casing 76. The other five longitudinal channels 95, 98, 99, 101 and 100 that extend peripherally around the casing 76 are isolated from each other and have separate outlets on the outer surface of the flange 78 of the casing 76.

Figure 38:
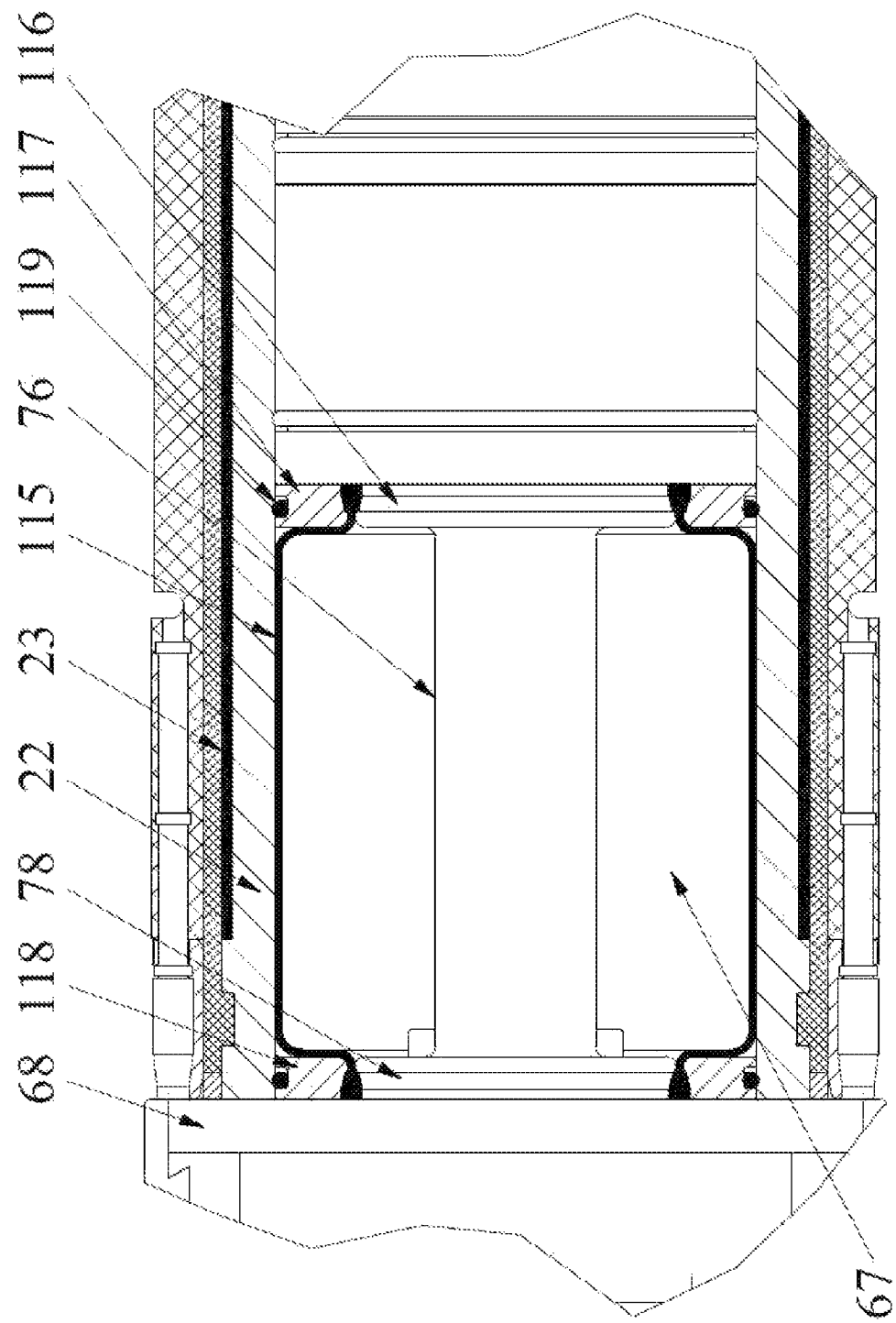
FIG. 38. Hydraulic accumulator design.

The hydraulic accumulator 67 (FIGS. 24, 25) is integrated into the compound feeding unit 12. FIG. 38 shows the design of the hydraulic accumulator 67. The main components of the suggested device that are located in the area of the hydraulic accumulator 67 at the same time constitute its integral part. The movable operating unit of the hydraulic accumulator 67 is a cylindrical diaphragm 115 (FIG. 38). Both end areas of the diaphragm 115 are equipped with special reinforced profiles which provide easy fixation and sealing of both circuits of the hydraulic accumulator 67. The central casing part of the hydraulic accumulator 67 is the casing 76 of the static mixer 72 with flow control valve assembly 66 at the inlet. Two special flanges 78 and 116 are profiled on the casing 76. The diaphragm 115 is placed coaxially to the casing 76. Reinforced profiles on the ends of the diaphragm 115 are mounted on the outer profiled surfaces of the flanges 78 and 116 of the casing 76. The diaphragm 115 and casing 76 with flanges 78 and 116 constitute the inner circuit of the hydraulic accumulator 67. The ends of the diaphragm 115 are secured by special rings 117 and 118 with special profiles on the inner surface matching the profile of the end sections of the diaphragm 115. The ring 117 is bolted to the side surface of the reinforced part of the casing 76. The ring 118 is also bolted to the adjacent side surface of the flow control assembly 68 at the static mixer 72 outlet. When the membrane 115 is fastened, its thickened profiles are compressed on the end sections. This ensures that the connections are sealed. The diaphragm 115, rings 117 and 118, and the casing 22 of the sealing unit 10 constitute the outer circuit of the hydraulic accumulator. There are grooves on the outer surface of the rings 117 and 118 which are used to fit O-type sealing rings 119. Tightness of the inner circuit is provided entirely by tightness of connections between the diaphragm 115 and flanges 78 and 116 of the casing 76. Tightness of the outer circuit is achieved by sealing connections between the diaphragm 115 and the rings 117 and 118, and the two O-rings 119 that seal a gap between the casing 22 of the sealing unit 10 and the rings 117, 118.

The hydraulic accumulator 67 cavity created by an internal sealed circuit is intended to deliver washing fluid to the suggested device. The cavity created by the outer sealed circuit is designed to inject compressed air into this cavity and thereby create and maintain the pressure of the washing fluid in the inner circuit of the hydraulic accumulator 67 at a required level.

Figure 39:
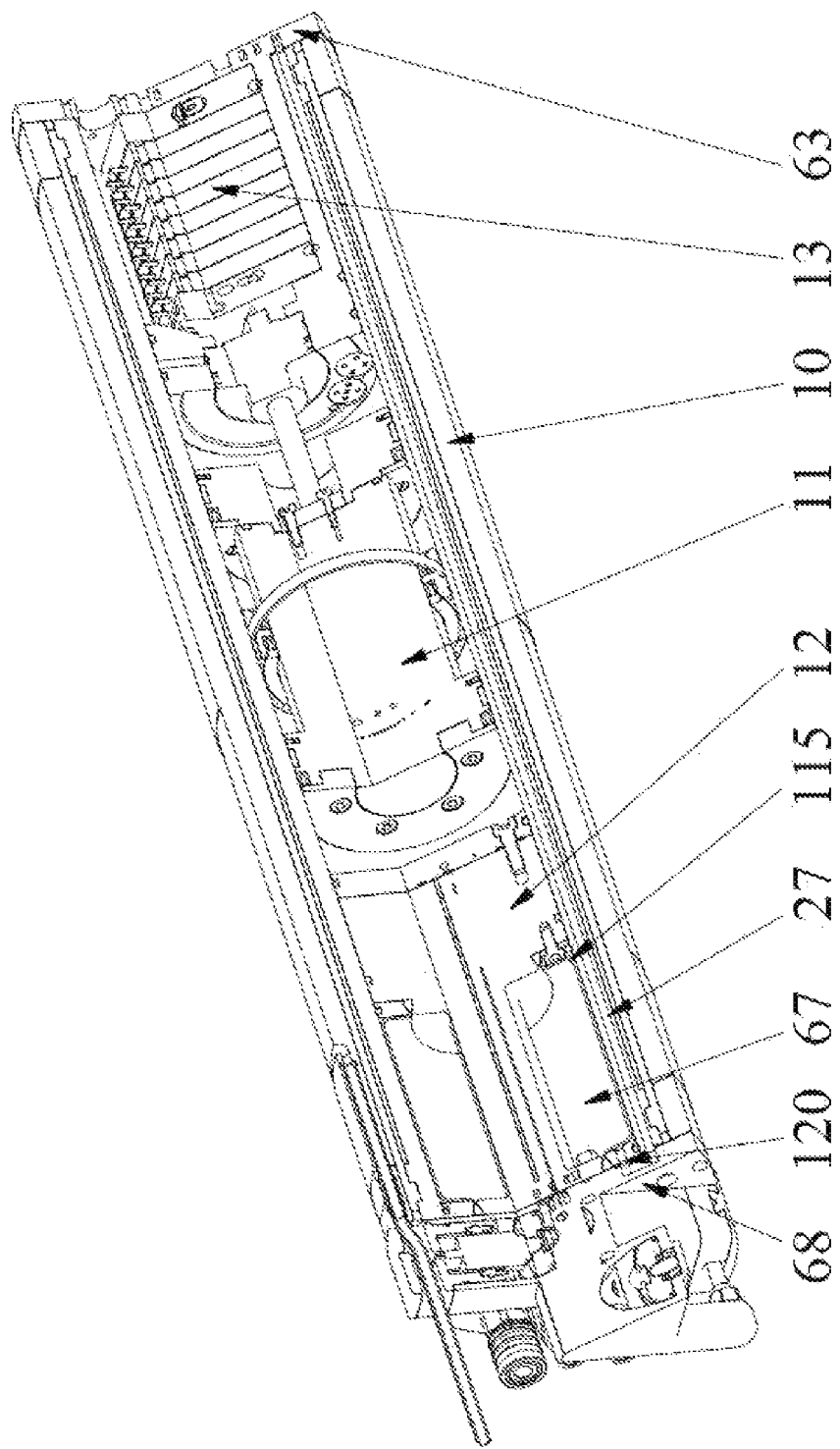
FIG. 39. Axonometric view of the suggested device with a cutout on a plane passing through axes of channels 27 and 120 which connect the air cavity of the hydraulic accumulator with the pneumatic automation unit.

The compressed air from the pneumatic automation unit 13 is fed to the external circuit of the hydraulic accumulator 67 by one of the longitudinal channels 27 (FIG. 39) in the casing 22 of the sealing unit 10. The ring 118 (FIG. 40) has a through opening 120 that extends into the outer circuit of the hydraulic accumulator 67. The opening 120 is coupled to one of the longitudinal channels 27 (FIG. 40) in the casing 22 of the sealing assembly 10 through a channel 121 in the flow control assembly 68 at the outlet of the static mixer 72. The through opening 105 (FIG. 41) connected to the longitudinal channel 100 (FIG. 37) of the casing 76 of the static mixer 72 with the inlet valve assembly 66 goes out into the inner circuit of the hydraulic accumulator 67. The channel 100 (FIG. 41) is connected to the supercharge cavity 89 of the valve 75.

The suggested device is filled with two components of the compound and washing fluid through quick-release couplings 69, 70 and 71 (FIG. 24, 25). The models of quick-release couplings FEM-121-2 FB and FEM-122-2 FB produced by Parker equipped with return valves preventing leakage during connection, impregnation, and disconnection after refueling are used.

Figure 42:
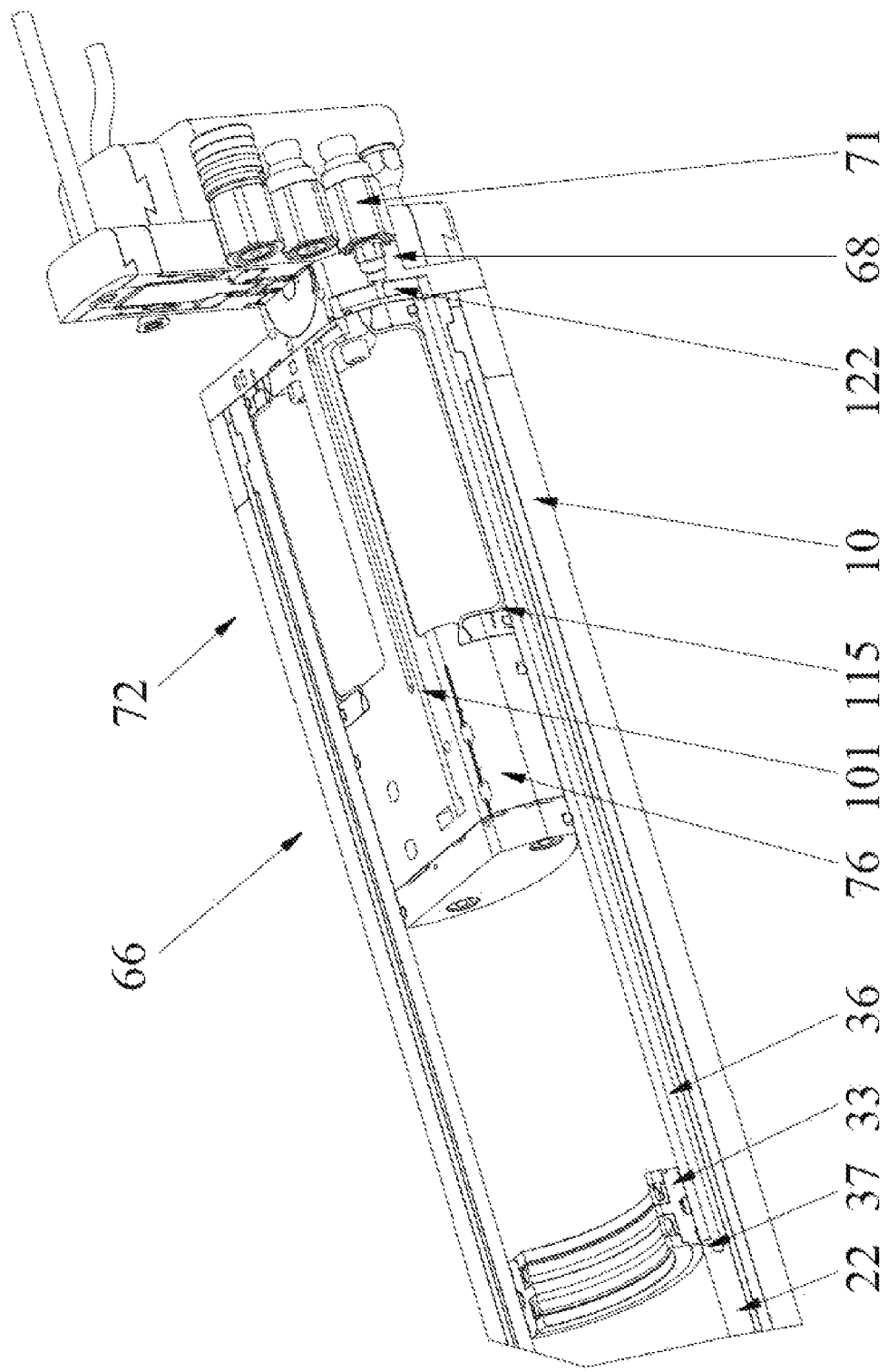
FIG. 42. Axonometric view of the suggested device with a complex cutout on the planes passing through axes of channels that connect the piston operating cavity of the compound components dosing unit with a channel 101 and a quick-release coupling 71.

The quick-release coupling 71 is designed to fill the rod operating cavity 52 of the compound components dosing unit. FIG. 42 shows an axonometric view of the suggested device with a complex cutout on the planes that pass through the axes of the channels that connect the quick-release coupling 71 with the rod operating cavity 52 and static mixer 72 with the valve assembly 66 (rod and pistons are not shown in FIG. 42). The quick-release coupling 71 is connected to the rod operating cavity 52 of the dosing unit by means of channels 122, 36 and 37. The quick-release coupling 71 is also connected to the longitudinal channel 101, which is connected to the supercharge cavity 88 of the valve 74 (FIG. 34).

Figure 43:
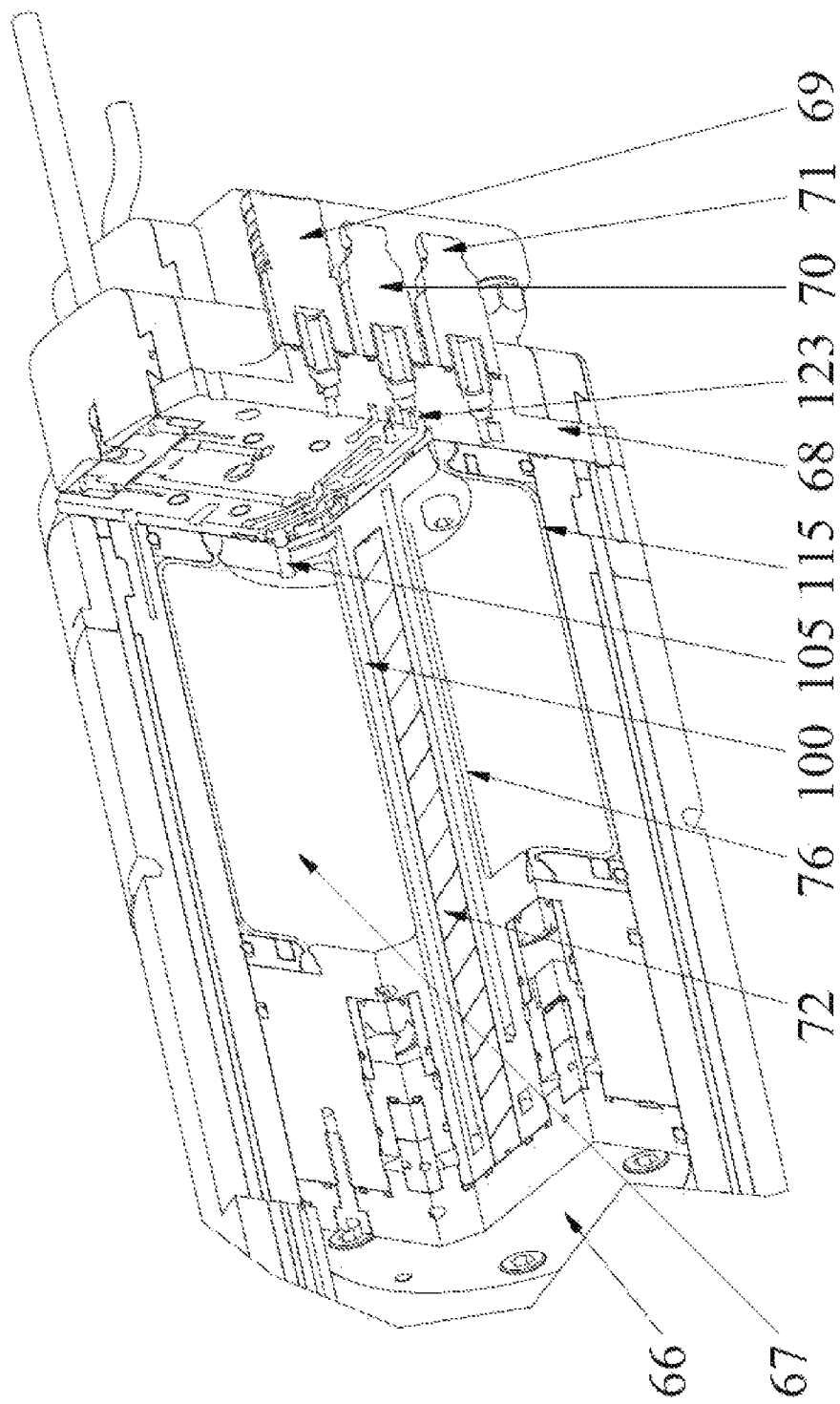
FIG. 43. Axonometric view of a compound feeding unit with a complex cutout on planes that pass through axes of channels that connect the inner contour of the hydraulic accumulator to a channel 100 and a quick-release coupling 70.

The quick-release coupling 70 is used to fill the inner circuit cavity of the hydraulic accumulator 67 with washing fluid. FIG. 43 shows an axonometric view of a compound feeding unit 12 with a complex cutout along planes that pass through axes of channels that connect the inner circuit of the hydraulic accumulator 67 to the channel 100 and the quick-release coupling 70. The quick-release coupling 70 (FIG. 43) is connected by means of a channel 123 to the through opening 105 that goes into the inner circuit of the hydraulic accumulator 67. In turn, the opening 105 is connected to the channel 100, which is coupled to the supercharge cavity 89 of the valve 75 (FIG. 34).

Figure 44:
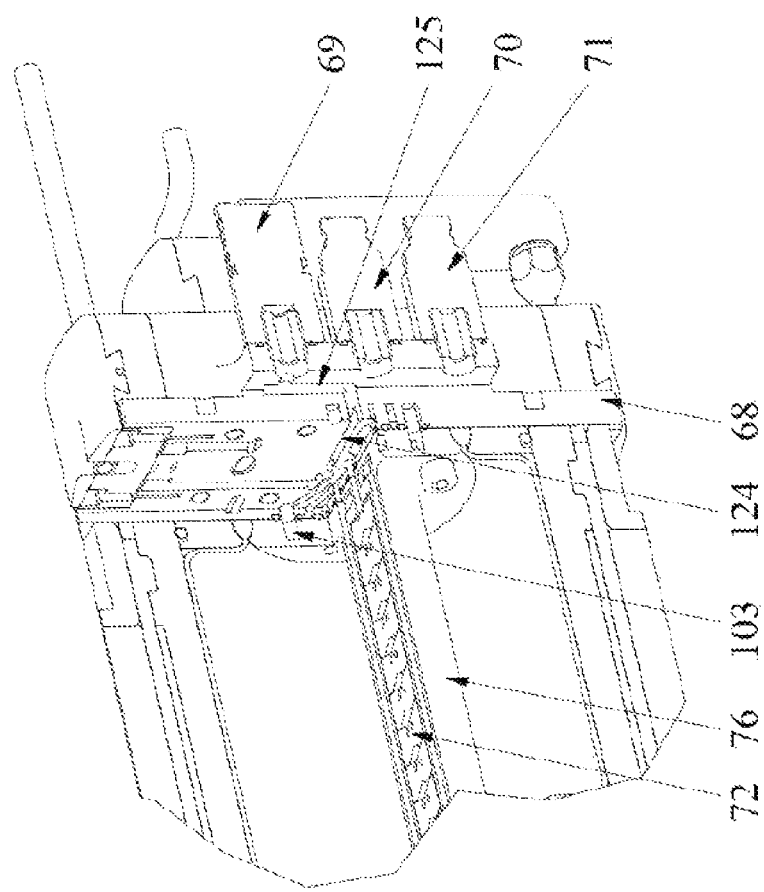
FIG. 44. Axonometric view of a compound feeding unit fragment with a complex cutout on planes of passing channels from a quick-release coupling 69 to a channel 103.

The quick-release coupling 69 is designed to fill the piston operating cavity 51 of the compound components dosing unit. FIG. 44 shows an axonometric view of a compound feeding unit 12 fragment with a complex cutout along the channel planes from quick-release coupling 69 to channel 103. The quick-release coupling 69 is connected through channels 124 and 125 to the channel 103. In turn, the channel 103 (FIG. 34) is connected through the channel 99 to the supercharge cavity 87 of the valve 73, which communicates through the opening 43 (FIGS. 35, 14, 19) with the piston operating cavity 51 of the dosing unit. This way, the quick-release coupling 69 is connected to the piston operating cavity 51 of the integrated dosing unit.

At the outlet of the static mixer 72, the flow of the mixed two-component compound must be controlled. In this case, regardless of the actual position of the piston assembly 11 of the dosing unit and static mixer 72 relatively to the position of the impregnated annular space 19 in the area of the pipeline welded joint 15, it is extremely important to control the flow of the compound in the immediate vicinity of the insulated welded joint 15. Failure to observe this condition makes it impossible to wash the compound supply system in the cavity of the annular space 19 in time and results in compound polymerization both in its supply hoses and in the equipment itself thus rendering them inoperable.

When the valves 73 and 74 (FIG. 35) are opened at the inlet to the static mixer 72, both components of the compound first fill the channels in the space from the discharge cavities 90 and 91 of the open valves 73 and 74 to the static mixer 72. Due to the unequal ratio of volumetric doses of the components, the component with the higher mixing volume ratio flows first into the static mixer 72. Therefore, the first dose of mixed material has a significant deviation from the required proportional ratio of the compound components. When this low-quality material enters the annular space 19 in the area of the welded joint 15, the volume of the compound with a composition that has an unacceptable deviation from the required ratio of its components dosage slightly increases due to the movement of streams in the cavity. This significantly reduces quality of the welded joint insulation. At the start of the passage of the compound components through the built-in static mixer 72, the mixing process instability can be observed. Reaching the steady state of the static mixer 72 is an inertial process. Moreover, as a rule, residual wash fluid remains in the static mixer 72 and in the channels for feeding the compound into the annular space 19 in the area of the welded joint 15. The first dose of the compound cleans the cavities and channels all the way from the discharge cavities 90 and 91 of the valves 73 and 74 at the inlet to the static mixer 72 up to the cavity of the annular space 19 in the area of the welded joint 15. At the same time, the first dose of the compound passed through is saturated with foreign fluids. For these reasons, the first dose of compound should be directed through a different channel bypassing the cavity of the annular space 19 in the area of the welded joint 15. Once the poor-quality compound is removed, the flow of material must be redirected into the cavity of the annular space 19 in the area of the welded joint 15. Once the process of filling the cavity of the annular space 19 is over, the channels of compound feeding and air evacuation must be shut off. Meanwhile, the cavities and channels of the static mixer 72 and the channels for feeding the material into the cavity of the annular space 19 in the area of the welded joint 15 get filled with high-quality compound. Failure to remove the remaining compound from the static mixer 72 and channels in time inevitably leads to its polymerization and failure of the suggested device. In order to constantly keep the equipment in working order, the static mixer 72 and the channels for feeding the compound in the cavity of the annular space 19 must be washed at the end of the impregnation process. This requires a supply of washing fluid at the inlet to the static mixer 72 instead of the compound components. And the washing fluid and products of system flushing should be drained into a special circuit to be disposed of before reaching the cavity of the annular space 19 in the area of the welded joint 15.

The full operating volume of the compound components dosing unit must be greater than the volume of the annular space 19 in the area of the insulated welded joint 15 by at least twice the working volume of static mixer 72 and twice the volume of the compound feeding channels from the static mixer 72 to the annular space 19.

Compliance with this condition enables the initial filling of the cavities and channels of the static mixer 72 and the channels of the compound feeding into the annular space 19 and removing the first batch of low-quality compound from the feed circuit. The amount of low-quality material removed must be at least equal to the volume of the compound that the static mixer 72 and the feed loop channels contain between the static mixer 72 and the annular space 19. After the low-quality material is removed from the feeding circuit, the cavity of the annular space 19 is filled with a compound with the composition complying with the manufacturer's requirements. This guarantees the quality of the welded joint insulation.

Figure 45:
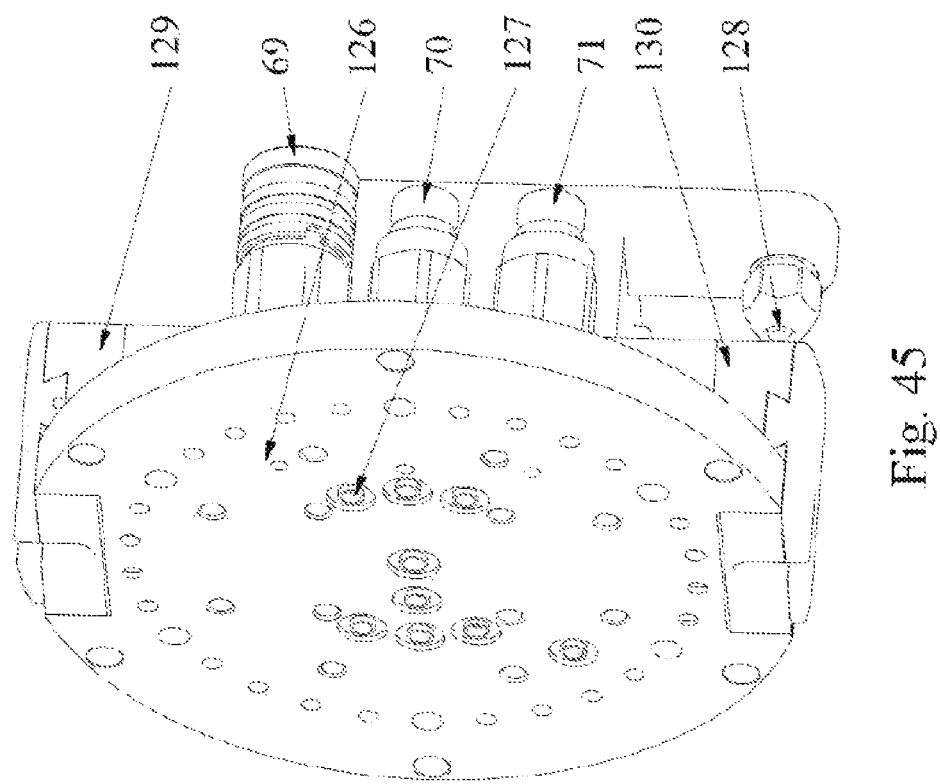
FIG. 45. Axonometric view of the compound feeding unit from the flange side without the static mixer and the valve assembly and without the hydraulic accumulator.
Figure 46:
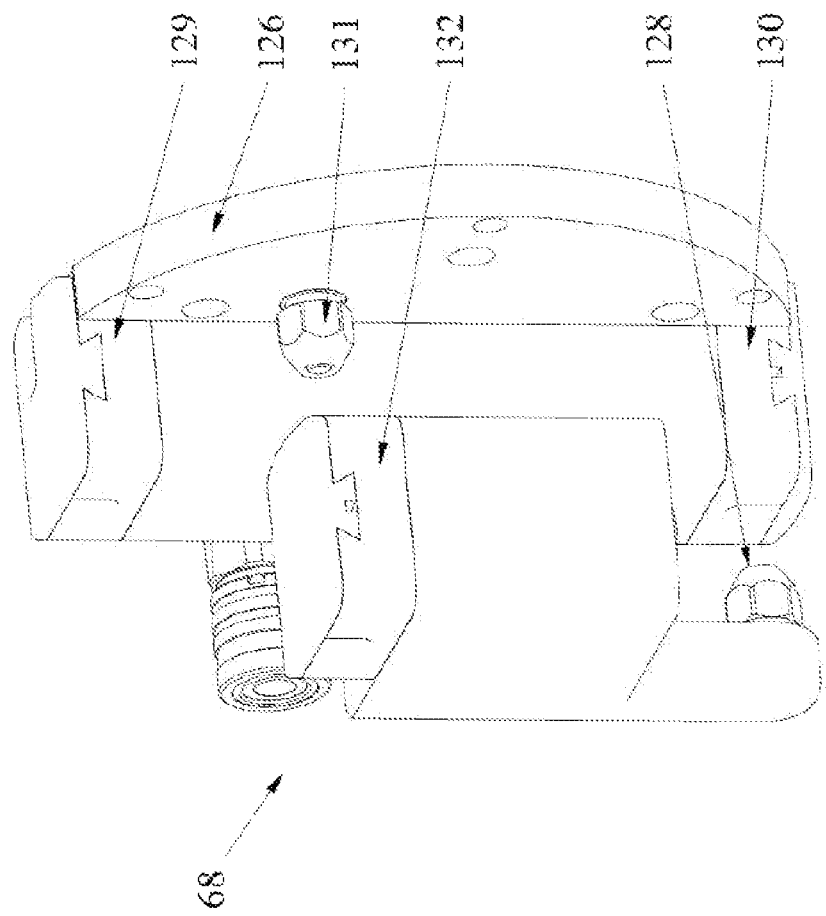
FIG. 46. Axonometric view of the compound feeding unit from the pinch valves side without the static mixer and the valve assembly and without the hydraulic accumulator.

FIG. 45 shows an axonometric view of the flow control assembly 68 at the outlet of the static mixer 72 from the side of the channel outlet on the flange 126 surface. On the surface of the flange 126 (FIG. 45), there are channels 127, intended for connection to the static mixer 72 with the valve assembly 66; a channel for supplying compressed air to the hydraulic accumulator 67 outer circuit; channels intended for coupling with the sealing unit 10. The flow control assembly 68 at the outlet of the static mixer 72 includes: a nipple 128 that supplies compound to the annular space 19 in the area of the welded joint 15; a third pinch valve 129 to evacuate air from the annular space 19; a first pinch valve 130 to supply compound to the annular space 19; a nipple 131 (FIG. 46) of the bypass circuit; and a second pinch valve 132 of a discharge circuit.

Figure 47:
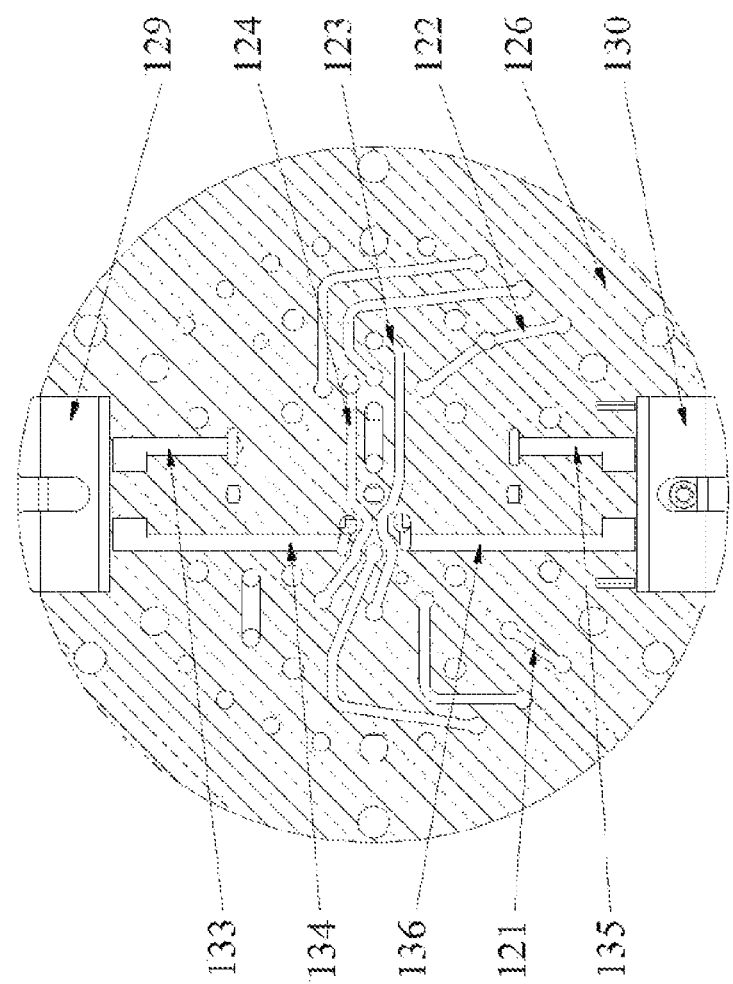
FIG. 47. Cross section of a flange 126 of the flow control assembly at the static mixer outlet on a plane passing through axes of channels connected to cavities above and below pistons of pneumatic actuators of the pinch valves 129 and 130.

The pinch valves 129, 130 and 132 are equipped with pneumatic drives. FIG. 47 shows a cross section of the flange 126 of the flow control assembly 68 at the static mixer 72 outlet on a plane passing through axes of channels connected to the cavities above and below the piston cavities of the pneumatic actuators of the pinch valves 129 and 130. The channel 133 (FIG. 47) is connected to the cavity of the valve 129 above the piston. The channel 134 is connected to the cavity of the valve 129 below the piston. The channel 135 is connected to the cavity of the valve 130 above the piston. The channel 136 is connected to the cavity of the valve 130 below the piston.

Figure 48:
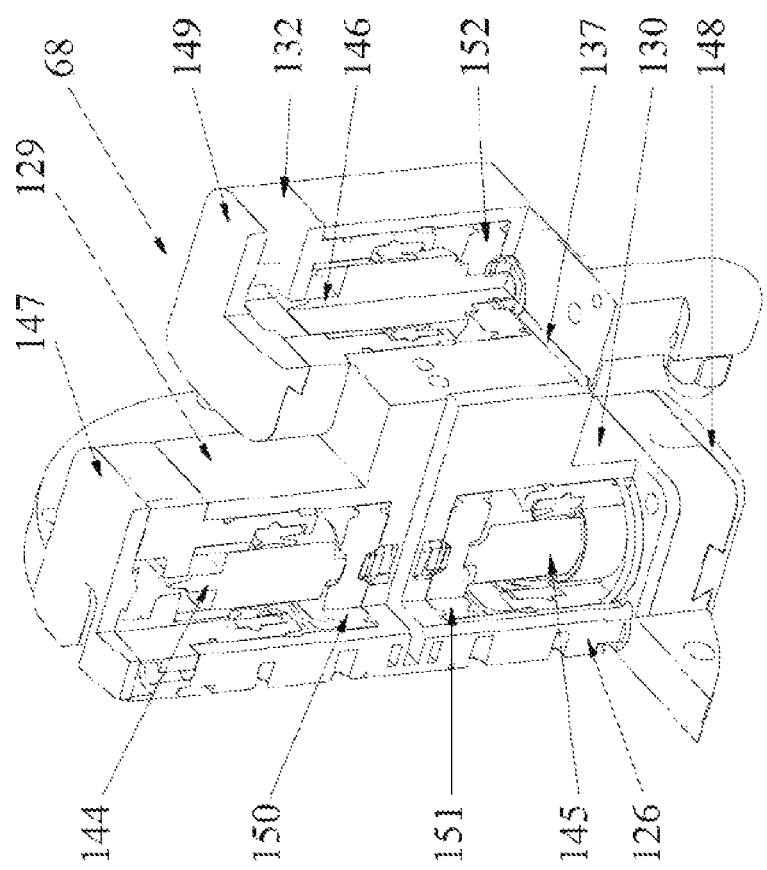
FIG. 48. Axonometric view of the compound feeding unit from the side of the pinch valves without the static mixer and the valve assembly and without the hydraulic accumulator with a complex cutout on planes passing through axes of channels that connect a cavity above a piston of a pneumatic actuator of the valve 132 with an opening extending to a flange surface.

The channel 137 (FIG. 48) connected to the channel extending to the surface of the flange 126 of the flow control assembly 68 extends into the cavity of the valve 132 below the piston.

Figure 49:
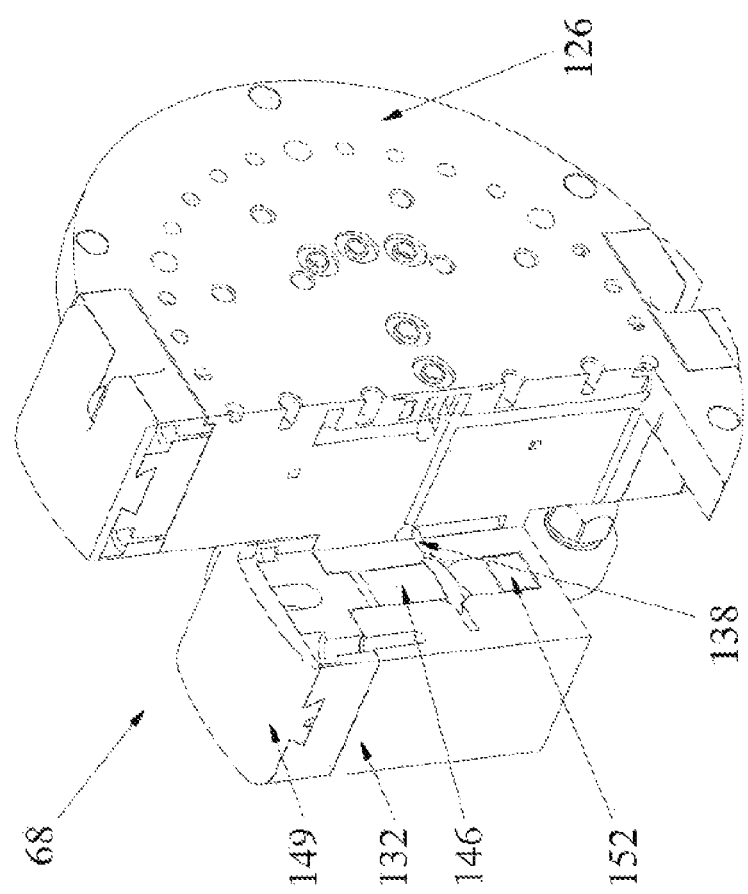
FIG. 49. Axonometric view of the compound feeding unit from the side of the flange 126 without the static mixer and valve assembly and without the hydraulic accumulator with a complex cutout on planes passing through axes of channels that connect a cavity under the piston of the pneumatic actuator of the valve 132 with the opening extending to the flange surface.

The channel 138 (FIG. 49) connected to the channel extending to the surface of the flange 126 of the flow control assembly 68 extends into the cavity of the valve 132 above the piston.

Figure 50:
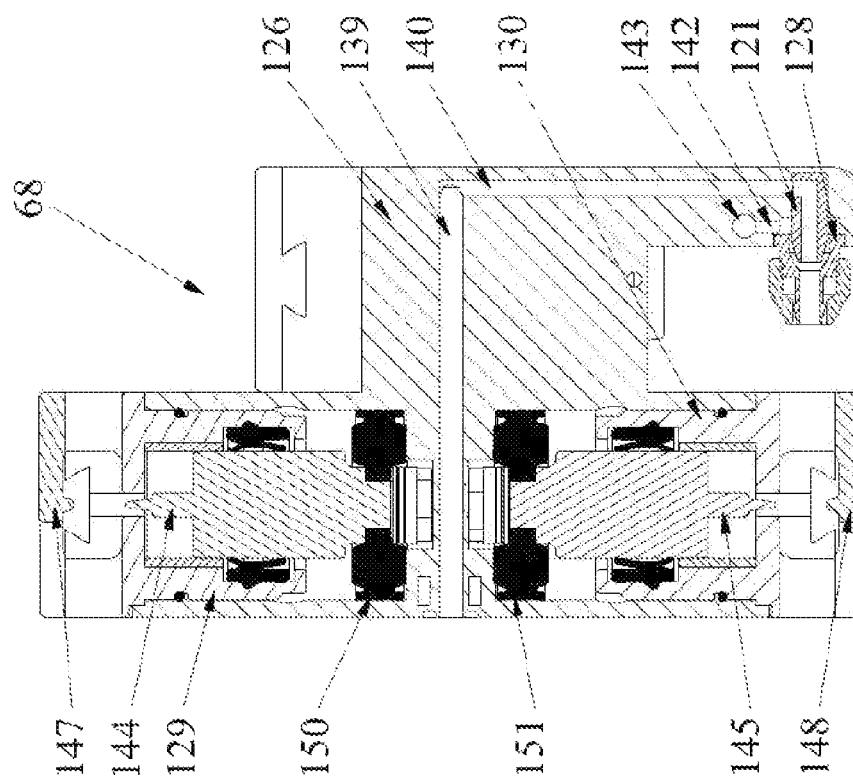
FIG. 50. Section of the compound feeding unit passing through axes of channels feeding compound to the annular space.
Figure 51:
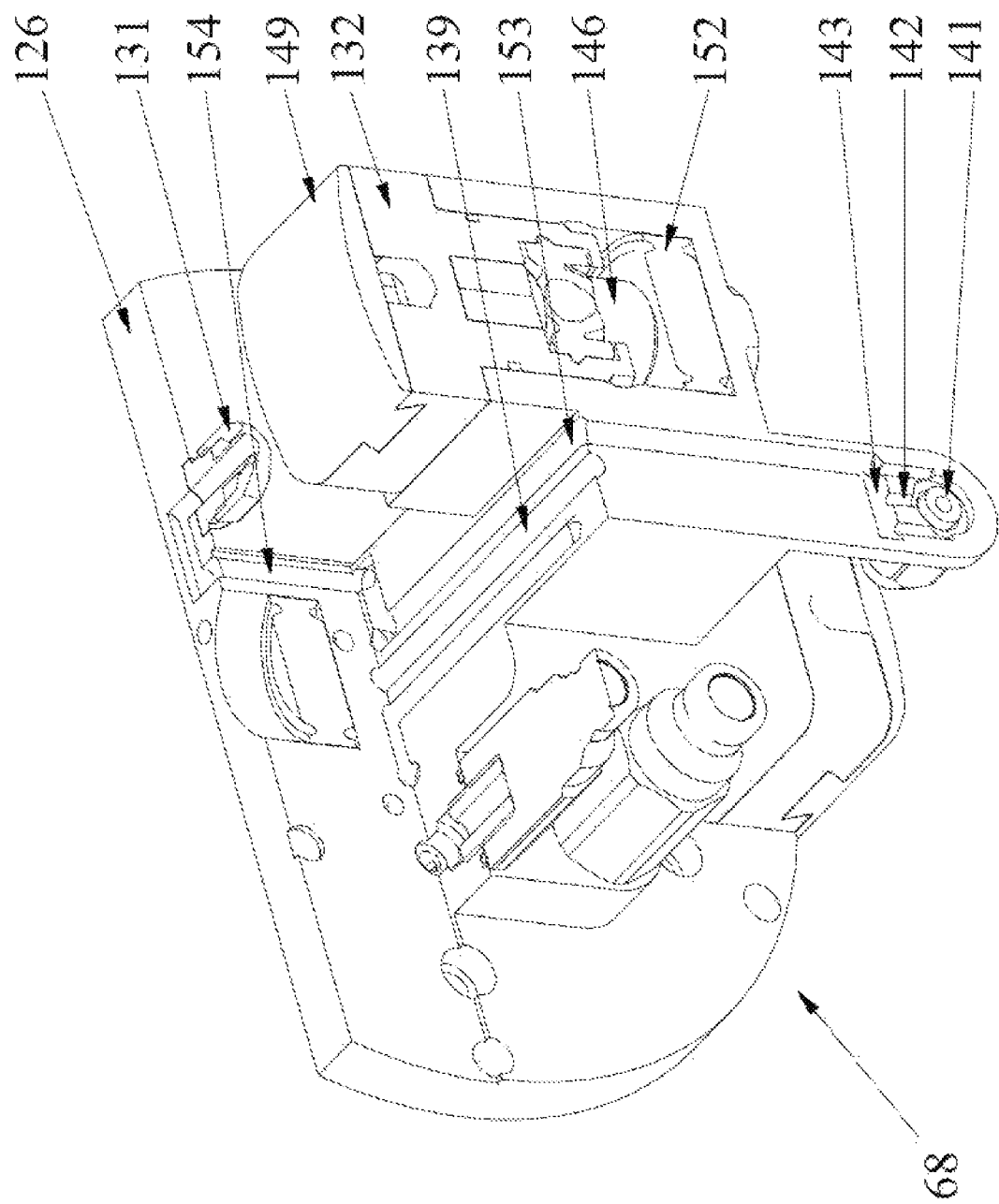
FIG. 51. Axonometric view of the compound feeding unit from the side of the pinch valves without the static mixer and the valve assembly and without the hydraulic accumulator with a complex cutout along the planes passing through axes of bypass loop channels that connect the central opening of the compound feeding nozzle 141 to said annular space with the nipple 131 of the pinch valve 132.
Figure 52:
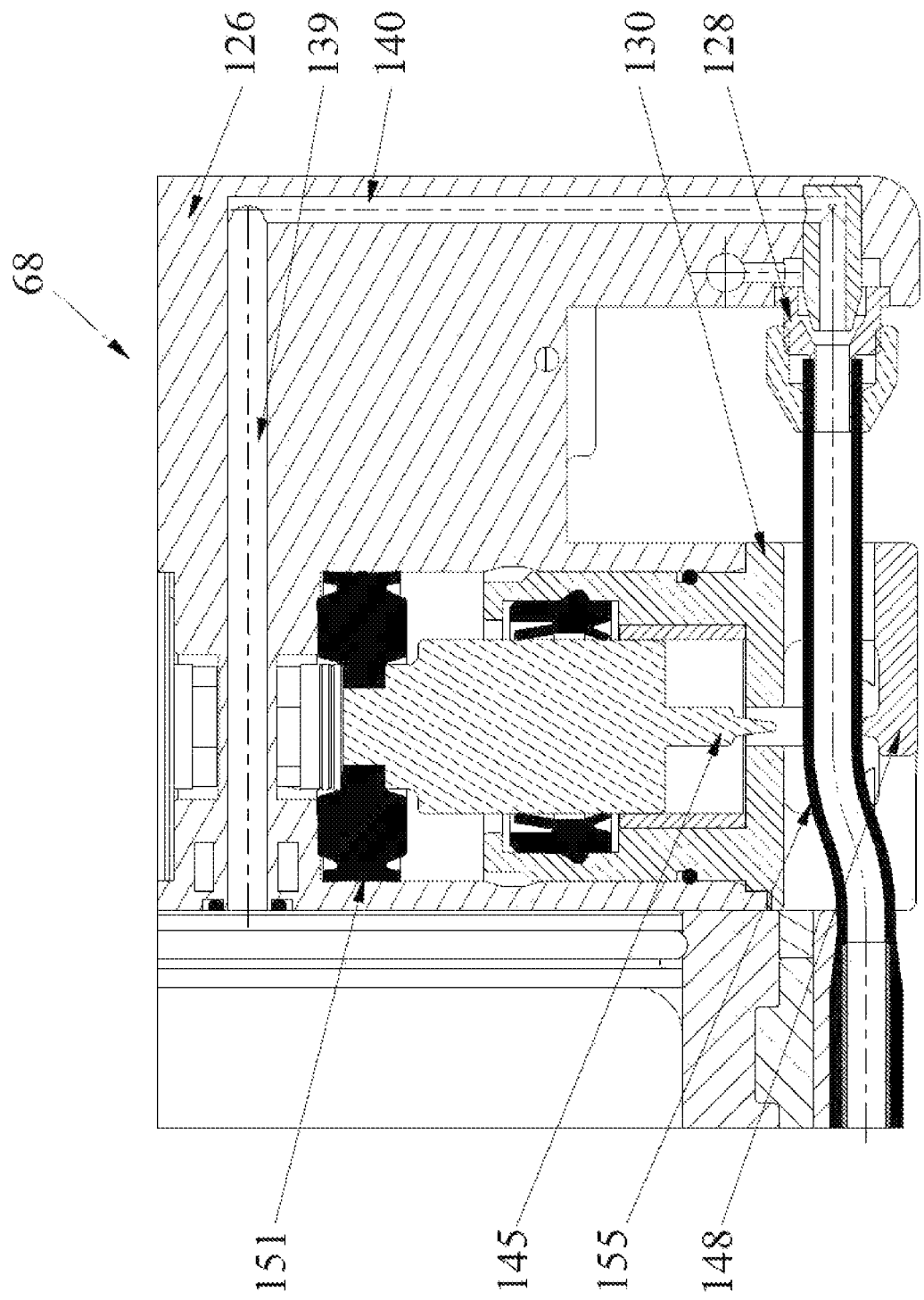
FIG. 52. Local section of the compound feeding unit along a plane passing through axes of the compound feeding channels—the pinch valve 130 open.
Figure 53:
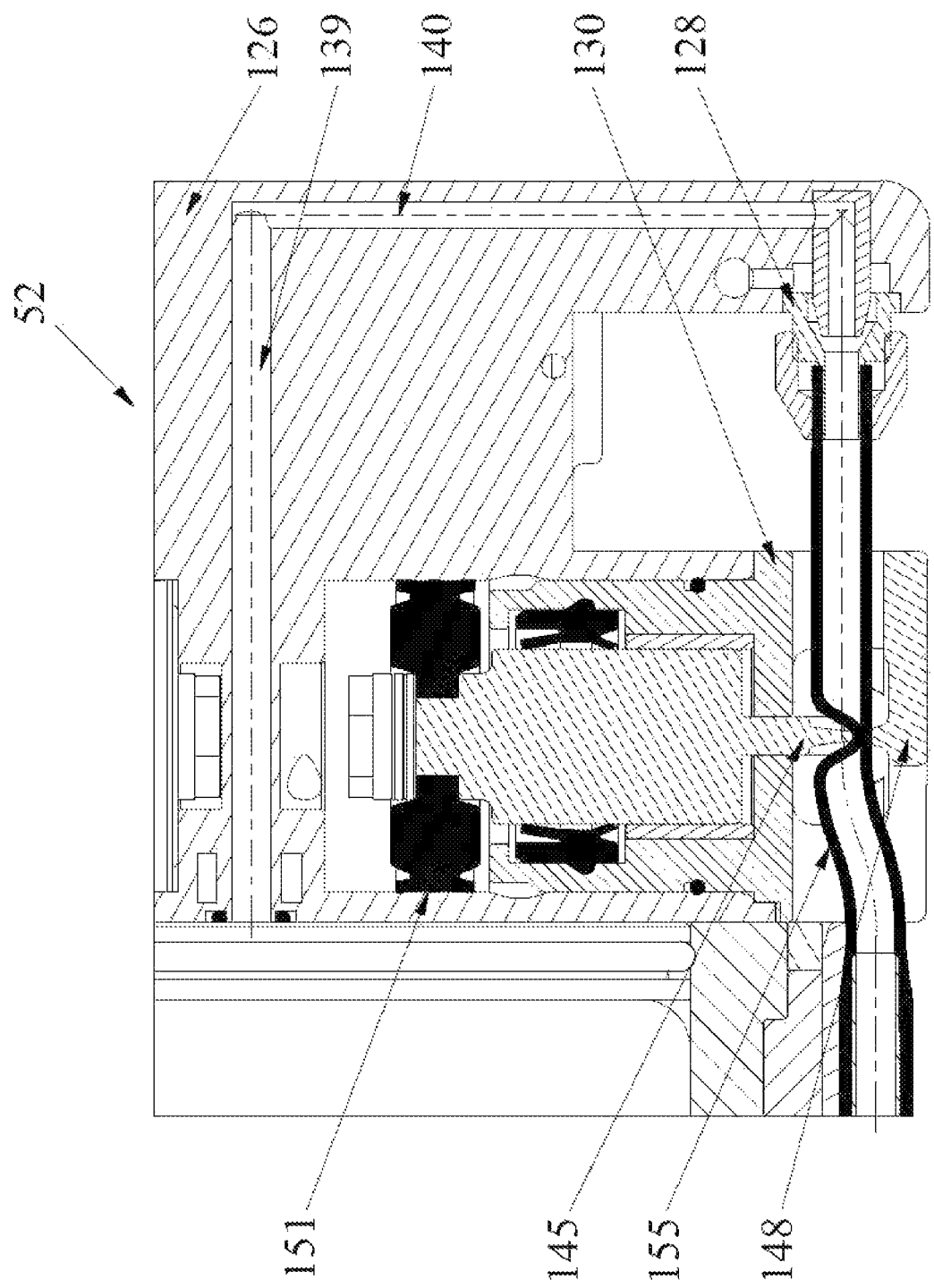
FIG. 53. Local section of the compound feeding unit along the plane passing through axes of the compound feeding channels—pinch valve 130 shut.

The design of the flow control assembly 68 is clarified in FIG. 50. A channel 139 (FIG. 50) located in the center of the flow control assembly 68 at the outlet of the static mixer 72 on the side of the flange 126 has an annular groove to mount an O-ring and connect to the channel 114 (FIG. 35) in the casing 76 of the static mixer 72 with the valve assembly 66 at the inlet. A channel 140 (FIG. 50) connects the channel 139 to the inner opening of a nozzle 141. There is an annular space between the outer surface of the nozzle 141 and the inner surface of the nipple 128 that connects channels 142 and 143 of a bypass circuit. Actuators of the pinch valves 129, 130 and 132 are rods 144, 145 and 146, respectively, each has a specially profiled end face. A cover 147, 148 and 149 of each pinch valve 129, 130 and 132 has a special integrated stop. The rod 144, 145 and 146 of each pinch valve 129, 130 and 132 is driven by a piston 150, 151 and 152, respectively. The image shown in FIG. 51 illustrates passage of bypass circuit channels 153 and 154 that connect the channels 142, 143 to the channel of the nipple 131. FIG. 52 illustrates a sectional view of the flow control assembly 68 with the pinch valve 130 in the open position. An elastic tube 155 for feeding the compound that connects the nipple 128 to the sealed inlet is located between the rod 145 and the cover 148 of the pinch valve 130 with a stop. FIG. 53 illustrates a sectional view of the flow control assembly 68 with the pinch valve 130 in the closed position.

The pinch valves 129 and 132 have similar design and are installed, respectively, on elastic tubes for evacuating gas out of the annular space 19 and for discharging the compound and washing fluid.

Figure 54:
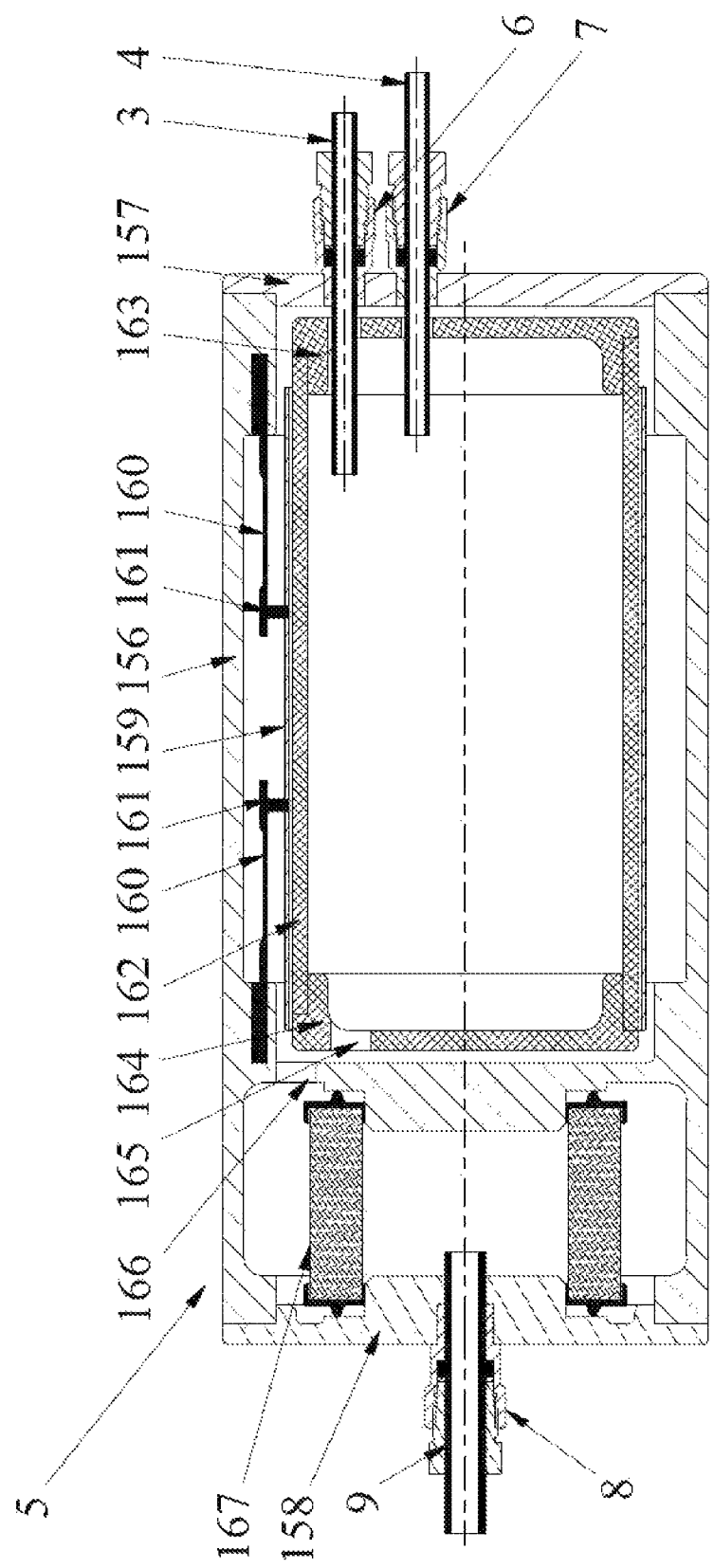
FIG. 54. Vacuum trap.

FIG. 54 shows the design of the vacuum trap 5 (FIG. 2). The vacuum trap 5 includes a casing 156 that has a cylindrical shape. The internal cavity of the casing 156 is divided by a built-in partition into small and large chambers. The large chamber is covered by a cover 157 and the small chamber is covered by a cover 158. The casing 156 and the covers 157, 158 constitute an airtight housing. The fittings 6 and 7 are installed in the cover 157. The tubes 3 and 4, respectively, are inserted into the inner cavity of the large chamber through the fittings 6 and 7. The fitting 8 is installed in the cover 158. The tube 9 is inserted into the small chamber cavity through the fitting 8. There is a thin-walled shell 159 in the inner cavity of the large chamber placed coaxially to the casing 156. The shell 159 is hung to the casing 156 on load cells 160 by means of swivel joints 161. There is a reservoir in the inner cavity of the shell 159 directly on its surface that consists of a cylindrical body 162 and easily removable covers 163, 164, made of anti-adhesion material, such as polyethylene. The tubes 3 and 4 are inserted into the reservoir cavity through two holes in the cover 163. There is an opening 165 in the cover 164 that provides a connection of the cavity of the small chamber with the cavity of the large chamber and the cavity of the reservoir through the opening 166 in the partition of the casing 156. The air filter 156 is installed in the cavity of the small chamber coaxially to the casing 167.

Figure 55:
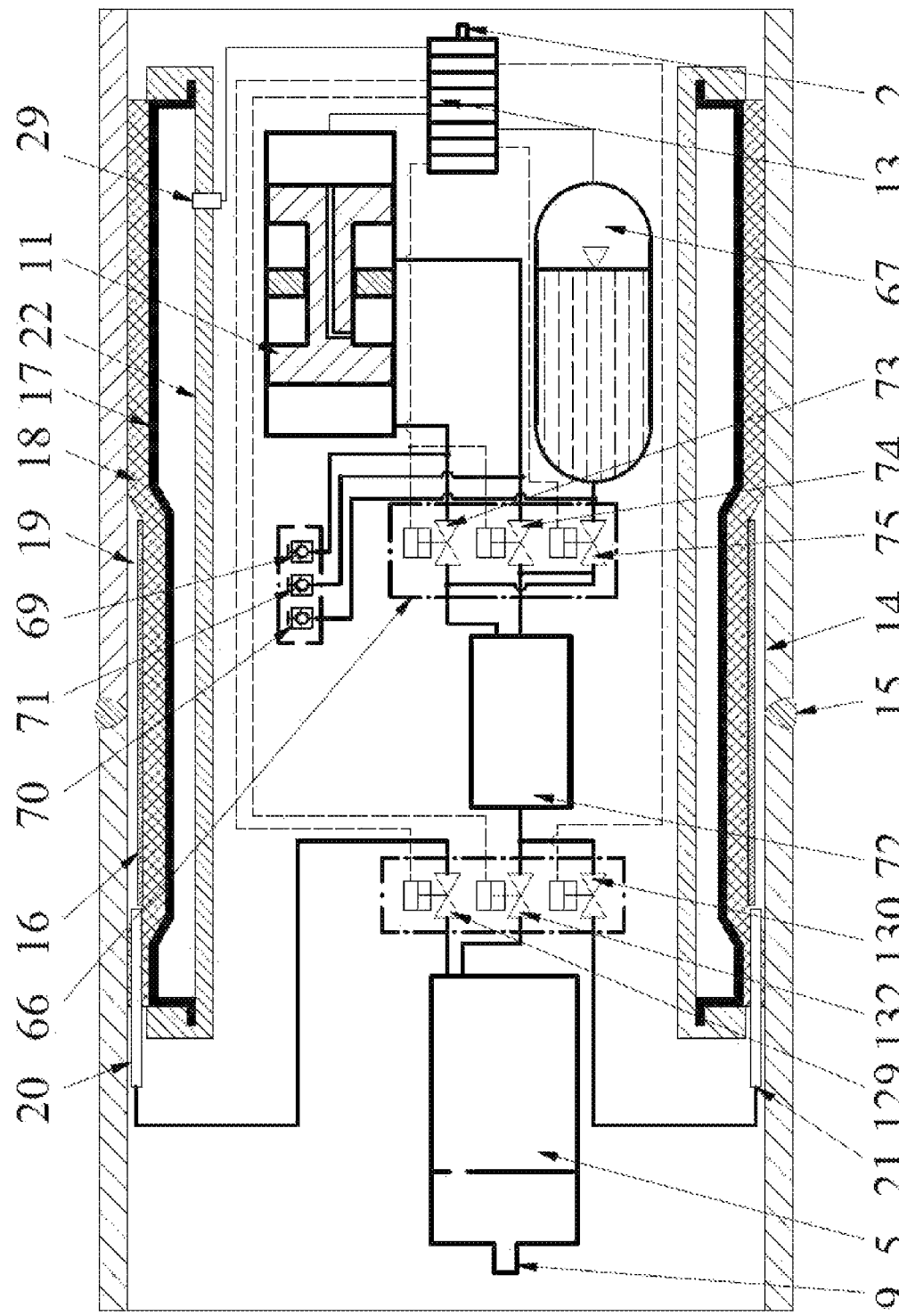
FIG. 55. Schematic diagram of the suggested device.

The principal scheme of the suggested device equipped with a vacuum trap is shown in FIG. 55. The suggested device is equipped with a distributed microprocessor system (not shown in the diagrams and drawings). The distributed microprocessor system is based on the following microcontrollers: TM4C1294NCPDT by Texas Instruments and microsensors MEMS.

The above layout (FIGS. 3, 4, 14) of the device 1 (FIG. 1) is the most universal and suitable for inside insulation of the pipeline welded joint in the widest range of diameters. In this case, said layout is practically the only layout, which can be used in the device 1 designed for internal insulation of the pipeline welded joint with a diameter not exceeding 159 mm. This layout provides the most compact and tight placement of all the components and units of the device 1 in the inner cavity of the cylindrical casing 22 (FIGS. 7 and 14) of the sealing unit 10 (FIG. 3), while the cavity serves as the casing of the device 1. This allows for the smallest possible dimensions of the device 1. When using said layout, the minimum size of the device 1 is determined by the size of the used valves 73, 74, 75 (FIG. 26) of the compound feeding unit 12 and the pneumatic valve island 56 (FIG. 20) of the pneumatic automation unit 13. The small-sized pneumatic valve island 56 (10 CPV by FESTO) and valves 73, 74, 75 of special design used in the device 1 for the pipeline welded joint insulation have a surplus flow capacity, many times greater than the capacity required. Therefore, designs of different sizes of devices 1 for the welded joint inner insulation intended for pipelines of different diameters can be used with the same sizes of the pneumatic valve island 56 (FIG. 20) and valves (73, 74, 75). Thus, excess space is formed in the device 1 designed for the pipeline welded joint inner insulation with a diameter greater than 159 mm in the inner cavity of the casing 22 (FIG. 14) in the area of the pneumatic automation unit 13 and compound feeding assembly 12. Moreover, the larger the diameter of the pipeline device 1 is designed for, the larger the diameter of the casing 22 is used, the larger the volume is the internal cavity of the casing 22, and more free space is formed in the cavity of the casing 22. As the diameter of the casing 22 grows, the total capacity of the dosing unit increases accordingly. With the pipeline diameter increase the amount of compound needed to fill the cavity of the annular space 19 (FIG. 5) increases as well. However, with the increase in the pipeline diameter, and accordingly, the casing 22 diameter, the rate of increase in the total volume of the dosing unit exceeds the rate of increase in the amount of compound required to fill the increasing volume of the annular space 19. Due to the above, it is possible to significantly reduce the total volume of the dosing unit at the expense of reducing the total stroke L and/or diameter D of the pistons 45, 46 in the piston assembly (FIGS. 17, 18, 19).

The free space in the inner cavity of the casing 22 makes it easy to change the layout of the device 1. For example, the compound feeding unit 12 can be combined with the pneumatic automation unit 13, or sequential placement of components along one axis can be avoided and the dosing unit, compound feeding unit 12 and pneumatic automation unit 13 can be arranged in three parallel axes offset radially from the device 1, it will help reduce the length of the device 1 at least by half. However, with the reduction of the device 1, the length of the elastic shell 18 (FIG. 4) of the sealing unit 10 (FIG. 3) also decreases. Excessive reduction in the length of the elastic shell 18 inevitably results in significant deterioration of the quality of the annular space 19 sealing of the welded joint 15 and deterioration of the operation ability of the device 1 sealing unit 10. The most optimal length of the elastic shell 18 is the length of the protective bushing 16 by a factor of two or three. In this case, the elastic shell 18 with the minimum length can be used to insulate the pipeline welded joints that have a high quality of the inner surface. It is highly advisable to use the device 1 with a longer elastic shell 18 on pipelines with unstable or poor quality of the inner surface. Compliance with these recommendations prevents the deterioration of the sealing unit 10 of the device 1. In this way, the minimum permissible length of the device 1 is mainly determined by the length of the elastic shell 18 of the sealing unit 10. However, reduction of the device 1 length by changing its layout can only be possible if the condition of minimum/optimal length of the elastic shell 18 is observed.

It is experimentally established that the option of the device 1 layout described above and shown in FIG. 14, has the most significant advantages. At the same time, the device 1 designed for internal insulation of the pipeline welded joints with a diameter over 159 mm allows to integrate additional components and/or devices (compressed air cylinder; air reducer; mini compressor; built-in vacuum pump; vacuum trap, etc.) into the casing of the pneumatic automation unit 13 and/or into the casing of the compound feeding unit 12.

So, the layout of the device 1 presented above (FIG. 14) is not the only possible, but also the most universal and preferable for almost all diameters of the pipeline. With the increase in the device 1 diameter, the preferred layout significantly increases the device functionality. The multi-functionality of the main units 10, 12 and the unit 13 (FIG. 3) results in a significant reduction in the number of parts and detachable connections in the device 1, which significantly increases the reliability of the equipment and reduces its weight and dimensions.

The inner insulation of the pipeline welded joint 15 was performed in two options:
1) by means of the proposed device equipped with a vacuum trap (FIG. 2);
2) by means of the proposed device without a vacuum trap (FIG. 1).

The inner welded joint 15 was insulated in both options on the pipeline with an outer diameter of 159 mm and a wall thickness of 6 mm. Thin-walled cylindrical protective bushings 16 of stainless steel 304 with an outside diameter of 141 mm and a wall thickness of 0.55 mm were used for insulation. The length of the protective bushings was 180 mm.

The two-component hydrolysis-resistant polyurethane system cured at room temperature was used as a compound: Polyol CG9 9008 75 MF+Isocyanate B9 M10 by Covestro. Mixing ratio by volume was 38.5:100. The lifetime of the compound after mixing its components at 23 degrees Celsius is 7 . . . 10 minutes. A solvent was used as a washing liquid.

The device used for the internal insulation of the welded joint had an integrated dosing unit of the two-component compound with the following features: piston 45 and 46 diameter—90 mm; rod 47 diameter—70.58 mm; ratio of rod working area to piston working area 38.5:100; full working stroke length of piston assembly 11—85 mm; full volume of the dosing unit—0.748 liters, volume of the hydraulic accumulator 67—0.525 liters.

The inner insulation of the pipeline welded joint 15 was performed at an ambient temperature of minus 26 degrees Celsius. The temperature of the compound components inside the dosing unit and of the washing fluid inside the hydraulic accumulator 67 was maintained between plus 23 and 25 degrees Celsius during the entire process of the pipeline welded joint 15 insulation. The suggested device was thermoregulated by means of a film electric heater 23 (FIG. 58) of 2.8 kW power. Heating and operation of the suggested device inside the pipeline 14 cavity was controlled by the built-in distributed microprocessor system based on the program uploaded into the control system internal memory. Before initiating the inner insulation process, an electric band heater (not illustrated in the drawings) with an autonomous power supply and temperature controller was installed on the outside of the pipeline 14 at the joint to be insulated. The heating temperature was set to +30 degrees Celsius. The electric band heater was dismantled in 30 minutes after removing the suggested device from the pipeline 14 cavity.

The first option of the pipeline welded joint inner insulation with the use of the suggested device, equipped with a vacuum trap, was performed as follows.

Stage 1. Works on stage 1 involved service personnel. The suggested equipment was prepared for work on the welded joint 15 inner insulation. In the initial position of the device 1, the valves 73, 74, 75 (FIG. 55) were in the closed state. The valves 129, 130, 132 (FIG. 55) were forced into the open state. New elastic tubes 3, 4 and 155 (FIG. 56) were installed on the device 1 designed for operating in vacuum and withstanding operation at overpressure up to 10 bar at temperatures ranging from minus 40 to plus 40 degrees Celsius. The integrated dosing unit was filled using a mobile dosing unit (not shown in the diagram). Two hoses of the refueling device with appropriate quick couplings were connected to the quick-release couplings 69 and 71 (FIG. 56, 55) of the suggested device 1. CG9 9008 75 MF polyol hose was connected to the quick-release coupling 69, and B9 M10 isocyanate hose was connected to the quick-release coupling 71. The integrated quick couplings 69 and 71 prevent any other connection thereby eliminating the possibility of improper dispensing. Isocyanate and polyol were filled synchronously until the piston and rod cavities 51, 52, 53, 54 of the dosing unit were completely filled at 6 bar. As the dosing unit was being filled, the flow of polyol CG9 9008 75 MF through the quick-release coupling 69 flowed sequentially through channels 125 and 124 (FIG. 44) in the flow control assembly 68 at the static mixer 72 outlet. The polyol flow was directed from the channel 124 to the channel 103 in the casing 76 (FIGS. 31, 26) of static mixer 72 with valve assembly 66. Then, the polyol flow passed through the channels 102 and 99 (FIG. 31) in the casing 76. Polyol passed through the channel 99 (FIG. 34) into supercharge cavity 87 of the valve 73. From the supercharge cavity 87 of the valve 73, polyol was pumped through the channel 43 (FIGS. 35, 14) into the piston operating cavity 51 (FIG. 17) of the dosing unit.

B9 M10 isocyanate was fed through the quick-release coupling 71 (FIG. 42) to the channel 122 constructed in the flow control assembly 68 at the static mixer 72 outlet. The flow of isocyanate from the channel 122 passed through the longitudinal channel 36 along the casing 22 of the sealing assembly 10 to the radial channel 37. Isocyanate was pumped through the channel 37 into the rod operating cavity 52 (FIG. 17) of the dosing unit.

Figure 56:
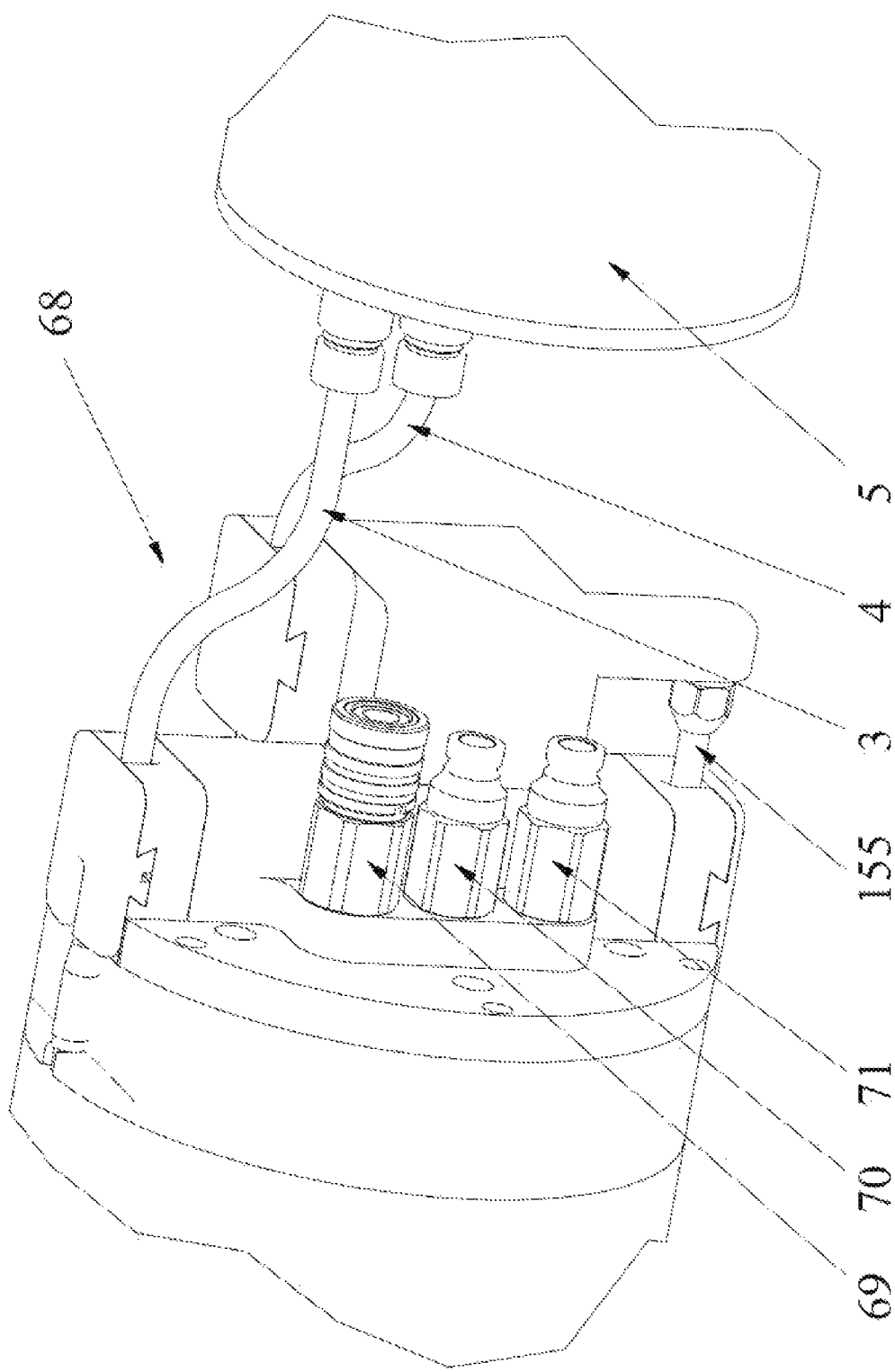
FIG. 56. Location of replaceable tubes and quick-release couplings for refueling the suggested device.

The dosing unit cavity filling was monitored by two pressure sensors built into the dosing unit. In this case, the stabilization of the fluid pressure at 6 bar indicates the completion of the dosing unit filling process. After filling the dosing unit, the hoses were disconnected from the quick-release couplings 69 and 71 (FIG. 56).

Figure 40:
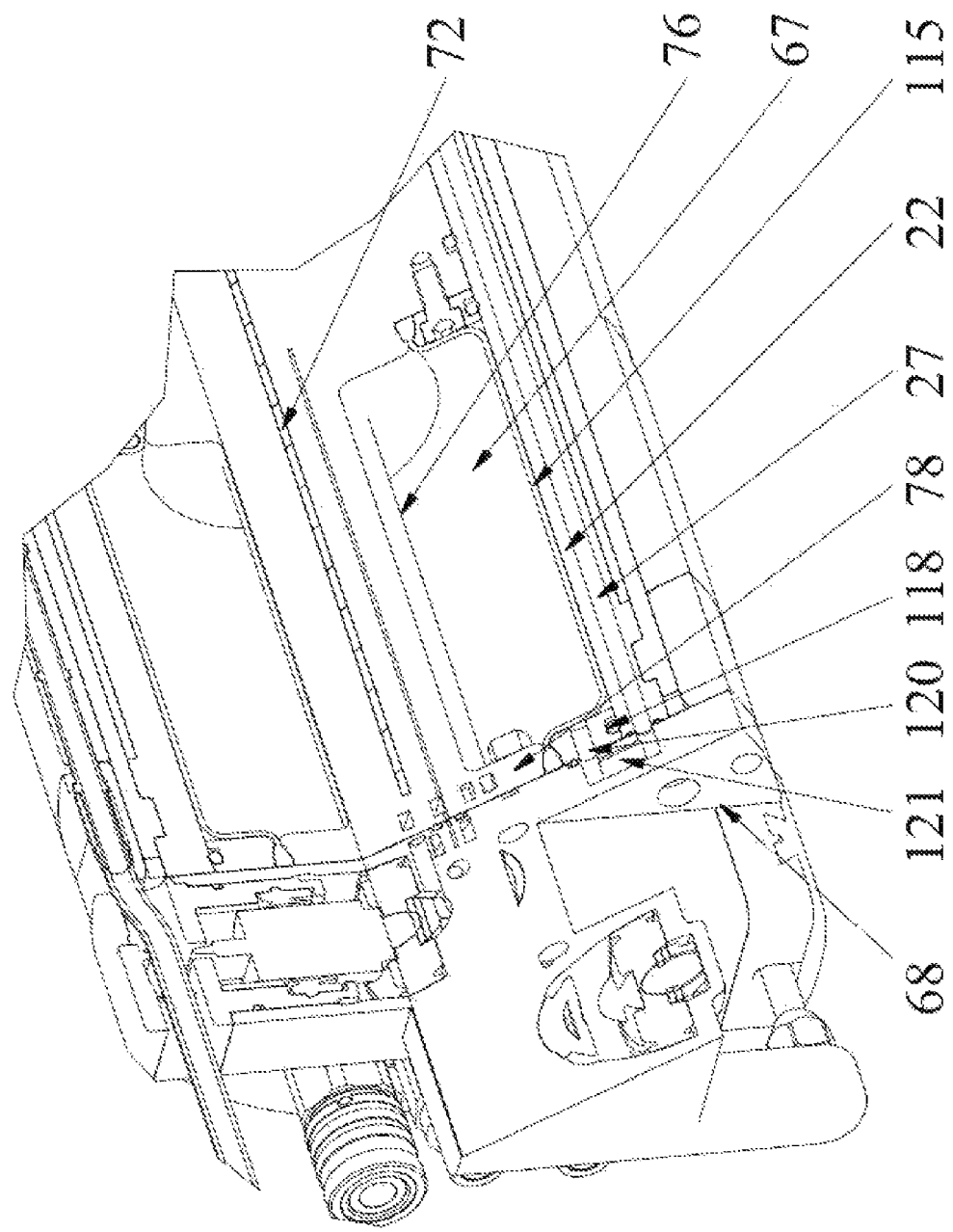
FIG. 40. Axonometric view of a hydraulic accumulator with a cutout on a plane passing through axes of the compressed air discharge channels.
Figure 41:
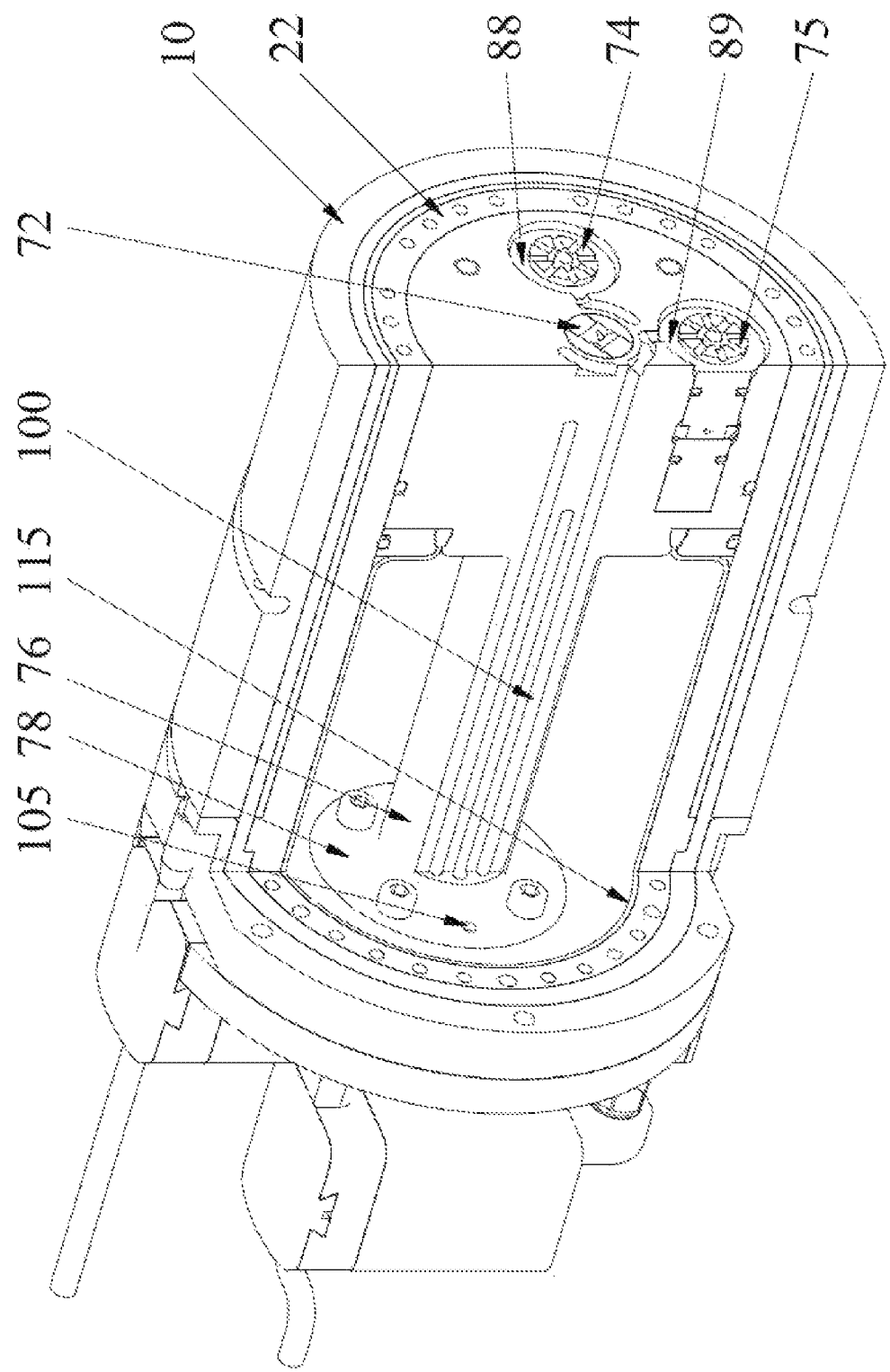
FIG. 41. Axonometric view of a hydraulic accumulator with a cutout and view of channel 105 in the hydraulic cavity.

The hydraulic accumulator 67 (FIG. 62) was filled with washing fluid through the quick-release coupling 70 (FIG. 43). The washing fluid was fed into the hydraulic accumulator 67 inner cavity under overpressure of 2 bar. Before filling the hydraulic accumulator 67, compressed air pressure was released from its external pneumatic cavity through the channels 27, 121, 120 (FIG. 40). During the filling, the fed washing fluid consistently passed through the quick-release coupling 70, channel 123 and then it was pumped through the channel 105 into the inner cavity of the hydraulic accumulator 67 (FIGS. 43, 41). The filling of the inner cavity of the hydraulic accumulator 67 to its full capacity was monitored by the pressure reading in the filling device of the washing fluid at atmospheric pressure in the hydraulic accumulator 67 pneumatic cavity. The overall time to fill the dosing unit and hydraulic accumulator 67 was about 60 seconds.

Figure 57:
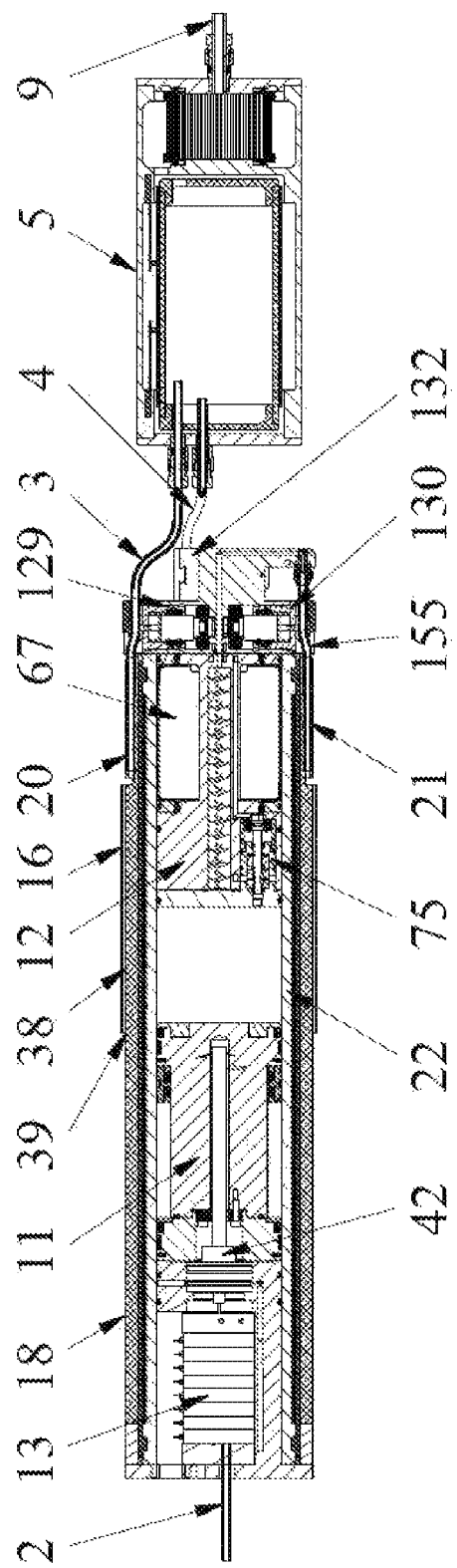
FIG. 57. Suggested device with the vacuum trap in condition to prepare it to be inserted into the pipeline cavity to perform welded joint inner insulation.
Figure 58:
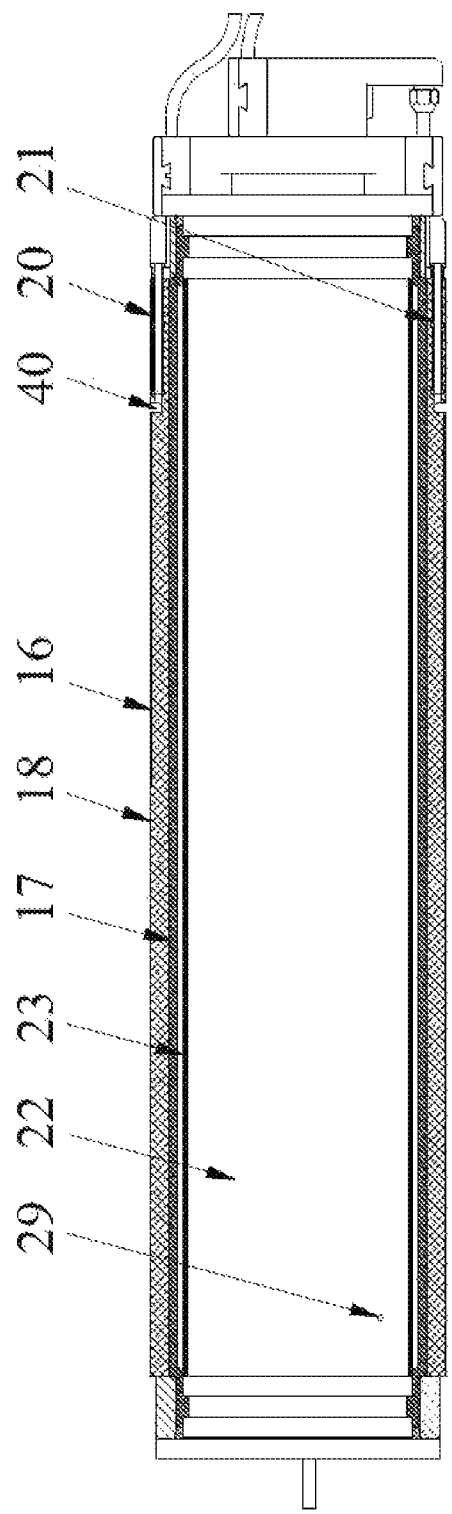
FIG. 58. Suggested device in the state of engaging the protective bushing on the elastic shell bedding.

The protective bushing 16 was mounted on the device. Installation of the protective bushing 16 is clarified in FIG. 57. The protective bushing 16 was inserted coaxially on top of the device and placed on the bedding 38 (FIG. 11) of the elastic shell 18, so that its side stoppers 39 were aligned with the ends of the protective bushing 16. Compressed air was fed into the closed airtight circuit created by the casing 22 (FIG. 7) and the elastic hose 17 of the sealing unit 10 (FIG. 3) from the pneumatic valve island 56 (FIG. 20) of the pneumatic automation unit 13 (FIG. 3). The elastic sleeve 17 (FIG. 58) inflated and expanded the elastic shell 18. The bedding 38 (FIG. 11) made contact with the protective bushing 16 (FIG. 58). The side stoppers 39 (FIG. 11) of the elastic shell 18 made contact with the ends of the protective bushing 16 (FIG. 58) and fixed it. When the protective bushing 16 fixation on the elastic shell 18 (FIG. 58) was completed, the supply of compressed air in a leak-tight circuit created by the casing 22 (FIG. 7) and the elastic hose 17 of the sealing unit 10 (FIG. 3) was completed, and the pressure was fixed with the pneumatic valve island 56 (FIG. 20). Further expansion of the elastic sleeve 17 (FIG. 58) and the elastic shell 18 was suspended. Preparation of the suggested device for work on the welded joint inner insulation has been completed. In total, it took 2 minutes and 50 seconds to prepare the device.

Figure 59:
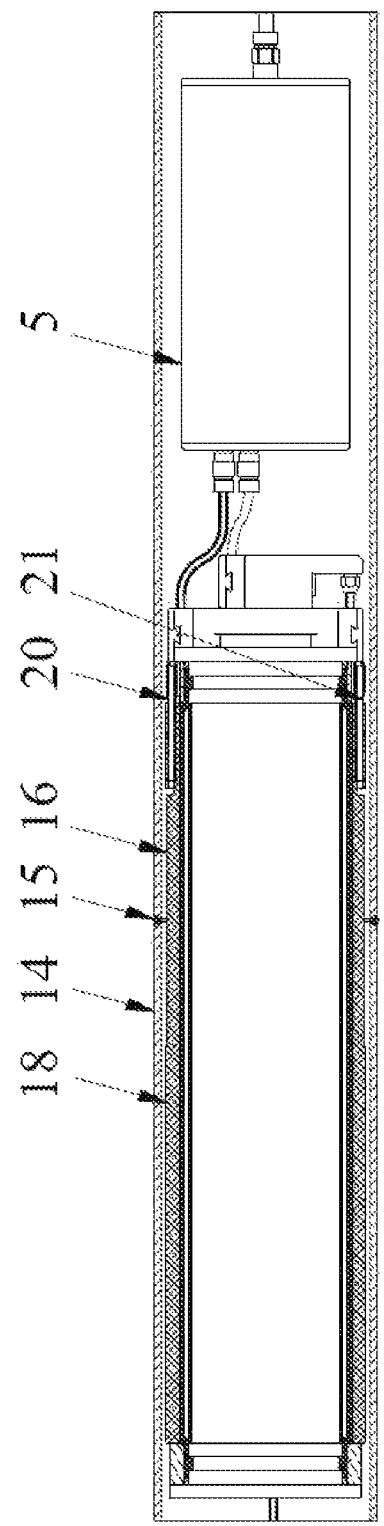
FIG. 59. Suggested device with a vacuum trap in the pipeline cavity in the position ready to perform welded joint isolation.

Stage 2. The suggested device was inserted into the inner cavity through the open end of the pipeline 14 (FIG. 59) and placed in such a way that the welded joint 15 was centered on the protective bushing 16 fixed to the elastic casing 18. In this case, between the outer surface of the elastic shell 18 and the inner surface of the pipeline 14, there was an annular space of about 3 mm thick. In most cases, this size of space is considered the most optimal. Reduced clearance due to pipe ovality makes it slightly more difficult to transport the device through the pipeline inner cavity. A larger space leads to an unreasonable decrease in the cross-section of the pipeline after the welded joint insulation and higher material expenditures due to higher compound consumption.

Figure 60:
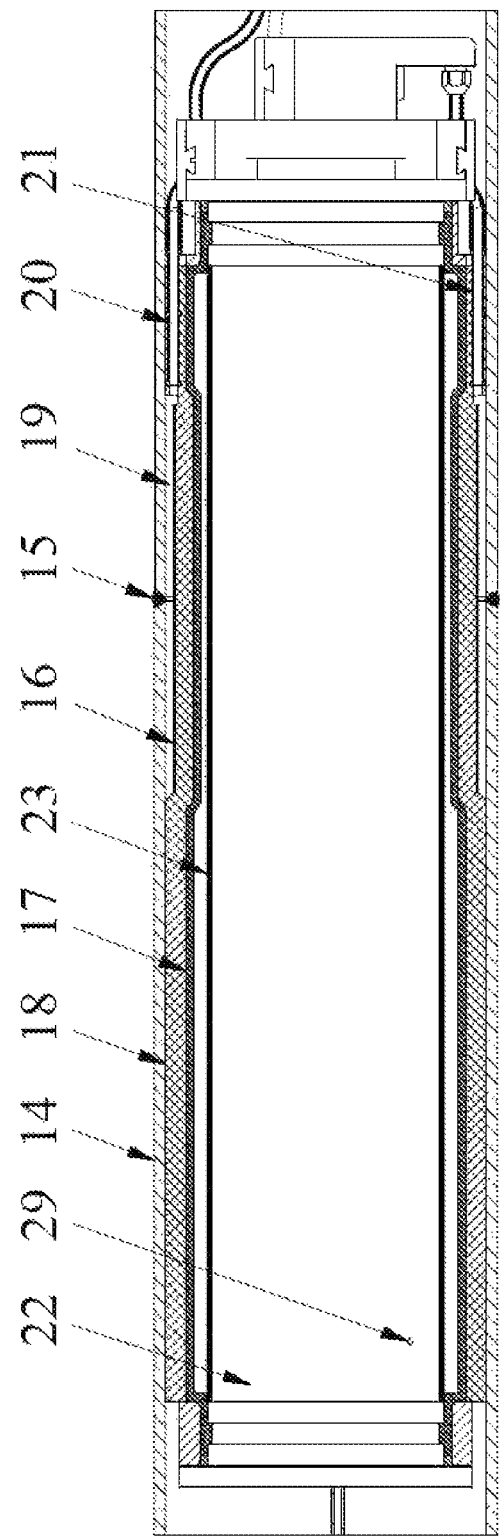
FIG. 60. View of the suggested device in the pipeline cavity after pressure increase in the sealing unit actuator.

Stage 3. As soon as the device positioning through the channel 35 (FIG. 13) in a closed leak-tight circuit formed by the casing 22 (FIG. 7) and the elastic hose 17 of the sealing unit 10 (FIG. 3) was over, the supply of compressed air continued. As the pressure increases, the elastic hose 17 (FIG. 60) inflated and expanded the elastic shell 18 to its stop on the inner surface of the pipeline 14. A pressure of 10 bar was set in a sealed circuit between the casing 22 and the elastic hose 17. The closed annular space 19 was formed between the protective bushing 16 and the inner surface of the pipeline 14. On the side of the compound feeding unit 12, the cavity of the annular space 19 was connected to the channels of airtight inlets 20 and 21.

Figure 61:
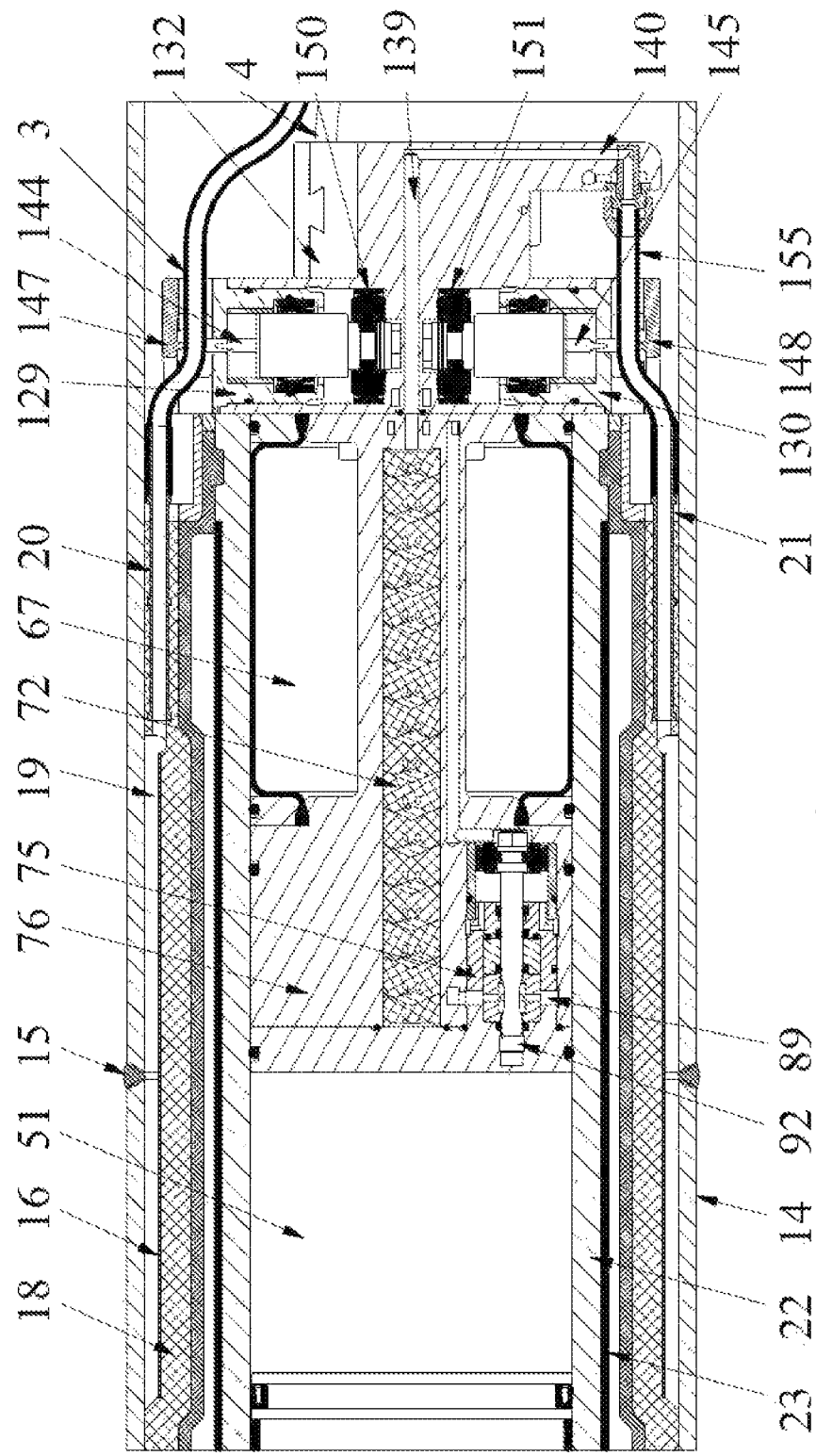
FIG. 61. View of the compound feeding unit at the stage of air evacuation from the annular space of the pipeline welded joint.
Figure 62:
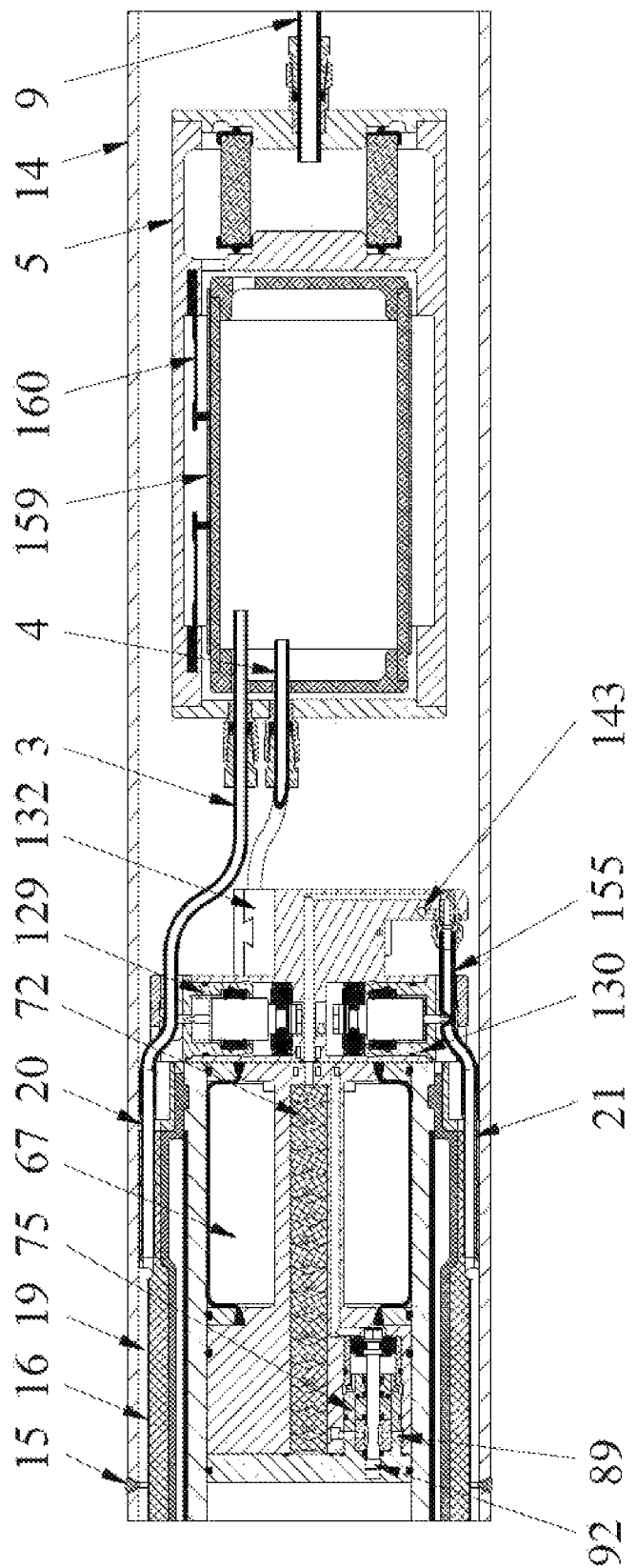
FIG. 62. Local longitudinal section of the device inside the pipeline cavity along the plane passing through the axes of channels 20 and 21 of the elastic shell in the condition prepared for starting the process of filling the annular space in the joint area.

Stage 4. The annular space 19 in the welded joint 15 area (FIGS. 55, 61, 62) and the compound feeding unit 12 (FIG. 4) were vacuum treated. For this purpose, a vacuum pump (not illustrated in the drawings) connected to the tube 9 of the suggested device (FIG. 2, 62) was used. In this case, the small vacuum pump was located in the pipeline inner cavity 14 directly near the vacuum trap 5. The air was evacuated through the tube 9 from the inner cavity of the vacuum trap 5 (FIG. 62). At the same time, the channels of the tube 3 (FIG. 61, 62, 2), airtight inlet 20 and annular space 19 in the welded joint 15 area were vacuum treated. The air was pumped out of the airtight inlet 21 of the tube 155, channels 140 and 139 (FIG. 52) and the static mixer 72 (FIGS. 61, 62) through the annular space 19 (FIG. 61). The channels 108-113 and the discharge cavities 90, 91 and 92 of the valves 73, 74, 75 (FIGS. 35 and 36) were vacuum treated through the static mixer 72. In addition, the air was pumped out of the channels 142, 143 (FIG. 50), 153, 154 (FIG. 51), nipple 131 (FIG. 51, 46) and the tube 4 (FIG. 62). With the pinch valves 129, 130 and 132 (FIG. 62) opened, all the vacuumed cavities and ducts communicate with each other. Therefore, air was evacuated with open pinch valves 129, 130 and 132, which ensured a minimum duration of vacuuming. It took 45 seconds to evacuate the air to an absolute pressure of 2 mbar.

In the background mode, the device control system monitored the tightness of the annular space 19 (FIG. 61) during air pumping in the real time mode. The tightness control was carried out alternately by three methods: estimation of instantaneous rate of pressure decrease in the process of vacuuming; estimation of ultimate level of vacuum pressure reached; rate of leakage after completion of air evacuation from the system. In total, it took 56 seconds to evacuate air from the annular space 19 and to check its tightness.

Figure 63:
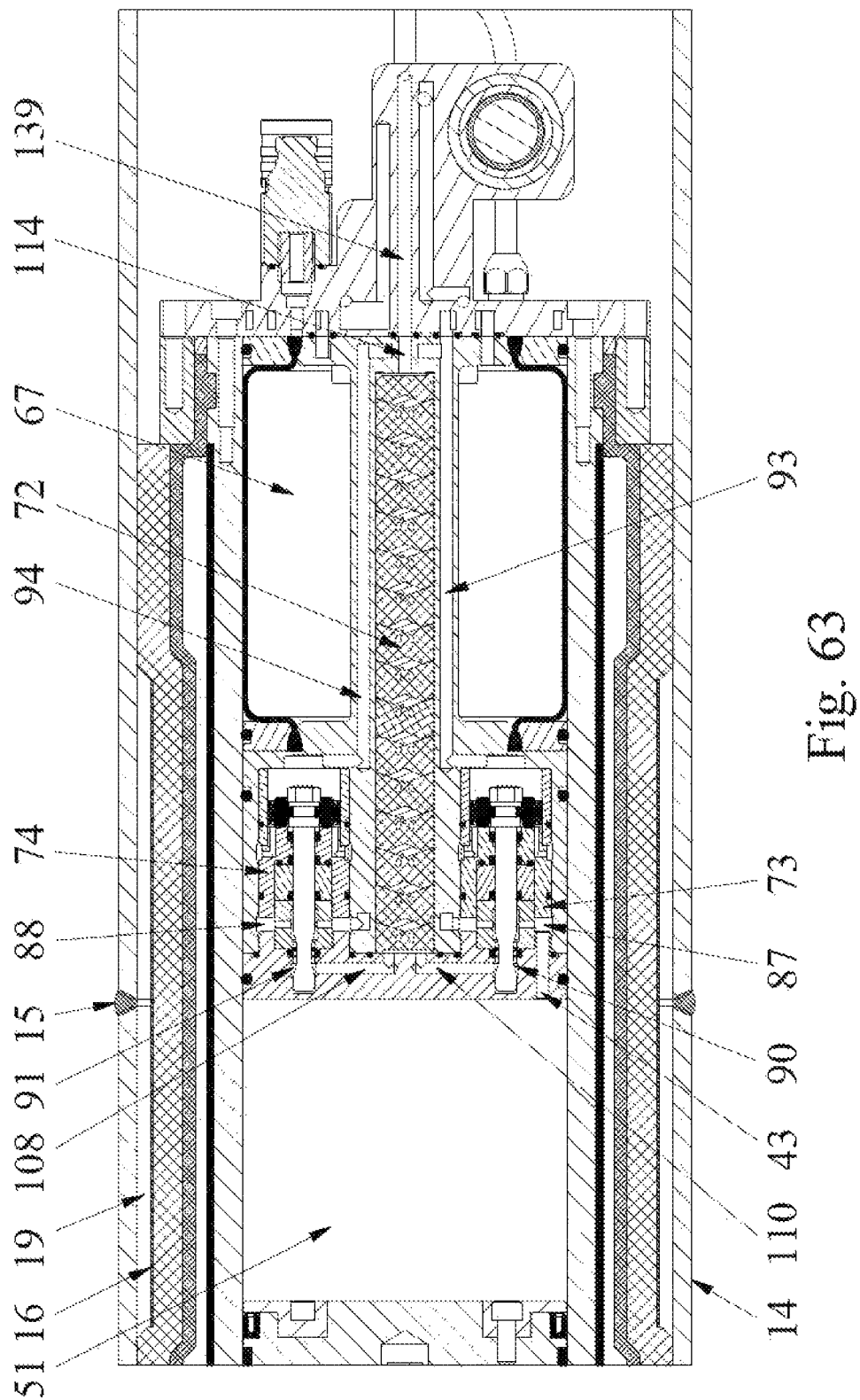
FIG. 63. Local longitudinal section of the device inside the pipeline cavity along the plane passing through axes of the valves 73 and 74 in the open state.

Stage 5. The pneumatic automation unit 13 was used to pump compressed air into the piston drive cavity 53 of the dosing unit through the channel 44 (FIG. 15). In doing so, compressed air was pumped into the rod drive cavity 54 of the dosing unit from the piston drive cavity 53 through the channels 48 and 49 (FIG. 16). The pressure in the drive cavities 53, 54 of the dosing unit has stabilized at 10 bar. The pressure has been also stabilized at 9.8 bar in the piston and rod operating cavities 53, 54 of the dosing unit. The pinch valve 130 (FIG. 62) was shut off. In this case, the pinch valves 129 and 132 were opened. In the initial state, the valves 73 and 74 were closed. The compound components were pumped into the supercharge cavities 87 and 88 of the valves 73 and 74 (FIG. 34) from the operating cavities 51, 52 of the dosing unit at a pressure of 9.8 bar. At the same time, polyol from the piston operating cavity 51 of the dosing unit put pressure directly into the supercharge cavity 87 of the valve 73 through the channel 43 (FIG. 14, 19, 35, 63). Isocyanate located in the rod operating cavity 52 of the dosing unit put pressure in the supercharge cavity 88 of the valve 74 through the channels 37, 36, 122 (FIG. 42) and 101 (FIGS. 34, 42). The valves 73 and 74 were synchronously driven open (FIG. 35). The compound components filled the discharge cavities 90 and 91 of the valves 73 and 74 and channels 108, 109, 110, 111 and flowed into the static mixer 72 from the supercharge cavities 87 and 88 (FIG. 35, 63) of the valves 73 and 74. The compound components simultaneously filled the channels 112, 113 and the discharge cavity 92 of the valve 75 (FIGS. 35 and 36). Polyol and isocyanate were mixed in the static mixer 72 in a strictly dosed ratio. Mixed compound was fed from the static mixer 72 into the channels 114, 139 (FIG. 63), 140 (FIG. 53) and the tube 155 (FIGS. 53, 62). Since the valve 130 was closed, the compound was not supplied into the annular space 19. At the same time, the compound was pumped through the channels 142, 143, 153, 154 (FIG. 50, 51) passed through the nipple 131 and flowed into the vacuum trap 5 (FIG. 62) by the tube 4 through the open pinch valve 132. The first batch of mixed compound was of poor quality. This was primarily caused by the fact that one of the compound components with a lower proportional mixing volume ratio filled the cavities at the inlet of the static mixer 72 and the mixer 72 itself with a certain delay, which resulted in a disturbance of the mixing proportions at the initial stage. That is why the first batch of compound was discarded to the vacuum trap 5. The amount of first batch of compound to be removed was set by the device control system program. The amount of removed compound was controlled by a special device, a separate technical solution not disclosed within the framework of the present invention. After the first batch of poor-quality compound was removed, the valve 132 was shut off and the valve 130 was opened (FIG. 61). Meanwhile, the compound passed through the feed-through plate 21 and filled the annular space 19 (FIG. 61) through the tube 155 (FIG. 61). As the annular space 19 was filled, the compound level in it increased. When the level in the annular space 19 raised to the level of the upper airtight inlet 20, the compound started leaving the cavity through the airtight inlet 20 and the tube 3 (FIG. 61) into the vacuum trap 5 (FIG. 62). At the time of limiting the compound flow into the vacuum trap 5 through the upper airtight inlet 20, the valve 129 was closed, and the valve 130 (FIG. 61) remained open. In this case, the control system automatically reduced the pressure in the dosing unit down to 6 bar. The compound was pressurized for 20 seconds. This ensured guaranteed filling of all, including microscopic, gaps, voids and pores in the annular space 19. After 20 seconds of exposure, the valves 130 (FIG. 62), and valves 73 and 74 (FIG. 63) were shut off. The compressed air pressure in the dosing unit was relieved by the pneumatic automation unit 13 (FIG. 55). The annular space 19 filling process has been completed. In total, it took 28 seconds to fill the annular space 19 with compound, considering the operations of controlling its specific density and holding it under pressure. Given the compound removed into the vacuum trap 5, its total volume spent on the inner insulation of the pipeline welded joint 15 was 0.272 liters.

Stage 6. The static mixer 72 and mixed compound supply channels in the cavity of the annular space 19 in the welded joint area 15 were flushed. Compressed air was pressurized into the cavity of the external sealed circuit of the hydraulic accumulator 67 through the channels 120 and 121 (FIG. 40). The pressure in the hydraulic accumulator 67 was set to 10 bar. The valves 132 and 75 were opened (FIG. 55). When the valve 75 (FIG. 36) was opened, the washing fluid flowed in the discharge cavity 92 from the discharge cavity 89 of the valve 75 in the hydraulic accumulator 67 (FIG. 29) under pressure. At the outlet of the discharge cavity 92 of the valve 75 (FIG. 36), the washing fluid was divided into two streams. One stream of washing fluid passed through the channel 112 (FIG. 36) to the discharge cavity 91 of the valve 74 and then through the channels 108, 109 (FIG. 35) entered the integrated static mixer 72. Another stream of washing fluid passed through the channel 113 (FIG. 36) to the discharge cavity 90 of the valve 73 and then through the channels 110, 111 entered the static mixer 72, where the two streams were combined. The stream of washing fluid passed all the way of the mixed compound from the static mixer 72 to the point of pinching the elastic tube 155 (FIG. 53) by the valve 130 rod. With the valve 130 (FIG. 53) closed, washing fluid passed along the bypass channels 142, 143, 153 (FIG. 51) and 154 to the nipple 131 through the annular slot between the nipple 128 (FIG. 50) and the nozzle 141. With the valve 132 (FIG. 62) open, mixed compound flowed into the cavity of the vacuum trap 5 through the tube 4. The washing fluid flow rate was measured by weight method by means of load cells 160 and the control system. When the flow rate of the washing fluid reached 0.150 kg, the valve 75 was closed. The washing process has been completed.

Stage 7. Polymerization. After the process of filling the annular space 19 with compound in the welded joint 15 area, the suggested device was kept in the pipeline cavity for 10 minutes.

Figure 64:
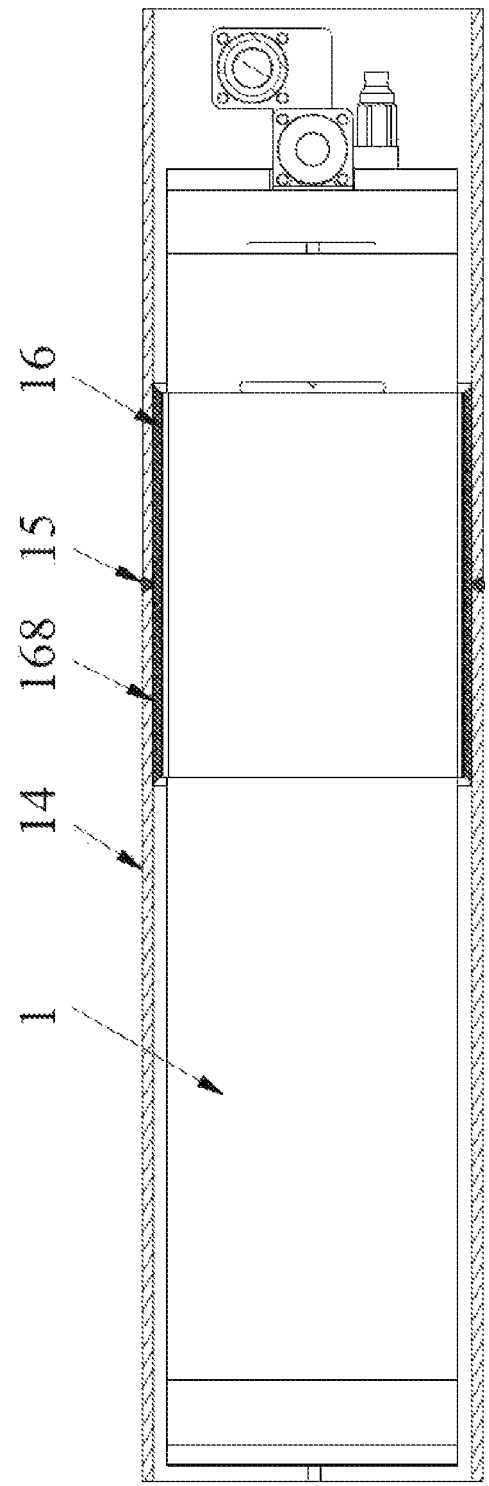
FIG. 64. View of the suggested device in the pipeline cavity after pressure drop in the sealing unit actuator.
Figure 65:
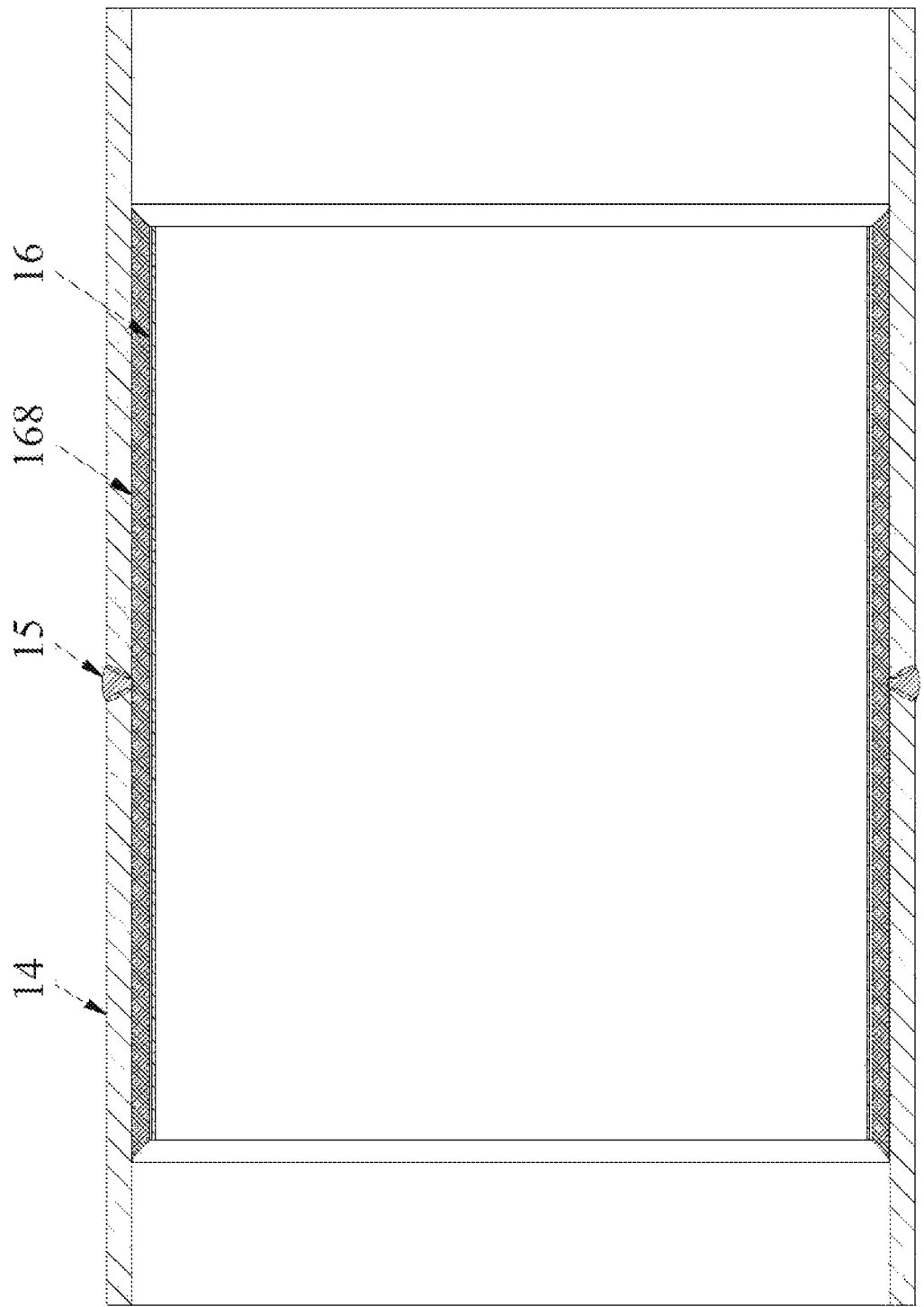
FIG. 65. View of the internally insulated welded joint after the suggested device removal from the pipeline cavity.

Stage 8. At the end of exposure, the sealed circuit formed by the casing 22 and the elastic hose 17 (FIG. 55) was depressurized. The elastic shell 18 (FIG. 55) shrunk and left the grip with the protective sleeve 16. The gap was formed between the suggested device 1 (FIG. 64) and the inner walls of the pipeline 14, as well as between the device 1 and the protective sleeve 16. The device 1 was removed from the cavity of the pipeline 14. In this case, after the device 1 was removed from the cavity of the pipeline 14, the welded joint 15 took the shape illustrated in FIG. 65. The welded joint 15 and adjacent sections of the pipeline 14 inner surface are tightly sealed by a continuous waterproof cylindrical shell of polymerized compound 168 and protective bushing 16.

Stage 9. Works on stage 9 involved service personnel. Immediately after the device 1 was removed from the pipeline 14 cavity, the elastic tubes 3, 4 and 155 were dismantled from it (FIG. 57). The airtight inlets 20 and 21 (FIG. 61) were purged with compressed air. If the time between the start of the process of filling the annular space 19 with compound in the welded joint 15 area and purging the airtight inlets 20 and 21 exceeded twice the lifetime of the mixed compound, their internal channels were cleaned with a straight steel rod of 4 mm in diameter. After full polymerization, the channels of sealed inlets 20 and 21 can be cleared by drilling them with a drill of 4 mm diameter with an electric screwdriver, for example. The reservoir was removed from the vacuum trap 5, cleaned and then the vacuum trap was reassembled.

The second option of the pipeline welded joint inner insulation with the use of the suggested device without a vacuum trap, was performed as follows.

Stage 1. The work was carried out as per stage 1 according to the first option. The difference was that the long tube 3 was connected directly to the vacuum pump with an in-line receiver, and the tube 4 was connected with one end to the airtight inlet 20 (FIG. 4), and its second end was left free with an open internal channel.

Stage 2. The work was carried out in full accordance with stage 2 of the first option.

Stage 3. The work was carried out in full accordance with stage 3 of the first option.

Stage 4. The work was carried out in accordance with stage 4 of the first option. The difference was that the pinch valve 132 was closed before the vacuum pump was turned on. Moreover, the duration of work at this stage increased to 180 sec due to the use of the long tube 3 that has a small cross-section.

Stage 5. The work was carried out in accordance with stage 5 of the first option. The difference was as follows. At the beginning of the stage, the pinch valve 132 was closed. That is why when the compound was fed, its pressure in the channels of the device increased. The compound pressure was controlled by a pressure sensor with an integrated media separator in the channel 139 (FIG. 52, the pressure sensor is not illustrated in the drawing). As soon as the compound pressure stabilized at 9.8 bar, the valve 132 was opened. The first batch of mixed compound was of poor quality. This is primarily caused by the fact that one of the compound components with a lower proportional mixing volume ratio filled the cavities at the inlet of the static mixer 72 and the mixer 72 itself with a certain delay, which resulted in a disturbance of the mixing proportions at the initial stage. That is why the first batch of compound was discarded into the cavity of the pipeline 14. The amount of first batch of compound to be removed was set by the device control system program. The amount of removed compound was controlled by a special device, a separate technical solution not disclosed within the framework of the present invention. After the first batch of poor-quality compound was removed, the valve 132 was shut off and the valve 130 was opened (FIG. 61). Meanwhile, the compound passed through the airtight inlet 21 and filled the annular space 19 (FIG. 61) through the tube 155 (FIG. 61). As the annular space 19 was filled, the compound level in it increased. When the level in the annular space 19 rose by about 80 percent of the volume of the annular space 19, the valve 129 was shut off. Monitoring of the level of filling the annular space 19 (FIG. 61) was carried out by a special device, a separate technical solution not disclosed within the framework of the present invention. When the moment of filling the annular space 19 to 80%, the valve 129 was closed, while the valve 130 (FIG. 61) remained open. In this case, the control system automatically reduced the pressure in the dosing unit down to 6 bar. The process of filling the annular space 19 cavity continued. The moment when the annular space 19 is filled was monitored by the compound pressure in the channel 139 (FIG. 52). Once the pressure was stabilized, the cavity of the annular space 19 was pressurized for twenty seconds (FIG. 61). This ensured guaranteed filling of all, including microscopic, voids and pores in the annular space 19. After 20 seconds of exposure, the valves 130 (FIG. 61), and valves 73 and 74 (FIG. 63) were shut off. The compressed air pressure in the dosing unit was relieved by the pneumatic automation unit 13 (FIG. 55). The annular space 19 filling process has been completed. In total, it took 30 seconds to fill the annular space 19 with compound and expose it under pressure. The total volume of compound consumed for the pipeline welded joint inner insulation was 0,312 liters.

Stage 6. The work was carried out in accordance with stage 6 of the first option. The difference was that the washing liquid was removed directly into the pipeline cavity through the tube 4.

Stage 7. The work was carried out in full accordance with stage 7 of the first option.

Stage 8. The work was carried out in full accordance with stage 8 of the first option.

Stage 9 The work was carried out in full accordance with stage 9 of the first option.

The invention claimed is:

1. A device for internal isolation of a pipeline welded joint that comprises a sealing unit including a cylindrical casing and a coaxially mounted cylindrical elastic actuator designed to expand radially when excess pressure is created in a cavity of the coaxially mounted cylindrical elastic actuator, a compound feeding unit, a compound dosing unit and a pneumatic automation unit located in the casing, dosing unit operating cavities for each compound component are connected to the compound feeding unit, the coaxially mounted cylindrical elastic actuator has a channel for feeding the compound in an annular space in the area of the pipeline welded joint, the annular space being connected with the compound feeding unit and with a channel for gas evacuation from the annular space, the compound dosing unit comprises a cylindrical casing with a piston assembly installed in the compound dosing unit, which includes two pistons mounted hermetically in the cylindrical casing of the compound dosing unit, the pistons are connected by a rod installed hermetically inside an annular cavity separator mounted on the inside surface of the cylindrical casing of the compound dosing unit, a piston operating cavity is located between the first piston and the compound feeding unit, a rod operating cavity is located between the second piston and the annular cavity separator, a piston drive cavity is located between the second piston and the pneumatic automation unit, and a rod drive cavity is located between the annular cavity separator and the first piston, with the piston operating cavity and the rod operating cavity connected with the compound feeding unit and the piston drive cavity and the rod drive cavity connected with one another and the pneumatic automation unit, and the pneumatic automation unit is designed to control operation of the compound dosing unit and the compound feeding unit and to control creating excess air pressure in the cavity of the coaxially mounted cylindrical elastic actuator.

2. The device as claimed in claim 1, in which the coaxially mounted cylindrical elastic actuator comprises an elastic sleeve and an elastic shell made of an anti-adhesion material located on the elastic sleeve, and the channel for feeding the compound into the annular space in the area of the pipeline welded joint and the channel for evacuating gas from the mentioned annular space are made in the elastic shell.

3. The device as claimed in claim 2, in which the elastic sleeve has annular protrusions on the end sections on the inside, located in annular grooves on the outside of the cylindrical casing of the sealing unit, and on each end section of the elastic sleeve on the outside there is a retaining bushing in contact with an end of the elastic shell.

4. The device as claimed in claim 1, which comprises additionally a film heater located on the outer surface of the cylindrical casing of the sealing unit.

5. The device as claimed in claim 1, in which for connecting the piston drive cavity and the rod drive cavity to one another, the rod has an axial channel connected to the pneumatic automation unit and radial channels connected to the axial channel with their outputs located near the first piston.

6. The device as claimed in claim 5, in which the cylindrical casing of the sealing unit forms the dosing unit casing.

7. The device as claimed in claim 1, in which the compound feeding unit comprises a casing in which a static mixer, a valve assembly with valves integrated into the casing of the compound feeding unit, and a washing fluid tank connected to channels for supplying compound components to the static mixer.

8. The device as claimed in claim 7, in which the casing of the compound feeding unit is made of two cylindrically shaped parts of different diameters, the static mixer is coaxially located inside said casing of the compound feeding unit, the valves of the valve assembly are located in the part of the casing of the compound feeding unit of larger diameter, and the washing fluid tank is a hydraulic accumulator formed by outer surface of the part of the casing of the compound feeding unit of smaller diameter and the cylindrical membrane fastened to said casing of the compound feeding unit.

9. The device as claimed in claim 7, in which a piston operating cavity of the compound dosing unit is connected to an inlet cavity of the first valve of the valve assembly through a channel designed in the compound feeding unit casing; a rod operating cavity of the compound dosing unit is connected to an inlet cavity of the second valve of the valve assembly through channels in the cylindrical casing of the sealing unit and in the compound feeding unit casing; output cavities of the first and second valves of the valve assembly are connected to an inlet of a static mixer through channels in the casing of the compound feeding unit, an outlet of the static mixer is connected to a channel for compound feeding into the annular space, said channel for compound feeding is designed in the elastic shell of the sealing unit, and the washing fluid tank is connected through the third valve of the valve assembly to output cavities of the first and second valves of the valve assembly.

10. The device as claimed in claim 9, in which the pneumatic automation unit comprises a casing with a pneumatic valve island, at least one working channel of the pneumatic valve island is connected to the piston drive cavity of the compound dosing unit; other operating channels of the pneumatic valve island are connected through channels in the cylindrical casing of the sealing unit respectively to the actuator cavity of the sealing unit, to the cavity of the washing fluid tank and to valve drives of the valve assembly, and a position sensor of the piston assembly connected with the pneumatic valve island is located at the end face of the pneumatic unit casing, which faces the piston assembly.

11. The device as claimed in claim 10, in which an outlet of the static mixer of the compound feeding unit is connected to the compound feeding channel of the coaxially mounted cylindrical elastic actuator by means of an elastic tube with a first pinch valve installed on it; also said outlet of the static mixer is connected to an elastic tube for poor-quality compound removal with a second pinch valve installed, and a channel for evacuating air from the annular space of the sealing unit actuator is connected to an elastic pumping tube with a third pinch valve installed, and the first, second and third pinch valves are located in the compound feeding unit casing, and other operating channels of the pneumatic valve island are connected through channels in the cylindrical casing of the sealing unit to pinch valve drives.

12. The device as claimed in claim 1, in which the channel for gas evacuation from the annular space is connected to a vacuum trap.

13. The device as claimed in claim 11, in which the elastic tube for poor-quality compound removal and the elastic pumping tube are connected to a vacuum trap.

14. The device as claimed in claim 13, in which the vacuum trap includes a cylindrical casing divided by a partition wall with an opening for smaller and larger chambers; there is a tank in the larger chamber, which is suspended in the casing on load cells and which has an opening on the side facing the partition wall and on the opposite side the tank is connected to flexible discharge and evacuation tubes, while there is an air filter in the smaller chamber between the opening in the partition wall and an outlet nozzle.

* * * * *